(12) United States Patent
Tsunoda et al.

(10) Patent No.: US 8,433,453 B2
(45) Date of Patent: Apr. 30, 2013

(54) ELECTRIC POWER LEVELING CONTROLLER

(75) Inventors: Tadanobu Tsunoda, Kawasaki (JP); Kazumasa Ushiki, Kawasaki (JP); Hirotaka Oshima, Kawasaki (JP); Hiroshi Yamamoto, Nagaoka (JP); Toshiaki Funakubo, Kawasaki (JP); Nobutsugu Fujino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 175 days.

(21) Appl. No.: 13/037,695

(22) Filed: Mar. 1, 2011

(65) Prior Publication Data

US 2011/0218693 A1 Sep. 8, 2011

(30) Foreign Application Priority Data

Mar. 3, 2010 (JP) .................................. 2010-47111

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G05B 11/01* (2006.01)
*G01R 21/00* (2006.01)
*G01R 21/06* (2006.01)
*G01R 31/36* (2006.01)

(52) U.S. Cl.
USPC ............. 700/297; 700/22; 700/286; 700/291; 700/295; 702/60; 702/61; 702/62

(58) Field of Classification Search .................. 700/22, 700/286, 291, 295, 297; 702/60–63
See application file for complete search history.

(56) References Cited

U.S. PATENT DOCUMENTS

| 7,188,264 | B2* | 3/2007 | Morisawa | 713/300 |
| 7,571,332 | B2* | 8/2009 | Cromer et al. | 713/310 |
| 7,873,441 | B2* | 1/2011 | Synesiou et al. | 700/286 |
| 2004/0220702 | A1* | 11/2004 | Matsubara et al. | 700/291 |
| 2009/0271645 | A1* | 10/2009 | Mori | 713/320 |
| 2010/0138066 | A1* | 6/2010 | Kong | 700/295 |
| 2011/0004358 | A1* | 1/2011 | Pollack et al. | 700/297 |
| 2011/0208937 | A1* | 8/2011 | Hayashi et al. | 711/165 |
| 2012/0035778 | A1* | 2/2012 | Kong | 700/295 |

(Continued)

FOREIGN PATENT DOCUMENTS

| JP | 2001-258176 A | 9/2001 |
| JP | 3730614 | 1/2006 |
| JP | 2007-336796 A | 12/2007 |

*Primary Examiner* — Ramesh Patel
(74) *Attorney, Agent, or Firm* — Fujitsu Patent Center

(57) ABSTRACT

An electric power leveling controller includes an information acquisition unit that acquires information of electric energy consumption from a power consuming device consuming electric energy from the power source and electric energy charged into a power storage device, a storage unit that stores a specific threshold value for each power storage device, and a control unit that causes a first power consuming device to be power-supplied by the power source, causing the power storage device corresponding to the first power consuming device to be charged with a difference between the specific threshold value and the electric energy consumption, causing the power source to supply to a second power consuming device electric energy corresponding to the specific threshold, and causing the power storage device corresponding to the second power consuming device to discharge to the second power consuming device the difference between the electric energy consumption and the specific threshold value.

10 Claims, 51 Drawing Sheets

U.S. PATENT DOCUMENTS

2012/0083927 A1* 4/2012 Nakamura et al. ............ 700/278
2012/0095622 A1* 4/2012 Lynch et al. ...................... 701/3
2012/0098340 A1* 4/2012 Yokoyama ...................... 307/31
2012/0147783 A1* 6/2012 Shaffer et al. ................. 370/254

* cited by examiner

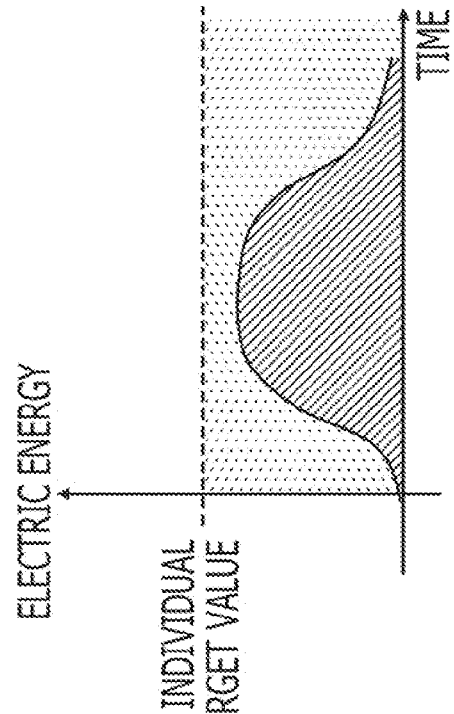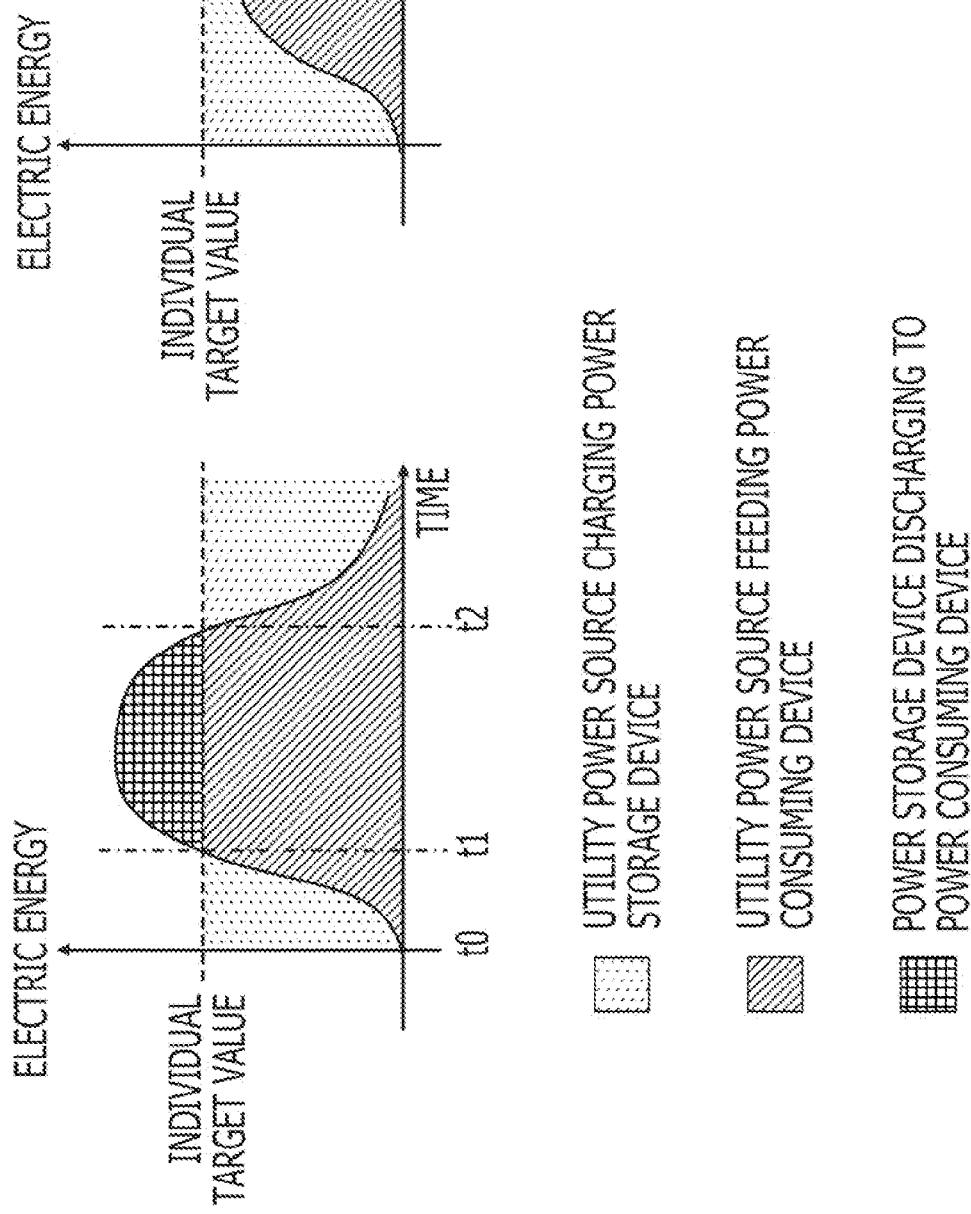

FIG. 11

| TIME | LOAD a | LOAD b | LOAD c | LOAD d | OVERALL LOAD |
|---|---|---|---|---|---|
| 8:00 | 12 | 13 | 13 | 12 | 50 |
| 9:00 | 27 | 14 | 23 | 2 | 66 |
| 10:00 | 25 | 2 | 23 | 22 | 72 |
| 11:00 | 24 | 17 | 24 | 26 | 91 |
| 12:00 | 23 | 10 | 24 | 25 | 82 |
| 13:00 | 25 | 19 | 11 | 24 | 79 |
| 14:00 | 25 | 27 | 5 | 24 | 81 |
| 15:00 | 25 | 28 | 25 | 25 | 103 |
| 16:00 | 26 | 23 | 2 | 24 | 75 |
| 17:00 | 23 | 23 | 21 | 23 | 90 |
| 18:00 | 2 | 21 | 27 | 24 | 74 |
| 19:00 | 2 | 22 | 24 | 23 | 71 |
| 20:00 | 2 | 4 | 3 | 4 | 13 |
| 21:00 | 2 | 3 | 3 | 4 | 12 |
| 22:00 | 2 | 3 | 3 | 4 | 12 |
| 23:00 | 2 | 3 | 3 | 4 | 12 |
| 0:00 | 2 | 3 | 3 | 4 | 12 |
| 1:00 | 2 | 3 | 3 | 4 | 12 |
| 2:00 | 2 | 3 | 3 | 4 | 12 |
| 3:00 | 2 | 3 | 3 | 4 | 12 |
| 4:00 | 2 | 2 | 3 | 4 | 12 |
| 5:00 | 2 | 3 | 3 | 3 | 11 |
| 6:00 | 2 | 2 | 3 | 4 | 11 |
| 7:00 | 2 | 2 | 3 | 4 | 11 |

126

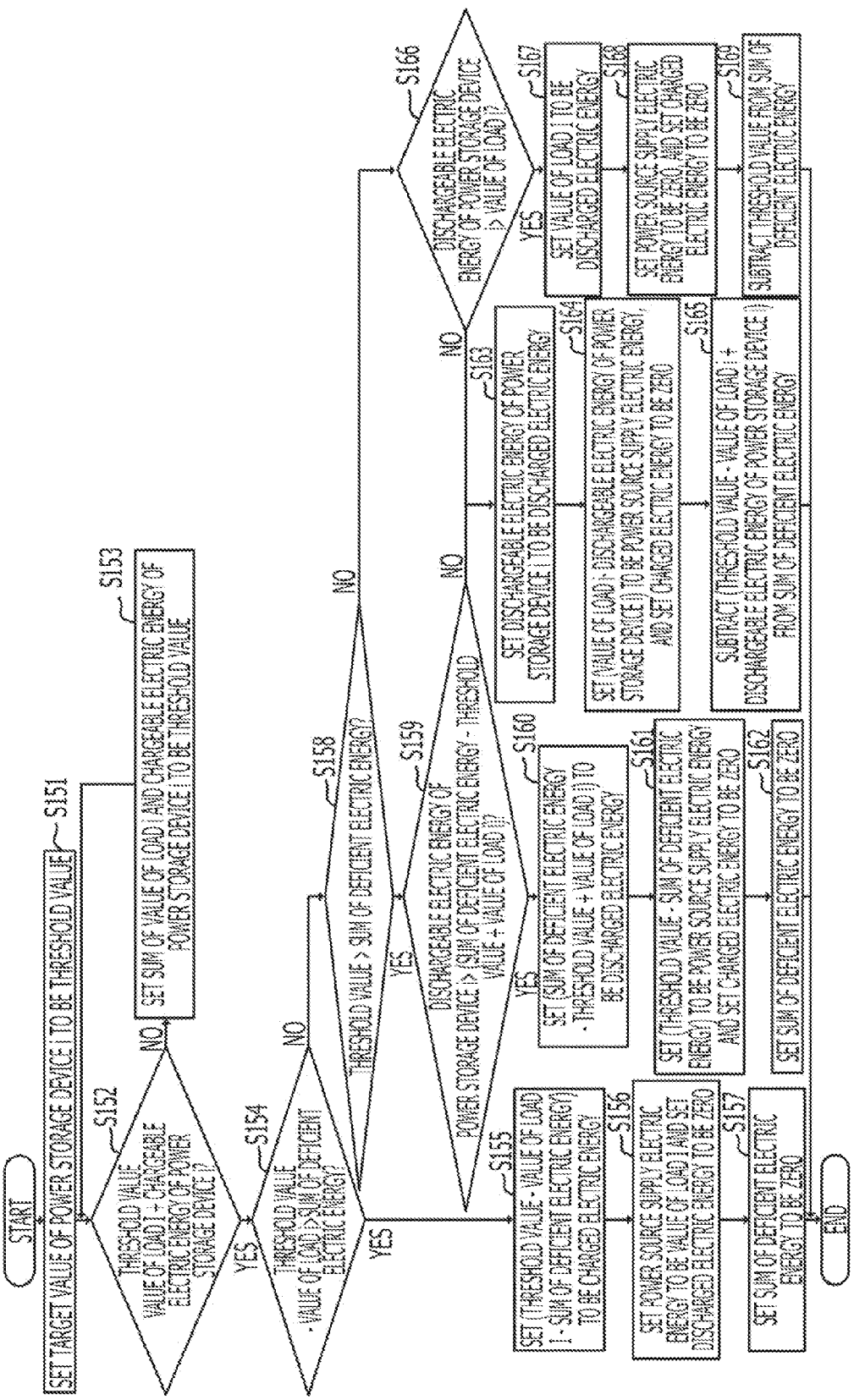

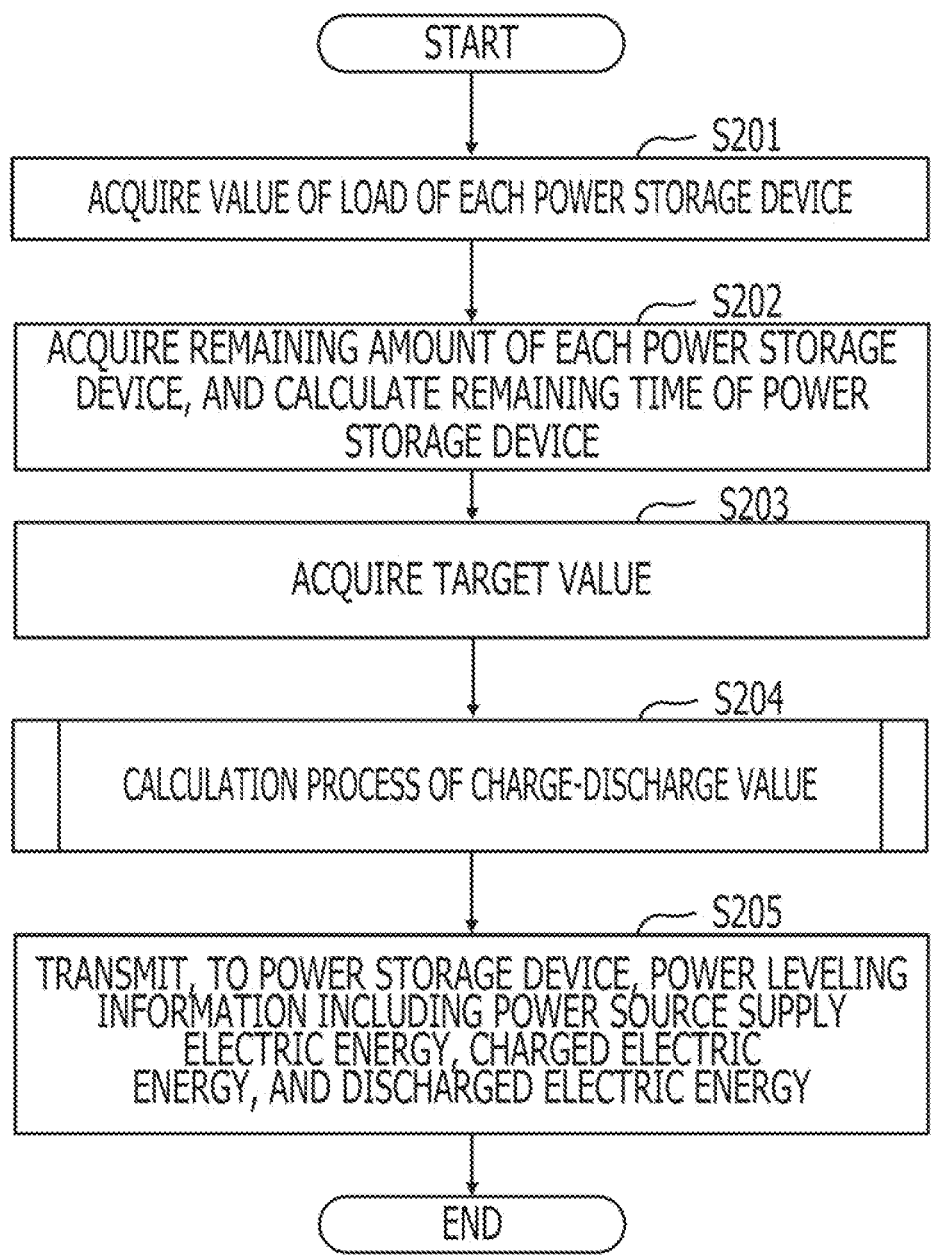

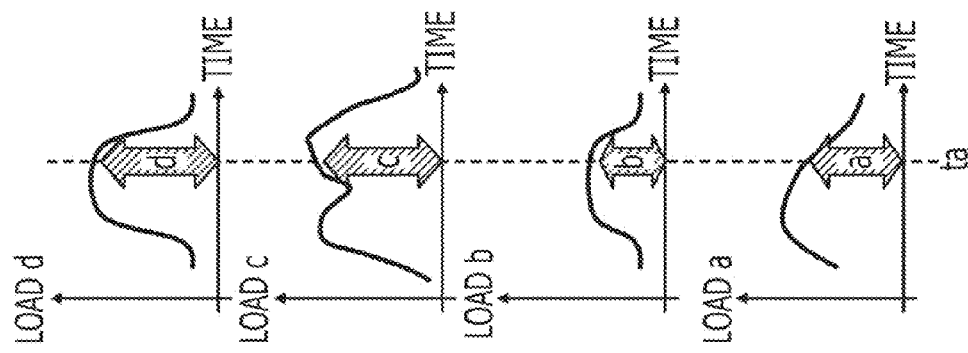
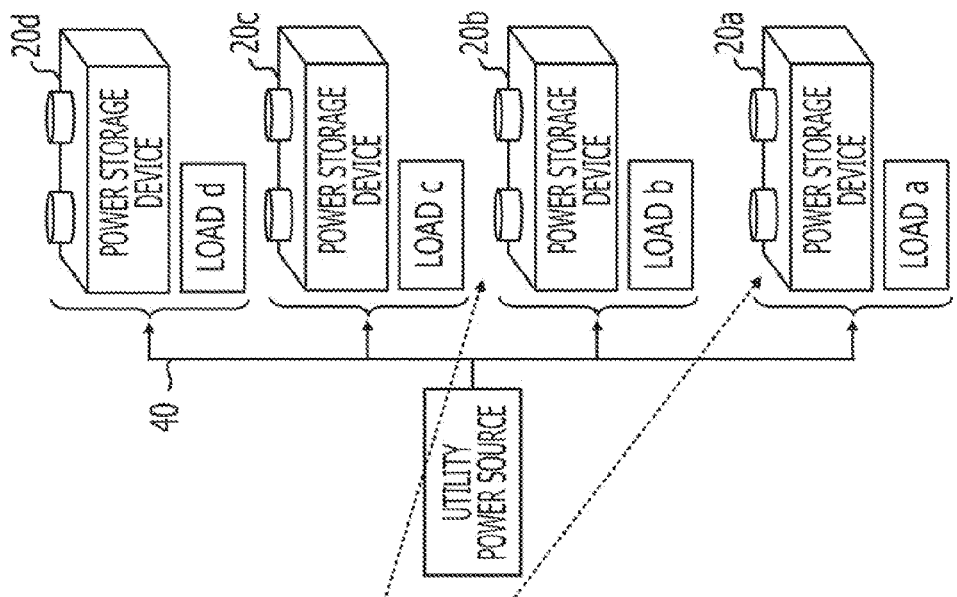
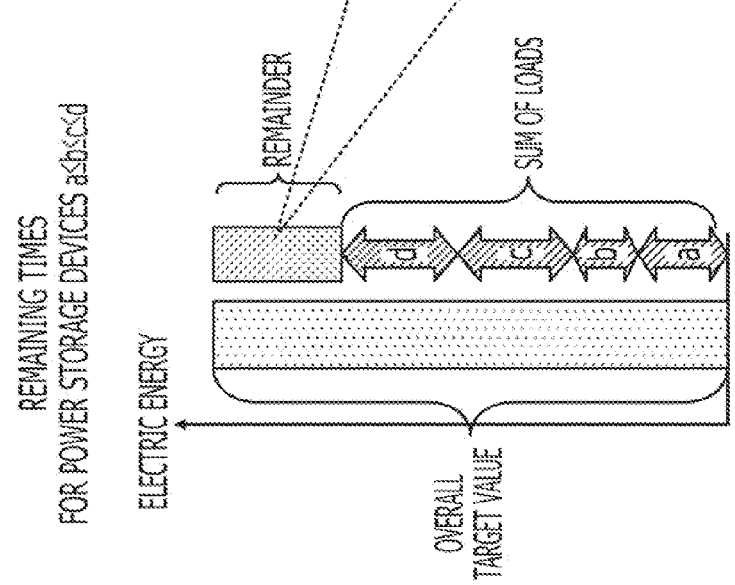

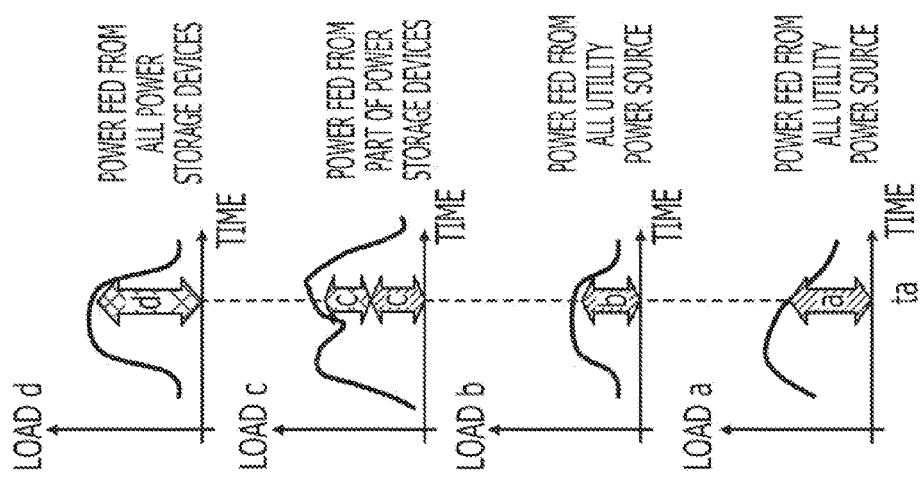
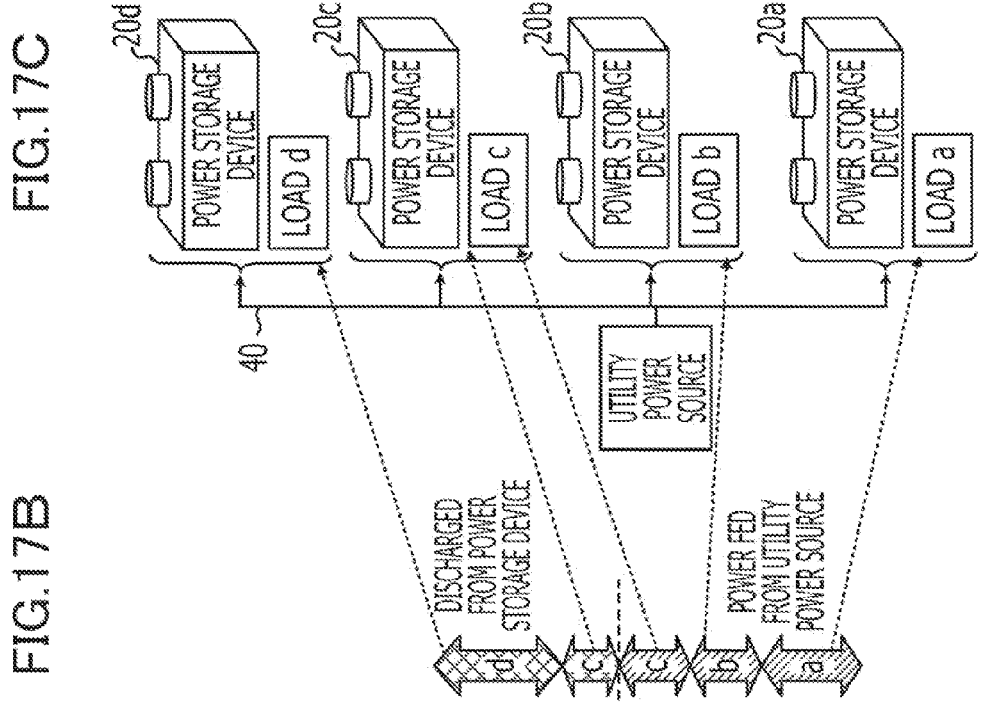
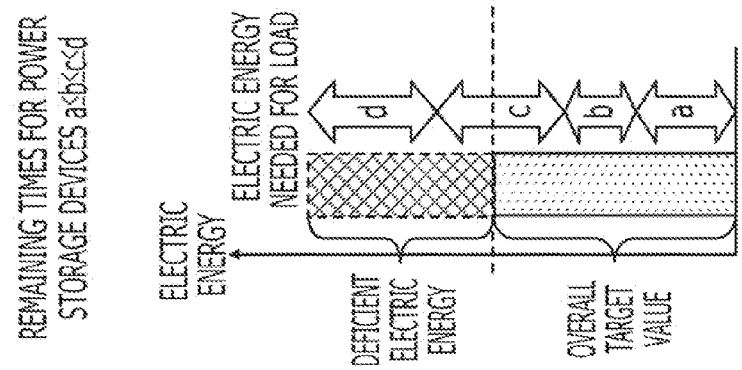

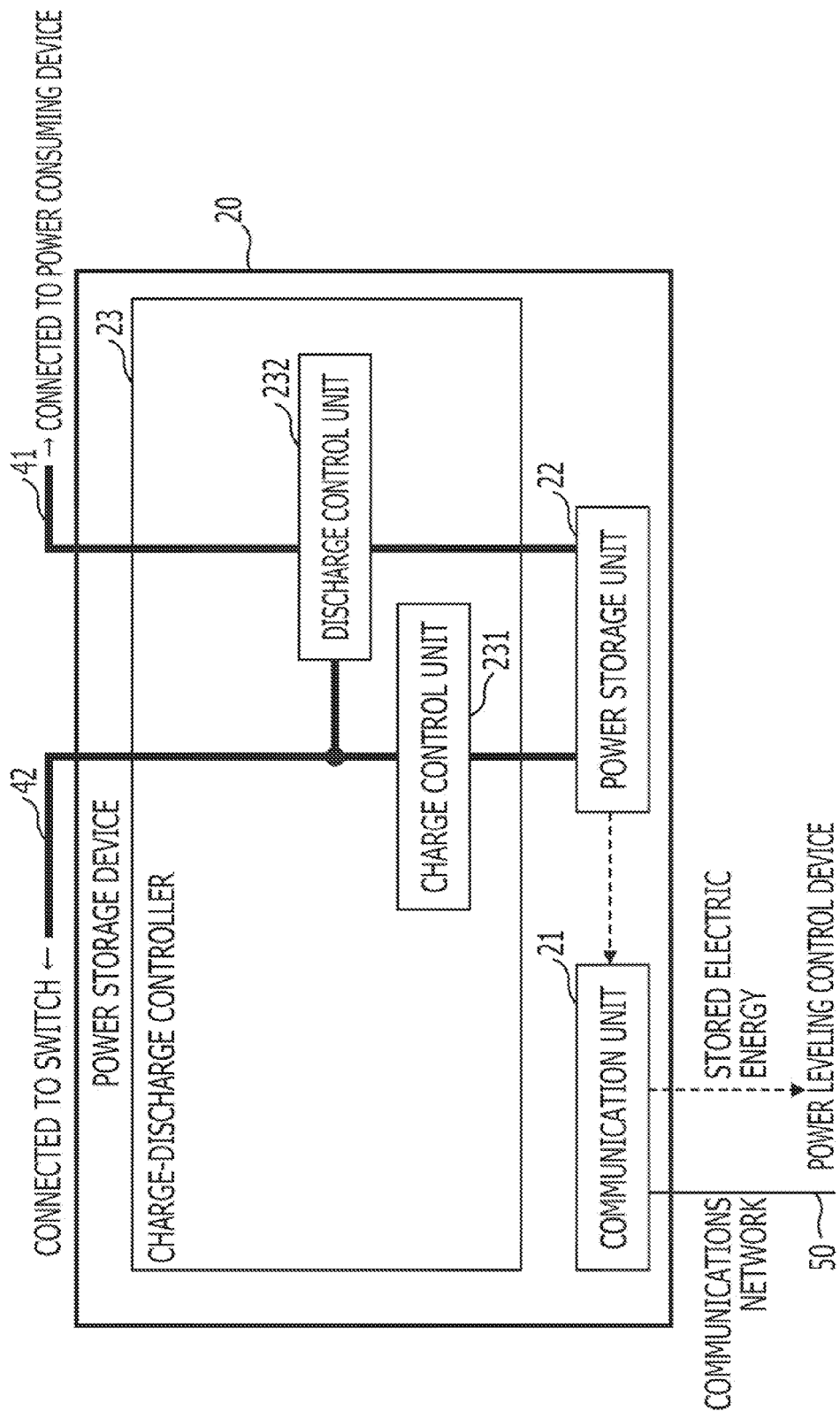

RELATIONSHIP BETWEEN CUMULATIVE ELECTRIC ENERGY FROM UTILITY POWER SOURCE AND INDIVIDUAL TARGET VALUE

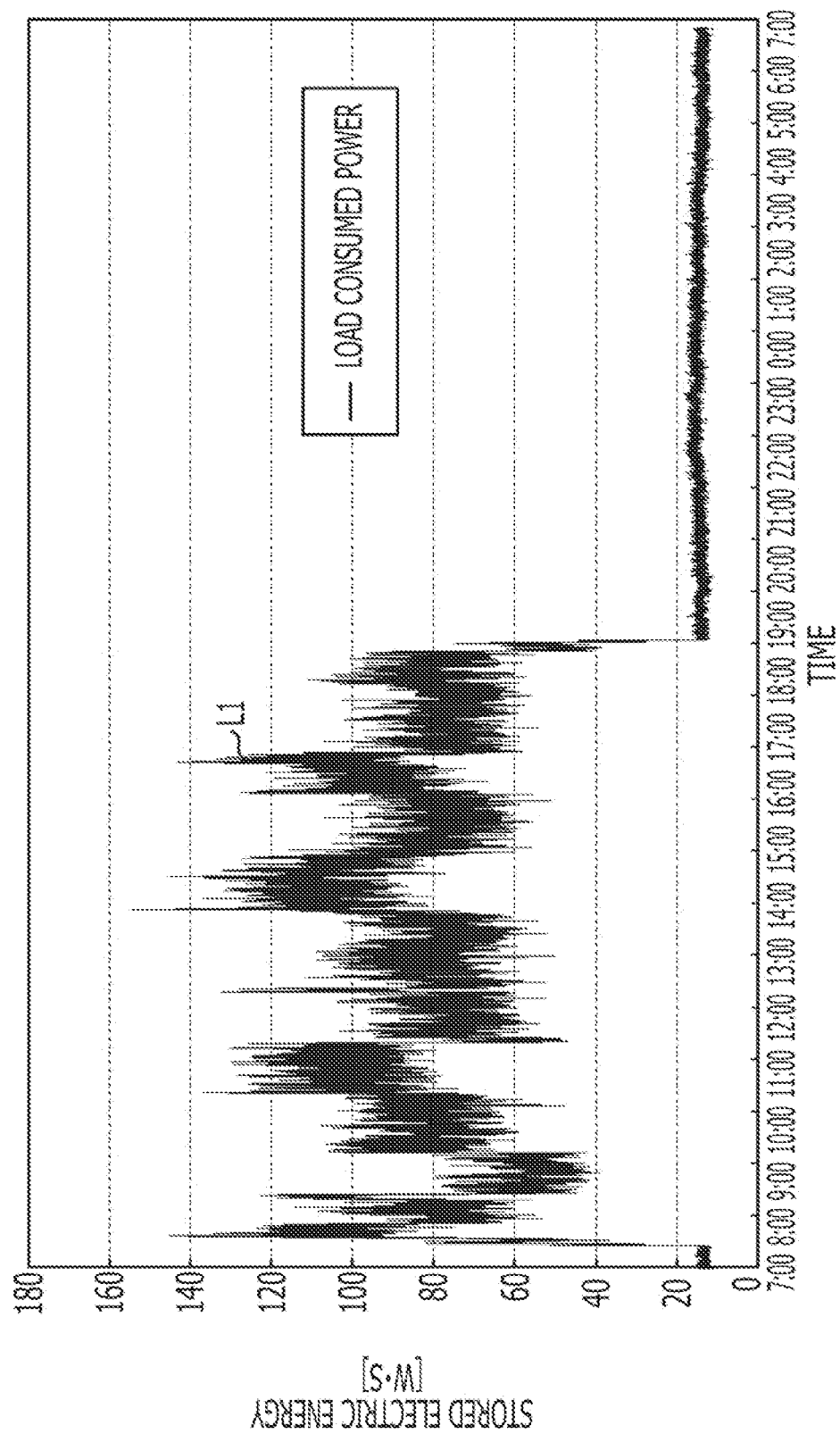

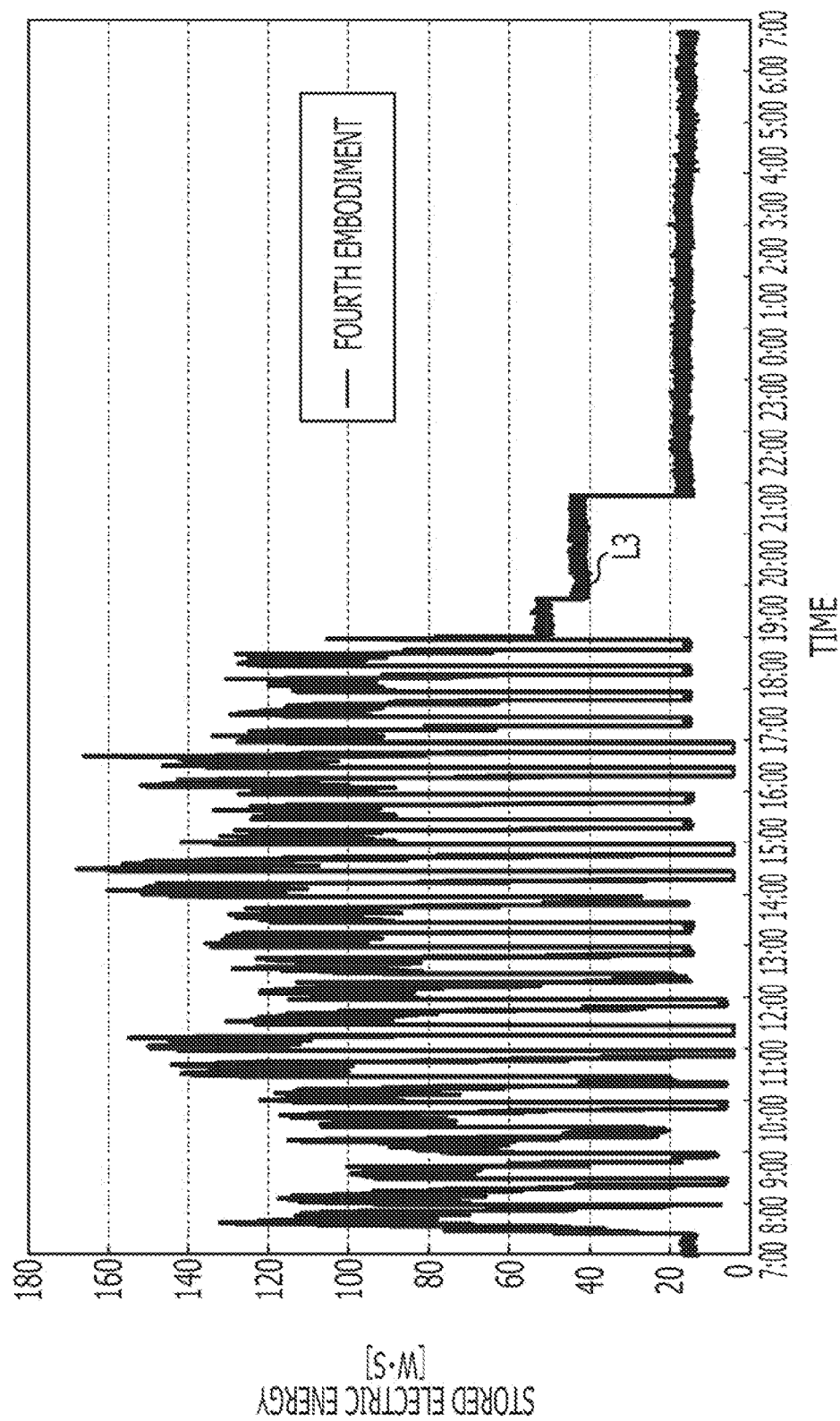

ELECTRIC POWER LEVELING CONTROLLER

CROSS-REFERENCE TO RELATED APPLICATION

This application is based upon and claims the benefit of priority of the prior Japanese Patent Application No. 2010-047111, filed on Mar. 3, 2010, the entire contents of which are incorporated herein by reference.

FIELD

The embodiments discussed herein relate to an electric power leveling controller.

BACKGROUND

Electric power leveling technologies draw attention from the standpoint of reducing carbon dioxide emissions, installation costs, and electric rates. The electric power leveling techniques based on a power storage device cause the power storage device to be charged during a low electric-rate time band such as midnight hours. During peak electric energy consumption hours in daylight time, electric energy is discharged by the power storage device instead of being supplied from a utility power supply. As a result, a peak value of supplied electric energy from the utility power source (amount of electric energy consumption) is lowered.

The use of electric energy charged during low electric-rate time bands in midnight is expected to lower electric rate. A lowered peak value of the electric energy consumption leads to a reduction in the operation opportunity of a heat power plant, and is expected to reduce carbon dioxide emissions.

If a plurality of power consuming loads (such as home electronics, and personal computers) are connected to a single power storage device to level power, the power storage device needs to be a high-capacity one. Construction work is to be performed in order to enable each power consuming load to be connected to a high-capacity power storage device. Costs for the construction work become high.

Electric power leveling systems including a plurality of power storage devices have been studied (as described in Japanese Laid-Open Patent Publication No. 2001-258176, Japanese Patent No. 3730614, and Japanese Laid-Open Patent Publication No. 2007-336796). A plurality of power consuming loads are divided into several groups, and a power storage device is arranged on a per group basis. Charge and discharge operations of each power storage device are controlled and power of the entire system is leveled with a plurality of small-capacity power storage devices. A small-capacity power storage device is easy to add and remove. Such an electric power leveling system provides excellent scalability in response to an increase or a decrease in the power consuming load.

The peak value of the electric energy supplied from the utility power source is lowered as much as possible in the power leveling process based on the plurality of power storage devices. Ideally, the power leveling process based on the plurality of power storage devices provides the same advantages as those provided when the power leveling process is performed with all the power consuming devices connected to a single high-capacity power storage device.

If the power storage devices are individually controlled, it is likely that the timing of the minimization of the remaining electric energy (stored electric energy) is greatly different from device to device.

FIG. 1 illustrates a transition of the stored electric energy of each power storage device with time when the power storage devices are power-level controlled on an individual basis. Transitions of the stored electric energy of the four power storage devices A-D with time are illustrated in FIG. 1. If the control process is performed on an individual basis, the timing of the minimization of the stored electric energy is greatly different from device to device.

If the timing of minimum stored electric energy is greatly different from device to device, the sum of the stored electric energy of all the power storage devices at each time fails to reach a sufficiently small minimum value.

FIG. 2 illustrates a transition of the sum of stored electric energy of all the power storage devices with time when the power storage devices are power-level controlled on an individual basis. The transition of the sum of stored electric energy of the four power storage devices A-D of FIG. 1 with time is illustrated in FIG. 2. A minimum value is reached at about 18:00 o'clock. The closer to zero the minimum value of the stored electric energy, the better the minimum value. The minimum value illustrated in FIG. 2 is far from zero. This suggests that the power storage devices are not sufficiently used in comparison with the power leveling process with the single high-capacity power storage device used.

The ideal control described above is difficult to perform even if the power storage devices are individually controlled in an optimum fashion.

SUMMARY

According to an aspect of the invention, a controller for leveling power supplied from a power source includes an information acquisition unit that acquires information of electric energy consumption from a power consuming device consuming electric energy from the power source and electric energy charged into a power storage device, the power consuming device arranged for a plurality of power storage devices charged by the power source; a storage unit that stores a specific threshold value for each power storage device; and a control unit that causes a first power consuming device to be power-supplied by the power source, the first power consuming device consuming electric energy lower than the specific threshold value of the power consuming device, causing the power storage device corresponding to the first power consuming device to be charged with a difference between the specific threshold value and the electric energy consumption, causing the power source to supply to the second power consuming device electric energy corresponding to the specific threshold, the second power consuming device consuming electric energy larger than the specific threshold value of the power consuming device, and causing the power storage device corresponding to the second power consuming device to discharge to the second power consuming device the difference between the electric energy consumption of the power consuming device and the specific threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 8A and 8B generally illustrate a power leveling control process of the first embodiment;

FIG. 11 illustrates a storage content of electric energy consumption information storage unit;

FIG. 14 is a flowchart illustrating an allocation process of the charge-discharge value in view of electric energy covering in accordance with the first embodiment;

FIG. 15 is a flowchart illustrating a power supply control process performed on electric energy from the power network by the power leveling control device, and a charge-discharge control process of the power storage device in accordance with the first embodiment;

FIGS. 16A-16C diagrammatically illustrate a power leveling method of a second embodiment;

FIGS. 17A-17D diagrammatically illustrate the power leveling method of the second embodiment;

FIG. 23 illustrates a functional configuration of the power storage device of the third embodiment;

FIG. 39A to 39C illustrate transitions of the electric energy consumption from the utility power source when the second embodiment is applied;

FIG. 42A to 42C illustrate transitions of the electric energy consumption from the utility power source when the fourth embodiment is applied.

DESCRIPTION OF EMBODIMENTS

Figure 3:
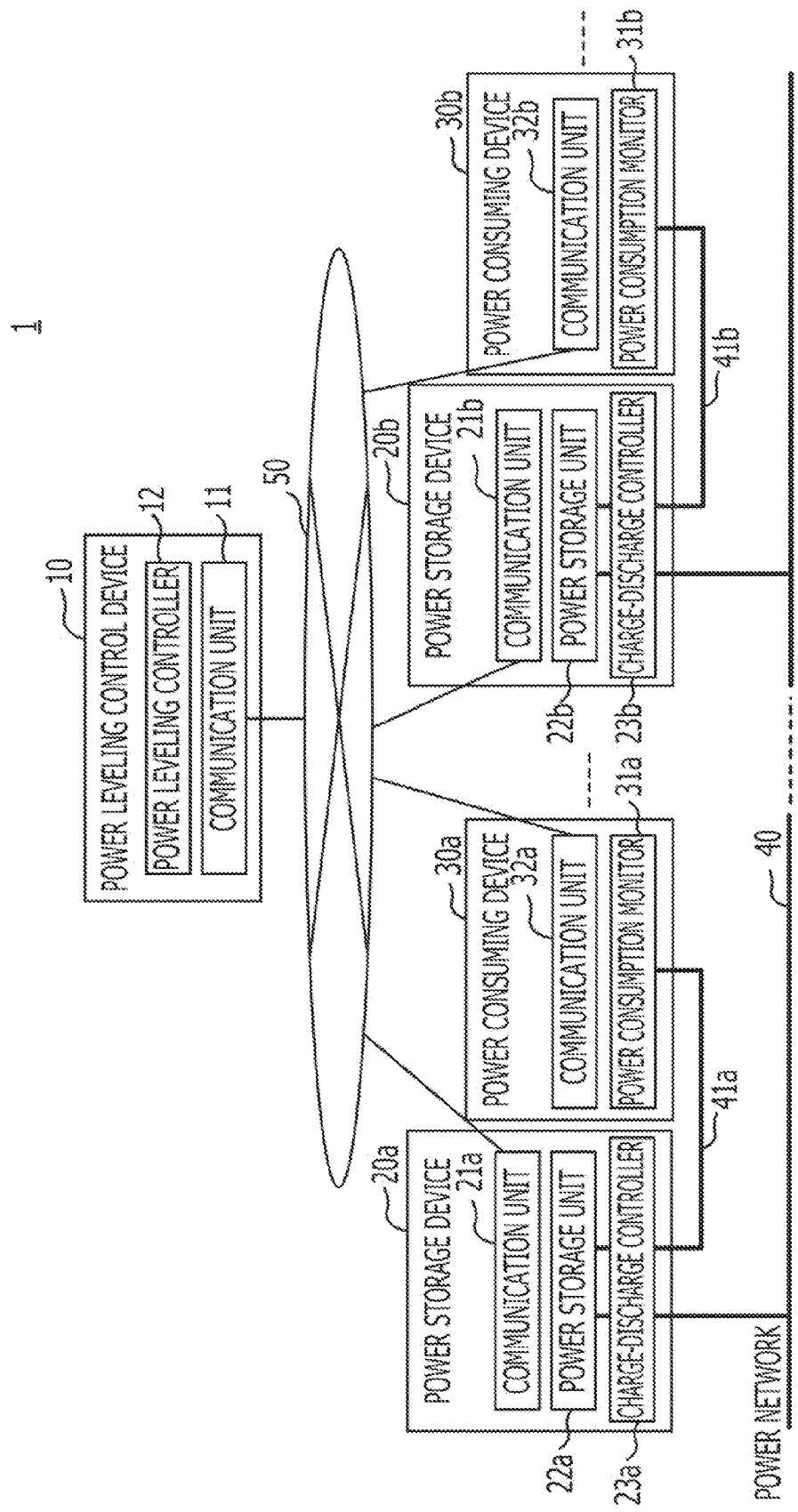
FIG. 3 illustrates a configuration of an electric power leveling system of a first embodiment.

Embodiments are described below with reference to the drawings. FIG. 3 illustrates a system configuration of an electric power leveling system 1 of a first embodiment. As illustrated in FIG. 3, the electric power leveling system 1 includes a plurality of power storage devices 20 including power storage devices 20a and 20b.

The power storage device 20 includes a rechargeable battery that may be charged and discharged. The power storage device 20 is connected to a trunk line of a power network (hereinafter referred to as a power network 40) connected to a utility power source and is supplied with electric energy from the utility power source. The power storage device 20 is connected to a power consuming devices 30 via a power line 41, and supplies electric energy to the power consuming devices 30 via the power line 41. The power consuming devices 30 include a set of devices (power consuming loads) including a few home electronics and a personal computer (PC). A plurality of power consuming loads are connected to a single power storage device 20 via the power line 41.

The power storage device 20 and the power consuming device 30 is connected to a power leveling control device 10 via a wired, or wireless communications network 50 such as a local-area network (LAN). The power leveling control device 10 collects information about stored electric energy of the power storage device 20, and electric energy consumption of the power consuming device 30, and calculates values indicating charged electric energy and discharged electric energy of the power storage device 20 (charge-discharge values) in accordance with a specific calculation method. The power leveling control device 10 transmits charge-discharge control information including the calculated charge-discharge values to a charge-discharge controller 23 in the power storage device 20 via the communications network 50.

Figure 4:
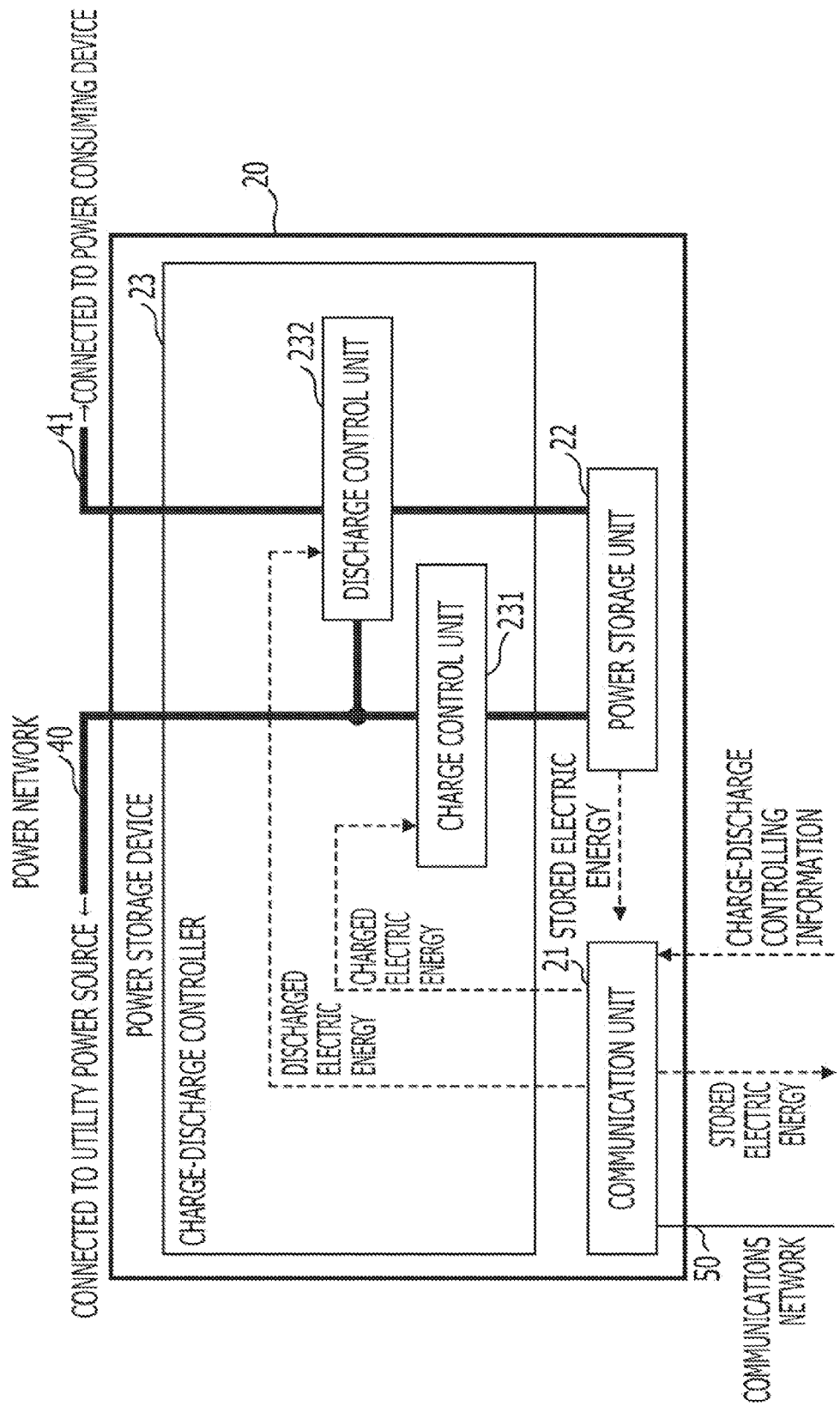
FIG. 4 illustrates a functional configuration of the power storage device.

FIG. 4 illustrates a functional configuration of the power storage device 20. As illustrated in FIG. 4, the power storage device 20 includes communication unit 21, power storage unit 22, charge-discharge controller 23, and the like. The communication unit 21 communicates with the power leveling control device 10 via the communications network 50. The communication unit 21 transmits to the power leveling control device 10 the stored electric energy of the power storage unit 22 (remaining electric energy). The communication unit 21 also receives power leveling control information from the power leveling control device 10.

The power storage unit 22 stores electric energy supplied via the power network 40. The charge-discharge controller 23 controls charged and discharged amounts of the power storage device 20 in response to the charge-discharge control information received via the communication unit 21. The charge-discharge controller 23 includes a charge control unit 231 and a discharge control unit 232. The charge control unit 231 controls a charge process on electric energy from the power network 40 to the power storage unit 22. The discharge control unit 232 controls a discharge process on electric energy from the power storage unit 22 to the power consuming device 30. In response to the charge-discharge control information, the charge-discharge controller 23 may supply, in one case, whole or part of the electric energy from the power network 40 to the power consuming device 30 rather than charging the power storage unit 22.

The electric power leveling system 1 is based on the premise that electric energy is not interchanged among the power storage devices 20. More specifically, the electric power leveling system 1 neither permits stored electric energy to be interchanged among the power storage devices 20 connected via the power line 41, nor permits stored electric energy to be fed back to the power network 40.

Figure 5:
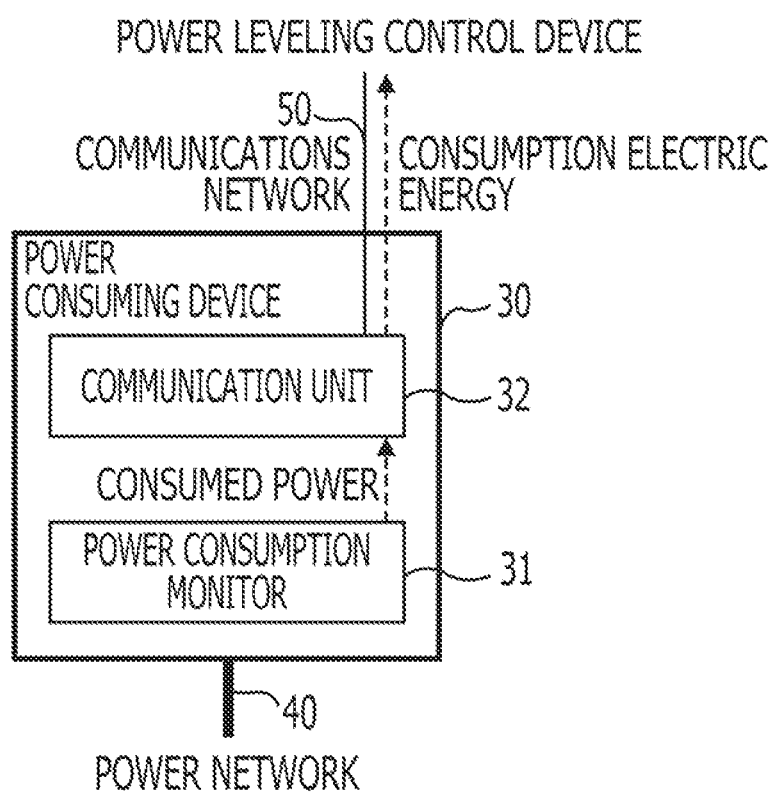
FIG. 5 illustrates a functional configuration of an power consuming device.

FIG. 5 illustrates a functional configuration of the power consuming device 30. As illustrated in FIG. 5, the power consuming device 30 includes a power consumption monitor 31 and a communication unit 32. The power consumption monitor 31 measures an amount of electric energy consumed by the power consuming device 30 (electric energy consumption). The communication unit 32 transmits to the power leveling control device 10 information indicating the electric energy consumption.

The power consumption monitor 31 and the communication unit 32 are not necessarily installed within the power consuming device 30. Alternatively, the power consumption monitor 31 and the communication unit 32 may be included in an external device external to the power consuming device 30.

Figure 6:
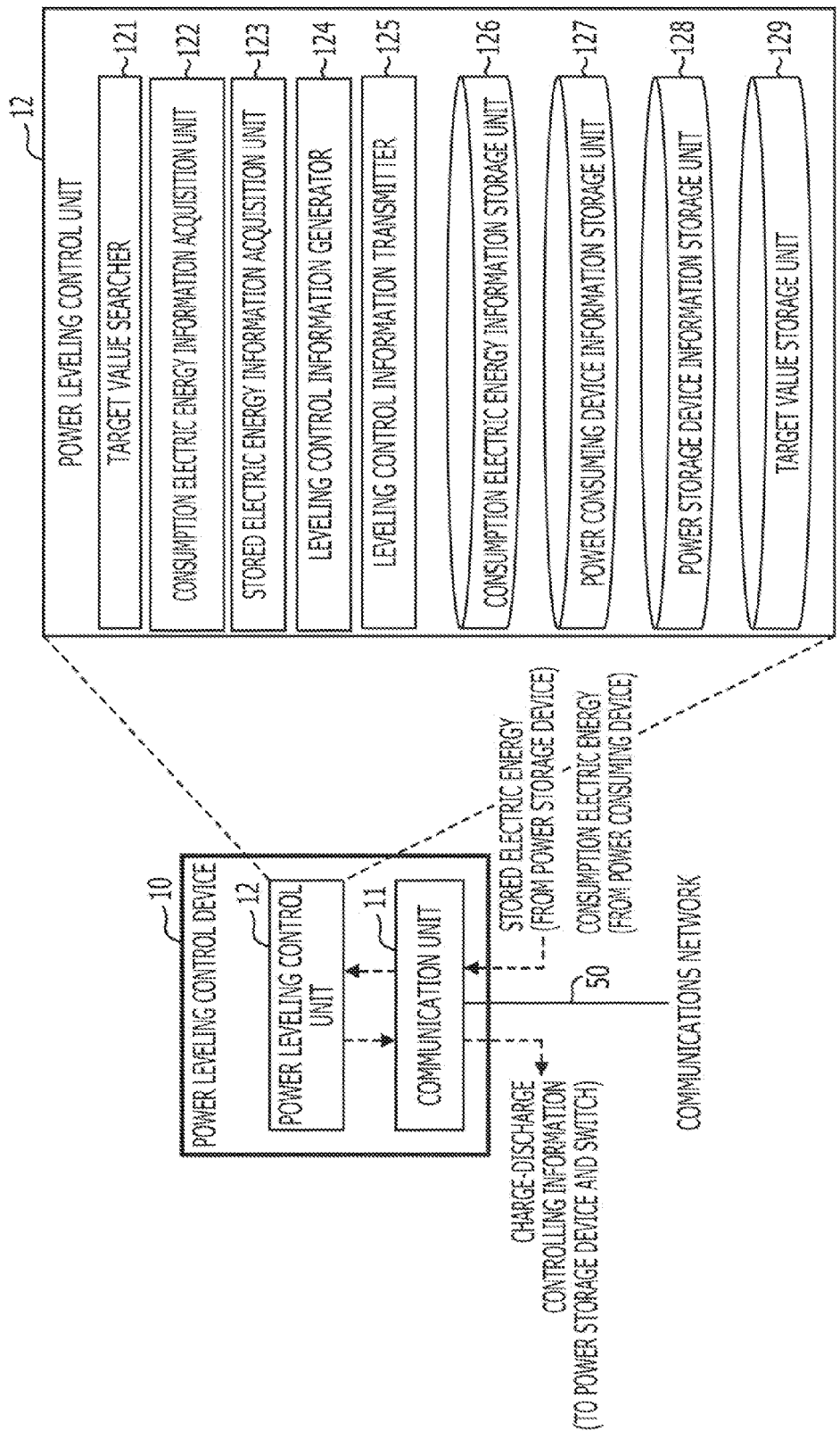
FIG. 6 illustrates a functional configuration of a power leveling control device.

FIG. 6 illustrates a functional configuration of the power leveling control device 10. The power leveling control device 10 includes a communication unit 11 and a power leveling controller 12. The communication unit 11 controls communications with the power storage device 20 and the power consuming device 30.

The power leveling controller 12 includes target value searcher 121, electric energy consumption information acquisition unit 122, stored electric energy information acquisition unit 123, leveling control information generator 124, leveling control information transmitter 125, electric energy consumption information storage unit 126, power consuming device information storage unit 127, power storage device information storage unit 128, and target value storage unit 129.

The electric energy consumption information storage unit 126 stores values of electric energy consumption consumed by the power consuming device 30. The power storage device information storage unit 128 stores information related to the power storage device 20 (power storage device information). The power storage device information includes identification information for communication via the communications network 50 (an IP address, for example), and information related to dischargeable electric energy per unit time (per minute, for example) (unit time dischargeable electric energy), chargeable electric energy per unit time (unit chargeable electric energy), and a capacity of the power storage unit 22 (a maximum value of the chargeable electric energy). The power consuming device information storage unit 127 stores information related to each power consuming device 30 (power consuming device information). The power consuming device information includes identification information for communication via the communications network 50 (such as an IP address).

The target value searcher 121 searches the electric energy consumption information storage unit 126 and the power storage device information storage unit 128 for a threshold value (target value) for use in a control process by the power leveling controller 12. The target value to be searched for is a value increasing the power leveling effect (for a maximum efficiency). For example, the search method to be used may be particle swarm optimization (PSO) as one of metaheuristic techniques. The target value searcher 121 stores a hit target value on the target value storage unit 129. The process of the target value searcher 121 is considered as a pre-process or a preparatory process of power leveling.

The electric energy consumption information acquisition unit 122 periodically acquires the electric energy consumption of the power consuming device 30 for control process of power leveling. The stored electric energy information acquisition unit 123 periodically acquires the stored electric energy of the power storage device 20 for the control process of power leveling.

The leveling control information generator 124 generates the charge-discharge control information based on the electric energy consumption acquired from the power consuming device 30, the stored electric energy acquired from the power storage device 20, and the target value stored on the target value storage unit 129. The leveling control information transmitter 125 transmits the generated power leveling control information to the power storage device 20.

Figure 7:
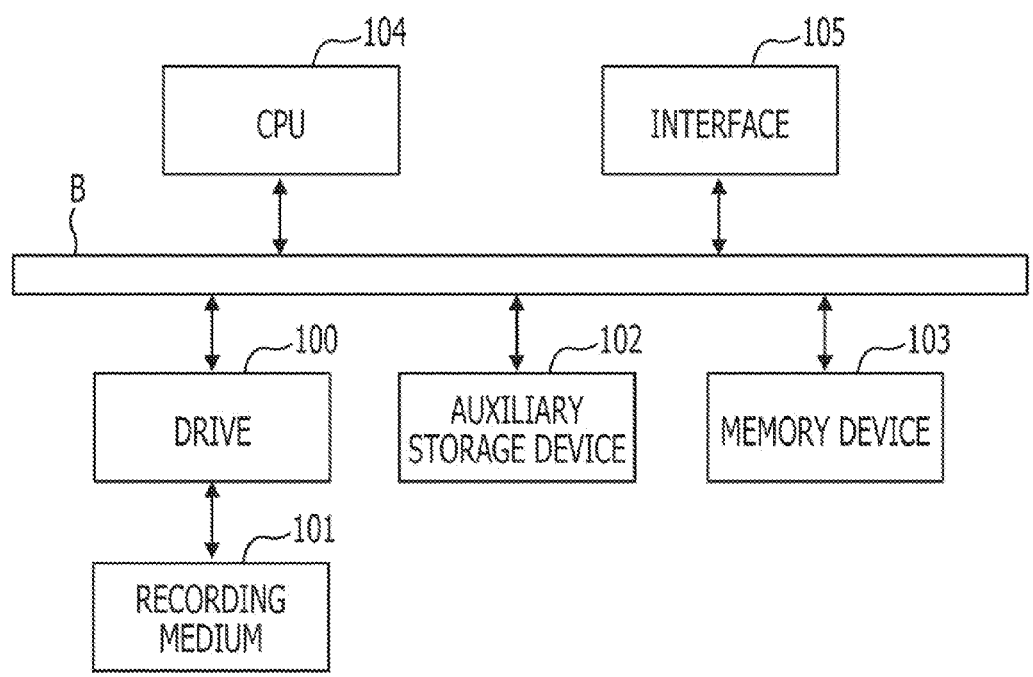
FIG. 7 illustrates a hardware configuration of the power leveling control device.

FIG. 7 illustrates a hardware configuration of the power leveling control device 10. The power leveling control device 10 of FIG. 7 includes drive 100, auxiliary storage device 102, memory device 103, central processing unit (CPU) 104, and interface 105 with all these elements mutually connected via a bus B.

A computer program executing a process of the power leveling control device 10 may be provided in the recording medium 101 such as a compact disk-random-access memory (CD-ROM). If the recording medium 101 storing the computer program is loaded on the drive 100, the computer program is installed onto the auxiliary storage device 102 from the recording medium 101 via the drive 100. The computer program is not necessarily installed from the recording medium 101. The computer program may be downloaded from another computer via a network. The auxiliary storage device 102 stores not only the installed computer program but also a file and data.

In response to a startup instruction of the program, the memory device 103 reads the program from the auxiliary storage device 102 and stores the read program thereon. The CPU 104 performs the function of the power leveling control device 10 in accordance with the program stored on the memory device 103. The interface 105 serves as an interface to be connected to the network.

The CPU 104 functions as the target value searcher 121, the electric energy consumption information acquisition unit 122, the stored electric energy information acquisition unit 123, the leveling control information generator 124, and the leveling control information transmitter 125. One of the auxiliary storage device 102 and the memory device 103 functions as the electric energy consumption information storage unit 126, the power consuming device information storage unit 127, the power storage device information storage unit 128, and the target value storage unit 129. The interface 105 serves as the communication unit 11.

The process content of the power leveling control device 10 of a first embodiment is described below. According to the first embodiment, the target value searcher 121 searches for an "individual target value" of each power storage device 20. In the control process based on the power leveling control information, a value likely to minimize a peak value of supplied electric energy from the power network 40 is searched for as the individual target value. The control process of FIGS. 8A and 8B is performed in response to such an individual target value.

FIGS. 8A and 8B and FIGS. 9A and 9B diagrammatically illustrate the power leveling control process of the first embodiment. A control manner of a single power storage device 20 is illustrated in FIGS. 8A-9B. In the four graphs of FIGS. 8A and 8B and FIGS. 9A and 9B, the abscissa represents time, and the ordinate represents electric energy. Each graph represents a transition of the electric energy consumption (hereinafter referred to as simply referred to as a "load") of the power consuming device 30 with time.

In FIG. 8A, a load is equal to or below the individual target value during period t0-t1. Power for the load is supplied by the power network 40 during this period. Electric energy of (the individual target value–the load) is used to charge the power storage device 20.

The load is above the individual target value during period t1-t2. Electric energy of the individual target value is supplied by the power network 40. Electric energy of (the load–the individual target value) is supplied by the discharging power storage device 20. FIG. 8B illustrates a case in which the load is smaller than the individual target value. In such a case, substantially the same control process as the control process during period t0-t1 of FIG. 8A is performed.

Figure 9A:
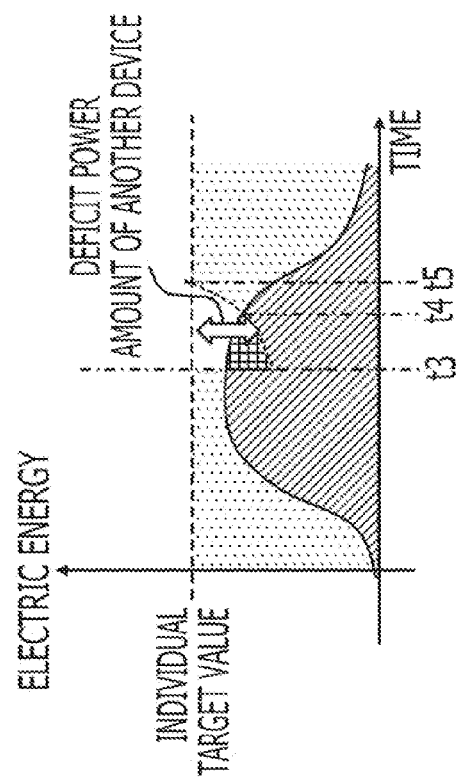
FIGS. 9A and 9B generally illustrate the power leveling control process of the first embodiment.

FIG. 9A illustrates a case in which the power storage device 20a runs out of the stored electric energy thereof at time t3 in the middle of the discharging operation of the power storage device 20 (a power storage device 20a here) discharging electric energy of (the load–the individual target value). In such a case, the entire load of the power storage device 20 is supplied by the power network 40. Power is also covered by another power storage device 20.

Figure 9B:
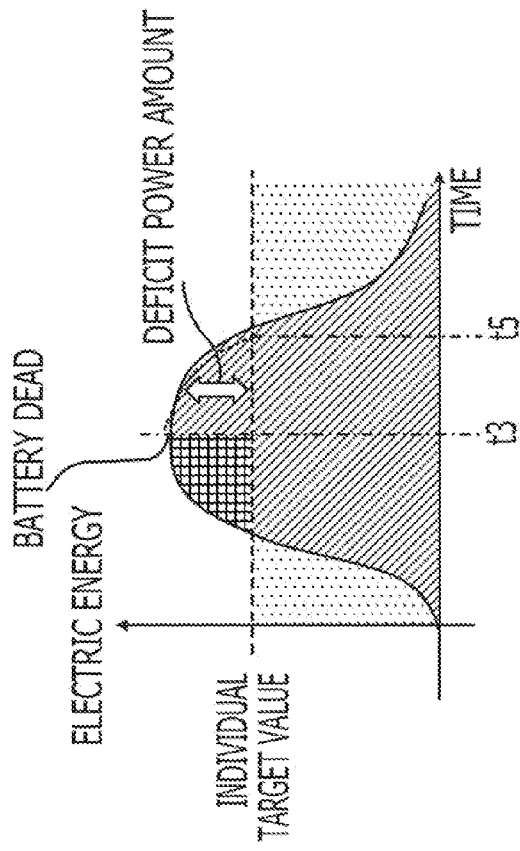

If the power storage device 20 runs out of the stored electric energy thereof during the discharging operation thereof, another power storage device 20 may be selected to supplied electric energy that the power storage device 20 is originally expected to discharge. The selected power storage device 20 (a power storage device 20b here) starts sharing (covering) the load at time t3 as illustrated in FIG. 9B. The load sharing is performed by restricting charging in response to electric energy to be shared or by restricting charging and by discharging in response to the electric energy to be shared. During period t3-t4 of FIG. 9B, the power storage device 20b restricts charging and discharges electric energy in order to perform the load sharing. From time t4 to time t5, the power storage device 20b restricts charging and discharges electric energy for the load sharing. If the power storage device 20b restricts charging or discharges electric energy, the supplied electric energy (the electric energy consumption) from the power network 40 to the power storage device 20b is reduced by an amount equal to an increase in the supply amount to the power storage device 20a (electric energy above the target value). As a result, the supplied electric energy from the power network 40 to the entire electric power leveling system 1 is equal to or below the individual target value, and is thus leveled.

A power storage device 20 having the longest time of remaining electric energy is selected in the selection of the power storage device 20 for load sharing (electric energy covering).

The power storage device 20 selected as a load sharing destination attempts to share load as much as possible to cover a total amount of deficient electric energy of the power storage device 20 running out of electric energy thereof. If a single power storage device 20 alone is not sufficient to cover the total deficient electric energy, a power storage device 20 having the next longest time of remaining electric energy is selected and covers the remaining deficient electric energy.

In the control process performed in this way, a power storage device 20 having larger stored electric energy is more likely selected. Electric energy stored on the power storage devices 20 is used generally uniformly. The electric energy stored on the power storage devices 20 is sufficiently used. The electric energy consumption on the entire electric power leveling system 1 from the utility power source is effectively leveled.

The process is further described with reference to a flowchart of FIG. 10.

Figure 10:
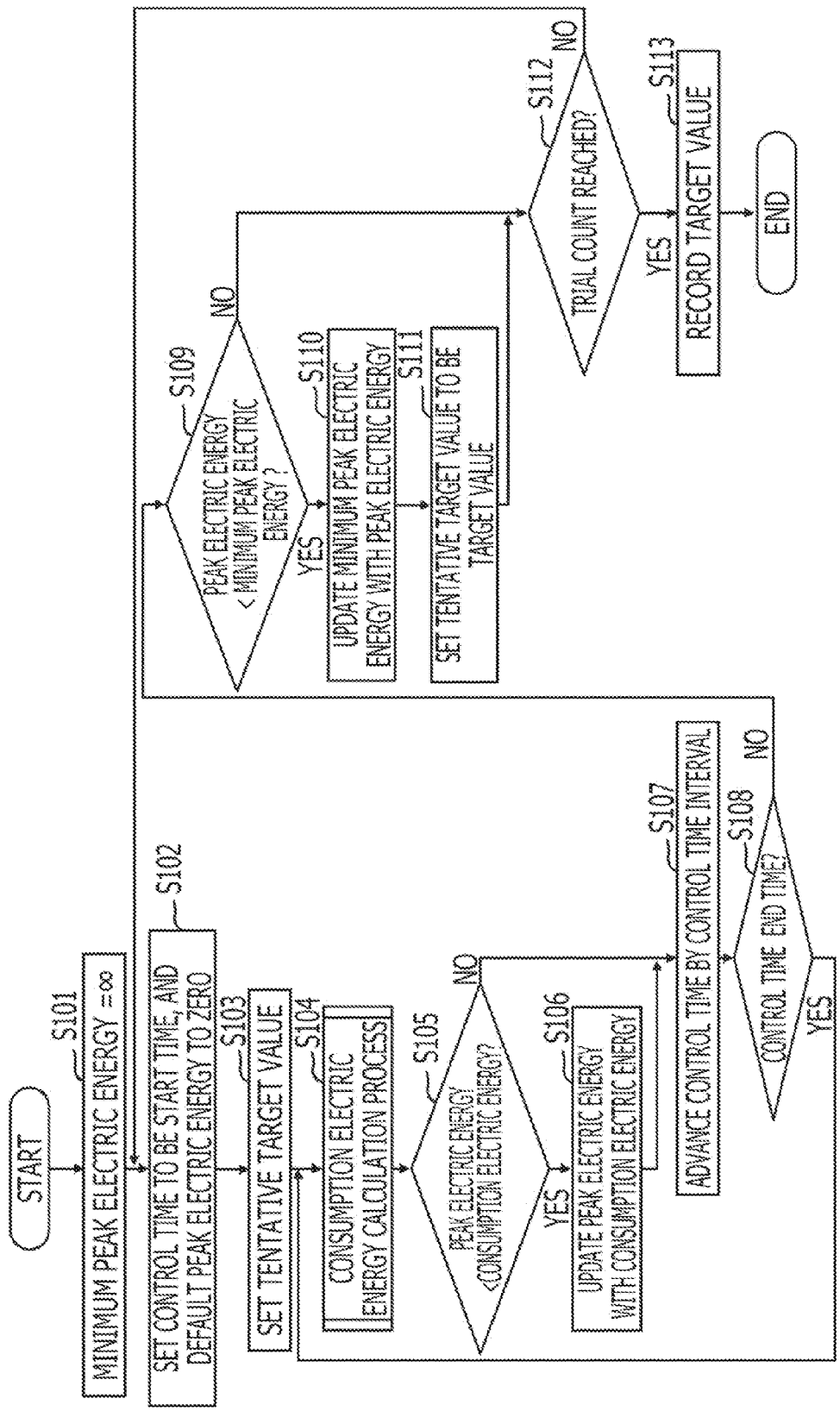
FIG. 10 is a flowchart illustrating a search process of a target value by the power leveling control device of the first embodiment.

FIG. 10 is the flowchart illustrating the search process of the target value performed by the power leveling control device 10 of the first embodiment.

The search process of the target value described above is a preparatory process to the power leveling, and is sufficient if performed once prior to the power leveling control. The transition pattern of the electric energy consumption of the power consuming device 30 may change seasonally. For this reason, the target value may be re-calculated periodically (once a day, or once every few months, for example).

Referring to FIG. 10, a tentative value (tentative target value) is set for the individual target value in a random fashion, and a peak value of the electric energy consumption is determined if the power leveling control is performed based on the tentative target value and the transition of past electric energy consumption stored on the electric energy consumption information storage unit 126. The process is repeated with a combination of tentative target values changed, and a tentative target value minimizing the peak value is searched for. The tentative target value minimizing the peak value is adopted as the individual target value. The process of FIG. 10 is performed to search concurrently for the individual target values of a plurality of power storage devices 20.

In operation S101, the target value searcher 121 sets a minimum peak value of electric energy to be infinity. The minimum peak value of electric energy is updated if a peak value of the electric energy consumption repeatedly determined in the course of searching for the target value is smaller than the peak value previously determined.

The target value searcher 121 sets control time to be start time of the electric energy consumption information storage unit 126 (S102).

FIG. 11 illustrates a storage content of the electric energy consumption information storage unit 126. As illustrated in FIG. 11, the electric energy consumption information storage unit 126 stores load a, load b, load c, load d, and overall load with time mapped thereto. Load a is the electric energy consumption of the power consuming device 30a. Load b is the electric energy consumption of the power consuming device 30b. Loads c and d are the amounts of electric energy consumption of the power consuming devices 30c and 30d, respectively. The overall load is the sum of the four loads at the same time band. The unit of each load is watt-hour.

As illustrated in FIG. 11, the value of load recorded is 12 at time 8:00, and indicates the electric energy consumption of the power consuming device 30a for one hour from 8:00 to 9:00. The contents of FIG. 11 are measured beforehand and recorded on the electric energy consumption information storage unit 126 prior to the execution of the process of FIG. 10 (on the previous day, for example).

Start time is 8:00 in FIG. 11. In operation S102, 8:00 is set for the control time. The target value searcher 121 defaults the peak value of electric energy to zero.

The target value searcher 121 sets a tentative target initial value on each of the power storage devices 20 (S103). As illustrated in FIG. 11, four power storage devices 20 are used. Four tentative target values are thus set. The tentative target initial value may be selected in a random fashion. Alternatively, an empirical value may be set. For example, if a target value of the power storage device 20 was calculated in the past, that value may be set on the power storage device 20 as the empirical value for the tentative target initial value. In the power storage device 20 having no past calculated target value, a target value of another power storage device 20 or a corrected value of the target value may be used for a tentative target initial value. The corrected value of the target value may be a value corrected based on a difference between the load to the other power storage device 20 and the load to the power storage device 20. The sum of tentative target values is equal to or below maximum electric energy the utility power source can supply every control interval to be discussed.

The target value searcher 121 calculates the electric energy consumption from the power network 40 responsive to control time (8:00-9:00 for example) in accordance with the tentative target value together with the electric energy consumption information storage unit 126, and the power storage device information storage unit 128 (S104). The electric energy consumption is calculated for the entire electric power leveling system 1. In other words, the electric energy consumption is not calculated on each power storage device 20. This is because the embodiment is intended to level the electric energy consumption from the power network 40 on the entire electric power leveling system 1.

The target value searcher 121 compares the calculated electric energy consumption with the peak value of electric energy (S105). If the electric energy consumption is larger than the peak value of electric energy (yes from S105), the target value searcher 121 updates the peak value of electric energy with the electric energy consumption (S106). If the electric energy consumptioin is equal to or below the peak value of electric energy (no from S105), the peak value of electric energy is not updated.

The target value searcher 121 advances the control time by a control interval (S107), and repeats operation S104 and subsequent operations. According to the embodiment, the control interval is 1 hour. A new control process time starts 1 hour later. The control intervals are time intervals at which the power leveling control process is performed. More specifically, at the control intervals, the power leveling control information is generated, and then transmitted to each power storage device 20. As clearly described below, a generation process of the power leveling control information according to the embodiment may be carried out at a high speed. In practice, the power leveling control process may be performed on a real-time basis. The control interval may be set to be short enough to assure a quasi-real-time operation. Since the data of FIG. 11 is obtained every hour, the control interval may be set to be 1 hour for convenience only. In other words, the time interval of the electric energy consumption information storage unit 126 is a control interval in one embodiment.

Operations S104-S107 are repeated at control intervals until the end time of the electric energy consumption information storage unit 126 (S108). The peak value of the electric energy is a maximum value (peak value) of the electric energy consumption calculated at control intervals from start time to end time.

In operation S109, the target value searcher 121 compares the peak value of electric energy with a minimum peak value of electric energy (S109). If the peak value of electric energy is smaller than the minimum peak value of electric energy (yes from S109), the target value searcher 121 updates the minimum peak value of electric energy with the peak value of electric energy (S110). The target value searcher 121 sets a tentative target value to be a target value (S111). If the peak value of electric energy is equal to or above the minimum peak value of electric energy (no from S109), the minimum peak value of electric energy and the target value are not updated.

The target value searcher 121 determines whether a trial count of the process of FIG. 10 has reached a preset maximum value (S112). If the trial count has not yet reached the present maximum value, operation S102 and subsequent operations are repeated. If operation S102 and subsequent operations are repeated, a value different from the previous tentative target value is set in operation S103. It may be acceptable that only tentative target values for part of the power storage devices 20 are modified. It is important that a combination of a plurality of tentative target values is different from the previous combination of tentative values.

If the trial count subsequent to operation S102 has reached the maximum value (yes from S112), the target value searcher 121 records a target value of each power storage device 20 on the target value storage unit 129 as the individual target value (S113). According to the first embodiment, the individual target values of the number equal to the number of power storage devices 20 are thus recorded on the target value storage unit 129. A group of individual target values to be recorded herein is a tentative target value group in which the peak value of the electric energy consumption is minimum within the trial count.

Figure 12:
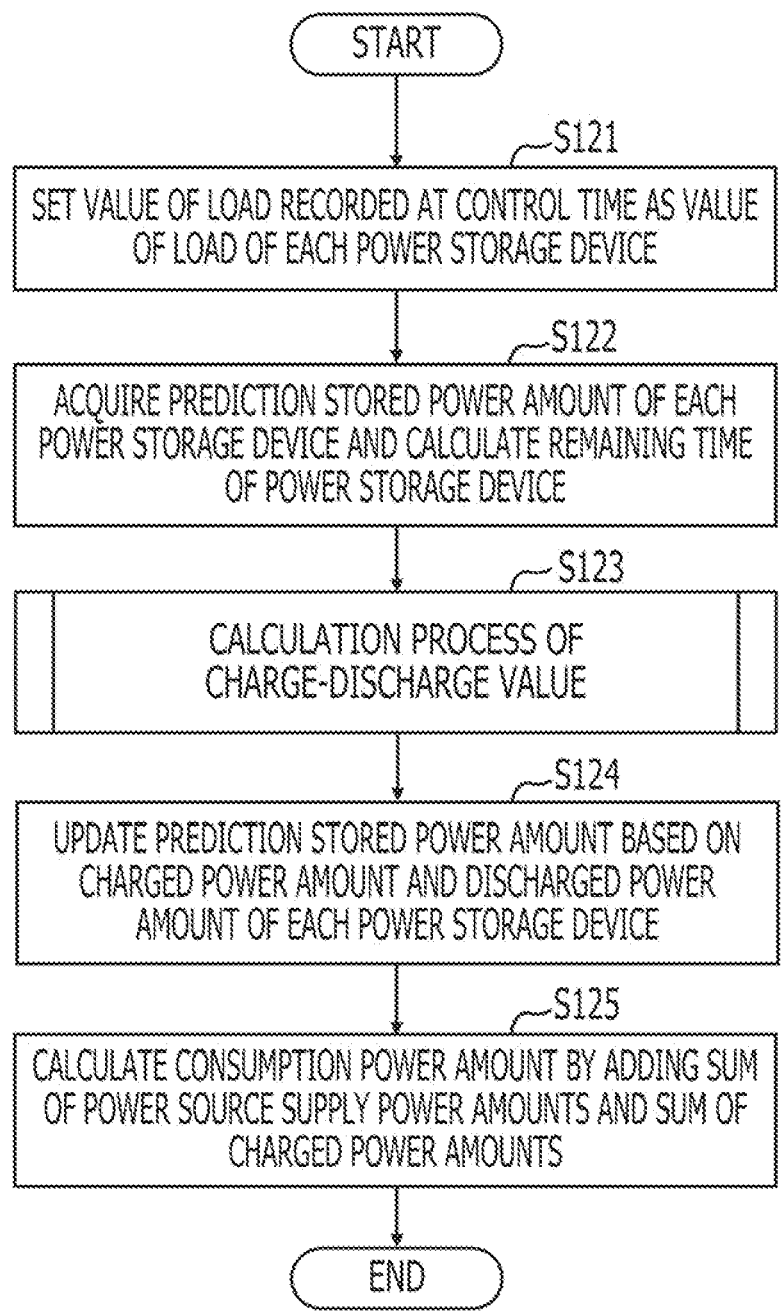
FIG. 12 is a flowchart illustrating a calculation process of the electric energy consumption from a power network.

Operation S104 is described below in detail. FIG. 12 is a flowchart illustrating a calculation process of the electric energy consumption from the power network 40.

In operation S121, the target value searcher 121 acquires, as a load to each power storage device 20, a value of a load recorded for each power storage device 20 on the electric energy consumption information storage unit 126 at the control time. At control time 8:00 as illustrated in FIG. 11, the value of load a (12), the value of load b (13), the value of load c (13), and the value of load d (12) are obtained as the values of loads to the power storage devices 20a, 20b, 20c, and 20d, respectively.

The target value searcher 121 acquires predicted value of stored electric energy of each power storage device 20, and calculates the remaining time (energy dischargeable time) of each power storage device 20 based on the predicted value of stored electric energy and the value of the load (S122). The predicted value of stored electric energy of each power storage device 20 at the time of the execution of operation S104 in FIG. 10 is the capacity of each power storage device 20. It is presumed that each power storage device 20 is fully charged (to the capacity thereof). Information about the capacity of the power storage device 20 is acquired from the power storage device information storage unit 128. The remaining time of the power storage device 20 is calculated by dividing the predicted value of stored electric energy of the power storage device 20 by the load of the power storage device 20.

In response to the tentative target value, the target value searcher 121 calculates the charge-discharge value of each power storage device 20 during the period from the present control time to the next control time (e.g., during the control interval) (S123). More specifically, the target value searcher 121 calculates three parameters for each power storage device 20. The three parameters include supplied electric energy to the load from the power network 40 (hereinafter referred to as "power source supply electric energy"), electric energy charged to the power storage device by the power network 40 (hereinafter referred to as a "charged electric energy"), and electric energy discharged to the load by the power storage device 20 (hereinafter referred to as a "discharged electric energy").

The target value searcher 121 updates the prediction stored electric energy based on the charged electric energy and the discharged electric energy, and stores updated prediction stored electric energy on the memory device 103 (S124). More specifically, the updated prediction stored electric energy is (the preset prediction stored electric energy (acquired in operation S122)+the charged electric energy−the discharged electric energy). The updated prediction stored electric energy is used in operation S122 of next cycle.

The target value searcher 121 calculates the electric energy consumption from the power network 40 at the control time (more strictly, during the control interval having the start time starting at the control time) by adding the sum of power source supply electric energy and the sum of charged electric energy (S125).

Figure 13:
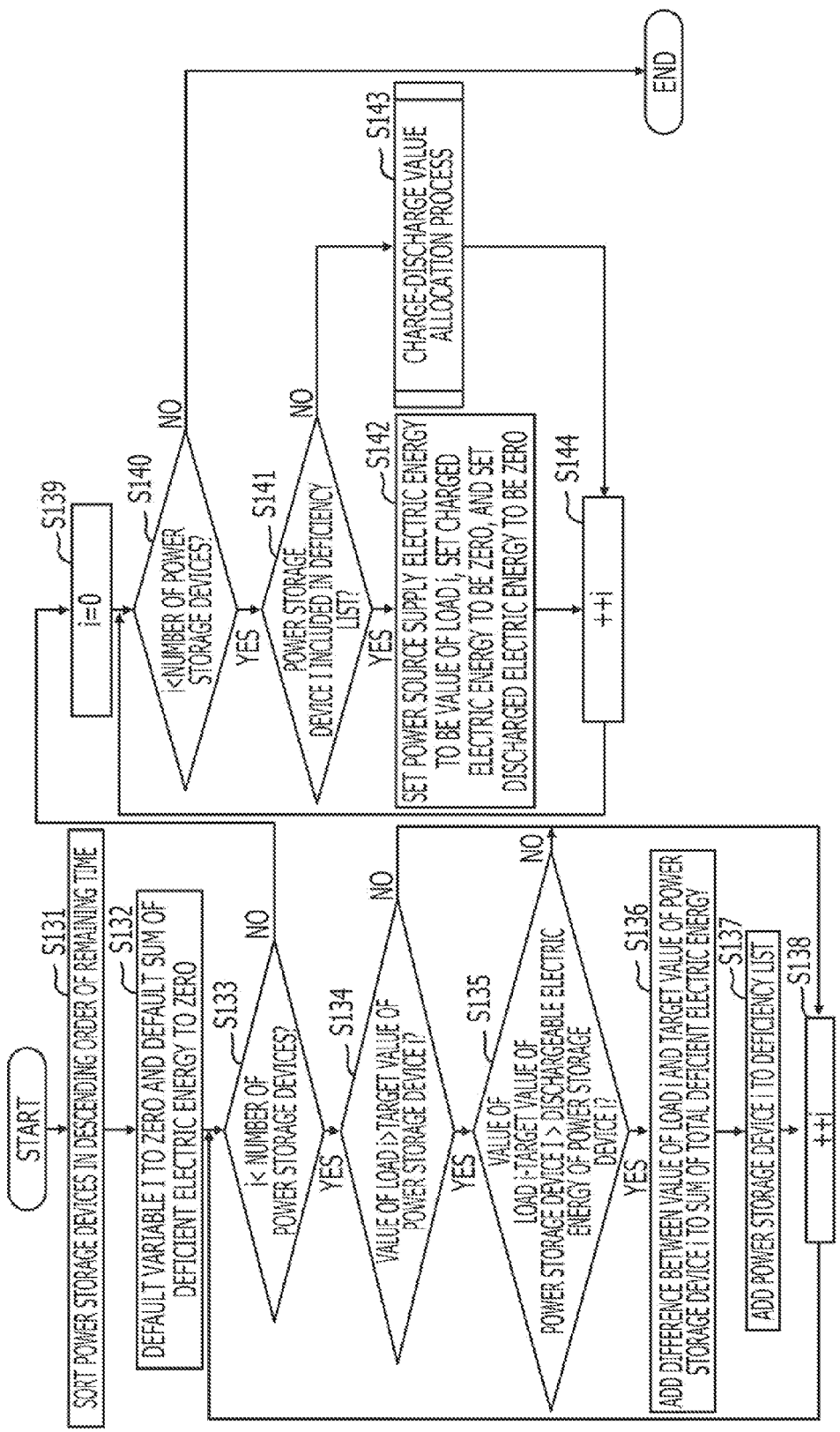
FIG. 13 is a flowchart illustrating a calculation process of a charge-discharge value in accordance with the first embodiment.

Operation S123 is described in detail below. FIG. 13 illustrates a flowchart of the calculation process of the charge-discharge value in accordance with the first embodiment.

In operation S131, the target value searcher 121 sorts the power storage devices 20 in the descending order of the remaining time of the charged electric energy (S131). In other words, the power storage device 20 having the longest remaining time comes first. The target value searcher 121 sets the first power storage device 20 in the sort order to be a process target by defaulting a variable i to zero (S132). The variable i indicates the (order) position of the power storage device 20 as a process target in the sort order. The sum of deficient electric energy is defaulted to zero.

The target value searcher 121 then performs operations S134-S137 on each power storage device 20 in the sort order (S133 and S138). In operation S134, the target value searcher 121 determines whether the value of the load to the power storage device 20 as a process target (hereinafter referred to as a target power storage device 20) is equal to or above a target value (a tentative target value) to the target power storage device 20 (S134). The target value is a maximum value of the supplied electric energy from the power network 40 as long as the battery does not run out of the stored electric energy thereof. Operation S134 is a determination operation as to whether the supplied electric energy from the power network 40 alone can entirely cover the load.

If the supplied electric energy from the power network 40 alone is unable to cover the load entirely (yes from S134), the target value searcher 121 determines whether (the value of load−the target value) is larger than the discharged electric energy of the target power storage device 20 in the control interval starting at the control time (S135). (The value of the load−the target value) is electric energy which is not covered by the supplied electric energy from the power network 40. Operation S135 is a determination operation as to whether the electric energy not covered by the supplied electric energy from the power network 40 is covered by the target power storage device 20. The dischargeable electric energy of the target power storage device 20 may be calculated based on the unit dischargeable electric energy of the power storage device 20 (the dischargeable electric energy per unit time) recorded on the power storage device information storage unit 128, the control interval, and the stored electric energy of the power storage device 20 at the control time. The stored electric energy is included as a parameter in order to account for running out of battery energy. More specifically, the dischargeable electric energy of the power storage device 20 within the control interval from the control time is (the control interval)×(the unit dischargeable electric energy). The unit dischargeable electric energy is smaller than the stored electric energy of the power storage device 20 at the control time. Equation of (the control interval)×(the unit dischargeable electric energy) is based on the premise that the control time and the unit time have the same unit time. If the control time and the unit dischargeable electric energy disagree in unit time, the calculation is performed after the unit times thereof are aligned.

If the supplied electric energy from the power network 40 alone is not covered by the dischargeable electric energy of the target power storage device 20 (yes from S135), the electric energy (the value of load−the target value) is deficient on the target power storage device 20. The target value searcher 121 thus adds (the value of load−the target value) to the sum of deficient electric energy (S136). The target value searcher 121 adds the target power storage device 20 to a deficiency list (S137). The deficiency list lists a power storage device 20 that has no stored electric energy (suffering deficient electric energy) within the control interval from the control time.

If the supplied electric energy from the power network 40 alone covers the load entirely (no from S134), or if electric energy not covered by the supplied electric energy from the power network 40 alone is covered by the dischargeable electric energy of the target power storage device 20 (no from S135), no addition is performed on the sum of deficient electric energy.

Operations S134-S137 are performed on all the power storage devices 20. The sum of deficient electric energy indicates deficient electric energy of the entire electric power leveling system 1 at the control time.

The target value searcher 121 performs operation S141 and subsequent operations on all the power storage devices 20 in the sort order of operation S131 (S139, S140, and S144). The power storage device 20 set as a process target in the loop subsequent to operation S140 is referred to a "target power storage device 20."

In operation S141, the target value searcher 121 determines whether the target power storage device 20 is included in the deficiency list. If the target power storage device 20 is included in the deficiency list (yes from S141), the target value searcher 121 sets the power source supply electric energy of the target power storage device 20 at the control time to be the value of the load of the target power storage device 20 at the control time (S142). The discharged electric energy and the charged electric energy of the target power storage device 20 at the control time are defaulted to be zero. During the control interval from the control time, the power storage device 20 takes the state like the state from time t3 to time t5 illustrated in FIGS. 9A and 9B.

If the target power storage device 20 is not included in the deficiency list (no from S141), the target value searcher 121 performs on the target power storage device 20 an allocation process of the charge-discharge value in view of the electric energy covering (S143).

If operations S141-S143 are complete on all the power storage devices 20 (no from S140), the process of FIG. 13 is complete. As a result, the power source supply electric energy, the charged electric energy, and the discharged electric energy at the control time are calculated on a per power storage device basis.

Operation S143 is described in detail below. FIG. 14 is a flowchart illustrating a charge-discharge value allocation process accounting for the electric energy covering in accordance with the first embodiment. In FIG. 14, the values of parameters changing with time are those at the control time.

In operation S151, the target value searcher 121 sets the target value of the target power storage device 20 (the tentative target value) to be a threshold value used in FIG. 14. The threshold value indicates a maximum value of the electric energy covered by the target power storage device 20.

The target value searcher 121 determines in operation S152 whether the threshold value is smaller than (the load of the target power storage device 20 (hereinafter referred to as a ("target load")+the chargeable electric energy of the target power storage device 20). If the threshold value is larger than (the load of the target power storage device 20+the chargeable electric energy of the target power storage device 20) (no from S152), the target value searcher 121 sets as a new threshold value the sum of the value of the target load and the chargeable electric energy of the target power storage device 20 (S153).

The electric energy covered by the power storage device 20 is maximized when the charging by the target power storage device 20 is restricted and when the target load is covered by only the discharging of the target power storage device 20. The covered electric energy is (the chargeable electric energy of the target power storage device 20+the value of the target load). In operation S153, the threshold value is corrected to a maximum value of the electric energy that can be covered by the target power storage device 20.

In other words, the electric energy supplied to the target power storage device 20 from the power network 40 is maximized when the target power storage device 20 performs the charging operation only, and when all the target loads are covered by the power network 40. The power source supply electric energy to the power storage device 20 from the power network 40 is (the chargeable electric energy of the target power storage device 20+the value of the target load). The maximum value of the electric energy that can be covered by the target power storage device 20 is a maximum value of the electric energy supplied to the power storage device 20 from the power network 40. The maximum value of the threshold value thus becomes (the chargeable electric energy of the target power storage device 20+the value of the target load). More specifically, the threshold value indicates the maximum value of the electric energy supplied from the power network 40 to the power storage device 20.

The chargeable electric energy of the power storage device 20 may be calculated based on the unit chargeable electric energy of the target power storage device 20 (the chargeable electric energy per unit time) recorded on the power storage device information storage unit 128, the control interval, and the stored electric energy and the capacity of the target power storage device 20. The stored electric energy and the capacity of the power storage device 20 are considered as parameters in order to account for a fully charged state of the power storage device 20. More specifically, the chargeable electric energy of the power storage device 20 within the control interval from the control time is (the control interval)×(the unit chargeable electric energy). The unit chargeable electric energy is equal to or below (the capacity of the target power storage device 20–the stored electric energy of the target power storage device 20 at the control time).

The target value searcher 121 determines whether (the threshold value–the value of the target load) is larger than the sum of deficient electric energy (S154). (The threshold value–the value of the target load) is electric energy that is originally intended to charge the target power storage device 20. In operation S154, the target value searcher 121 determines whether the sum of deficient electric energy is covered by reducing the charged electric energy to the target power storage device 20 (originally intended to charge the target power storage device 20). In other words, the target value searcher 121 determines whether the sum of deficient electric energy is covered without the need for the target power storage device 20 to discharge electric energy.

If the sum of deficient electric energy is covered by reducing the charging to the target power storage device 20 (yes from S154), the target value searcher 121 sets (the threshold value–the value of the target load–the sum of deficient electric energy) to be the charged electric energy of the target power storage device 20 at the control time (S155). In other words, electric energy resulting from subtracting covered electric energy (the sum of deficient electric energy) from the electric energy originally intended to charge the target power storage device 20 is the charged electric energy of the target power storage device 20.

The target value searcher 121 sets the power source supply electric energy of the target power storage device 20 to be the value of the target load, and set the discharged electric energy to be zero (S156). The target value searcher 121 sets the sum of deficient electric energy to be zero (S157). This is because the sum of deficient electric energy has been covered by the target power storage device 20.

If the sum of deficient electric energy is not covered by reducing the charged electric energy for the target power storage device 20 (no from S154), the target value searcher 121 determines whether the threshold value is larger than the sum of deficient electric energy (S158). In other words, the target value searcher 121 determines whether the sum of deficient electric energy is canceled by the maximum electric energy that can be covered by the power storage device 20. More specifically, if the power storage device 20 supplies electric energy to the load thereof by only the discharged electric energy thereof, the target value searcher 121 determines whether the sum of deficient electric energy is cleared.

If the sum of deficient electric energy is covered by the maximum value that can be covered by the target power storage device 20 (yes from S158), the target value searcher 121 determines whether the dischargeable electric energy of the power storage device 20 is larger than (the sum of deficient electric energy−the threshold value+the value of the target load) (S159). In other words, the target value searcher 121 determines whether the sum of deficient electric energy is covered by the discharged electric energy of the target power storage device 20. It is noted that (the sum of deficient electric energy+the value of the target load) is electric energy consumption. The threshold value is covered by electric energy supplied by the power network 40. By comparing (the sum of deficient electric energy−the threshold value+the value of the target load) with the dischargeable electric energy of the target power storage device 20, the target value searcher 121 determines whether the sum of deficient electric energy is covered by the discharged electric energy of the target power storage device 20.

If the sum of deficient electric energy is covered by the discharged electric energy of the target power storage device 20 (yes from S159), the target value searcher 121 sets the discharged electric energy of the target power storage device 20 at the control time to be (the sum of deficient electric energy−the threshold value+the value of the target load) (S160). The target value searcher 121 sets the power source supply electric energy to the target power storage device 20 to be (the threshold value−the sum of deficient electric energy), and sets the charged electric energy to be zero (S161). Although the power network 40 is originally expected to cover only the threshold value, the sum of deficient electric energy is partly covered in practice. The power source supply electric energy is thus reduced by the sum of deficient electric energy. The target value searcher 121 sets the sum of deficient electric energy to be zero (S162).

If it is difficult for the discharging of the target power storage device 20 to entirely cover the sum of deficient electric energy (no from S159), the target value searcher 121 sets the dischargeable electric energy of the target power storage device 20 to be the discharged electric energy of the target power storage device 20 (S163). In other words, the target power storage device 20 covers the sum of deficient electric energy as much as possible. The target value searcher 121 sets (the value of the target load−the dischargeable electric energy of the target power storage device 20) to be the power source supply electric energy to the power storage device 20, and sets the charged electric energy of the target power storage device 20 to be zero (S164). In other words, a load portion that the discharging of the target power storage device 20 has difficulty to fully cover is covered by the supply power from the power network 40. The target value searcher 121 subtracts from the sum of deficient electric energy (the threshold value−the value of the target load+the dischargeable electric energy of the target power storage device 20) (S165). This is because (the threshold value−the value of the target load+the dischargeable electric energy of the target power storage device 20) is covered by the power storage device 20. More specifically, (the threshold value−the value of the target load+the dischargeable electric energy of the target power storage device 20) is (the threshold value−(the value of the target load−the dischargeable electric energy of the target power storage device 20)). Here, (the value of the target load−the dischargeable electric energy of the target power storage device 20) is a load portion that the discharging of the power storage device 20 alone is difficult to cover. The target load is covered by the power network 40. The coverable maximum value, namely, (the threshold value−the value of the target load), is covered by the target power storage device 20.

If the power storage device 20 even with the maximum coverable value thereof has difficulty in covering the sum of deficient electric energy (no from S158), the target value searcher 121 determines whether the dischargeable electric energy of the target power storage device 20 is larger than the value of the target load (S166). More specifically, the target value searcher 121 determines whether all the loads are covered by the dischargeable electric energy of the target power storage device 20. If all the loads are covered by the dischargeable electric energy of the target power storage device 20 (yes from S166), the target value searcher 121 sets the value of the target load to be the discharged electric energy of the target power storage device 20 (S167). The target value searcher 121 sets the power source supply electric energy and the charged electric energy of the target power storage device 20 to be zero, respectively (S168). The target value searcher 121 subtracts the threshold value from the sum of deficient electric energy. The electric energy corresponding to the threshold value is covered by the target power storage device 20.

If the next power storage device 20 is selected as a process target of the process of FIG. 14 in accordance with the sort order (the descending order of remaining time), a value updated in the process of the power storage device 20 preceding the present power storage device 20 is used for the sum of deficient electric energy. The power storage devices 20 are selected as a electric energy sharing destination in the order of long to short remaining time.

The search process of the target value (the individual target value) has been discussed. The target value may be determined in another process, or may be empirically determined.

Discussed next is a process of leveling the electric energy consumption in the electric power leveling system 1 based on the individual target value searched by the target value searcher 121. If the process of the target value searcher 121 is a preparatory process, the process to be discussed below is a main process.

FIG. 15 is a flowchart illustrating a power supply control process performed on electric energy from the power network by the power leveling control device, and a charge-discharge control process of the power storage device in accordance with the first embodiment. The process of FIG. 15 is repeated every control interval. The control interval has been described with reference to FIG. 10.

In operation S201, the electric energy consumption information acquisition unit 122 acquires the electric energy consumption (hereinafter referred to as a "load") from the power consumption monitor 31 in each power consuming device 30 via the communication unit 11. The electric energy consumption is electric energy consumption at an immediately preceding control interval.

In succession, the stored electric energy information acquisition unit 123 acquires present stored electric energy (remaining electric energy) from each power storage device 20. The stored electric energy information acquisition unit 123 calculates the remaining time of the stored electric energy of each power storage device 20 by dividing the acquired stored electric energy by the value of the load acquired in operation S201 (S202).

The leveling control information generator 124 acquires from the target value storage unit 129 a target value for calculation process of a charge-discharge value (S203). According to the first embodiment, the individual target value for each power storage device 20 is acquired. The leveling control information generator 124 performs the calculation process of the charge-discharge value (S204). The process in operation S204 is substantially identical to the process illustrated in FIGS. 13 and 14. However, if the process of FIGS. 13 and 14 is executed in operation S204, the entity performing each operation is the leveling control information generator 124. The value of the load is the value acquired in operation S201. The remaining time of the stored electric energy is the value calculated in operation S202. The target value is not the tentative target value but the individual target value acquired in operation S203. Calculated as a result of operation S204 are the power source supply electric energy at the present control time, the charged electric energy, and the discharged electric energy for each power storage device 20.

The leveling control information transmitter 125 transmits to the power storage device 20 via the communication unit 11 the power leveling control information including the power source supply electric energy, the charged electric energy, and the discharged electric energy calculated on each power storage device 20 (S205).

The charge-discharge controller 23 in the power storage device 20 controls a charge and discharge process of the power storage unit 22 in response to information about the charged electric energy and the discharged electric energy included in the received power leveling control information. The charge-discharge controller 23 also determines electric energy of the power storage device 20, not charged thereto but supplied to the power consuming device 30, in response to information of the power source supply electric energy included in the power leveling control information.

A second embodiment is described below. The second embodiment is substantially identical to the first embodiment unless otherwise particularly noted.

According to the second embodiment, the target value searcher 121 searches for a single target value for a plurality of power storage devices 20 (hereinafter referred to as an "overall target value"). If the control process is performed in accordance with the power leveling control information, the target value searcher 121 searches for, as the overall target value, a value likely to minimize a peak value of the power source supply electric energy of the power network 40. For example, the search method to be used may be particle swarm optimization (PSO) as one of metaheuristic techniques. The overall target value is equal to or below a maximum value of electric energy supplied from the utility power source per control interval.

The control process of FIGS. 16A-16C and FIGS. 17A-17D is performed in response to the overall target value.

FIGS. 16A-16C diagrammatically illustrate the power leveling control process of the second embodiment. FIG. 16B illustrates power storage devices 20a-20d and loads a-d thereof. The loads a-d represent the electric energy consumption of power consuming devices 30a-30d, respectively. The remaining times of the stored electric energy of the power storage devices 20 in FIGS. 16A-16C and FIGS. 17A-17D are related as the power storage device $20a \leqq$ the power storage device $20 \leqq$ the power storage device $20 \leqq$ the power storage device $20d$.

FIG. 16C illustrates the values of the loads a-d by lengths of double-arrow-headed bars at time ta.

As illustrated in FIG. 16A, the overall target value is compared with the sum of the loads a-d at time ta. In FIG. 16A, the overall target value is larger than the sum of the loads. In such a case, the electric energy equal to the overall target value from the power network 40 is allocated to the loads of the power storage devices 20 and the charging of the power storage devices 20. More specifically, all the loads of the power storage devices 20 are covered by the supply power of the power network 40. None of the power storage devices 20 discharges electric energy. A remainder electric energy, e.g., (the overall target value–the sum of loads) is distributed among the power storage devices 20 with a higher priority placed on a power storage device 20 having a shorter remaining time. The power storage device 20 to be supplied with the remainder electric energy is charged with the remainder electric energy by the power network 40. As illustrated in FIG. 16A, the remainder electric energy is distributed to the power storage devices 20a and 20b.

FIGS. 17A, 17B, 17C and 17D diagrammatically illustrate the power leveling control process of the second embodiment. FIG. 17C corresponds to FIG. 16B.

FIG. 17D illustrates the values of the loads a-d by lengths of double-arrow-headed bars at time ta. Two double-arrow-headed bars are vertically aligned for the load c. As described below, the two bars are used to differentiate between electric energy supplied from the power network 40 and electric energy discharged from the power storage device 20c. A hatching manner difference between the two double-arrow-headed bars in FIG. 17D indicates different power sources to the load.

FIG. 17A illustrates the overall target value and the sum of the loads a-d at time ta. In FIG. 17A, the overall target value is smaller than the sum of the loads. In such a case, the electric energy from the power network 40 is allocated as the overall target value as much as possible. More specifically, the electric energy from the power network 40 is allocated to the power storage devices 20 with a higher priority placed on a power storage device 20 having a shorter remaining time. The power storage device 20 having electric energy allocated thereto supplies electric energy to the load thereof instead of charging itself with the electric energy allocated. On the other hand, deficient electric energy equal to (the sum of loads–the overall target value) is covered by the discharging of the power storage device 20.

Referring to FIG. 17B, the loads a and b, and part of the load c are power-supplied by the power network 40. The rest of the load c and the load d are covered by the discharging of the power storage devices 20c and 20d.

According to the second embodiment, the load allocation to the power network 40 is performed with a higher priority placed on a power storage device 20 having smaller stored electric energy such that the discharging causes no battery energy running out. In this way, the electric energy of the power storage devices 20 are generally uniformly used. The electric energy stored on the power storage devices 20 is effectively used.

The above-described process is described further in detail with reference to flowcharts as below. The search process of the overall target value is approximately identical to the search process of the first embodiment (FIG. 10). According to the second embodiment, the overall target value is one (and common) to the plurality of power storage devices 20. Operations performed on each of the plurality of power storage devices 20 in the first embodiment are to be performed on the single overall target value.

For example, a single tentative target value is set in operation S103 in FIG. 10. The number of target values in operation S111 is one. In operation S113, the target value at the preceding operations is recorded on the target value storage unit 129 as the overall target value. In operations with the individual target value used therein, the individual target value is simply replaced with the overall target value.

Figure 18:
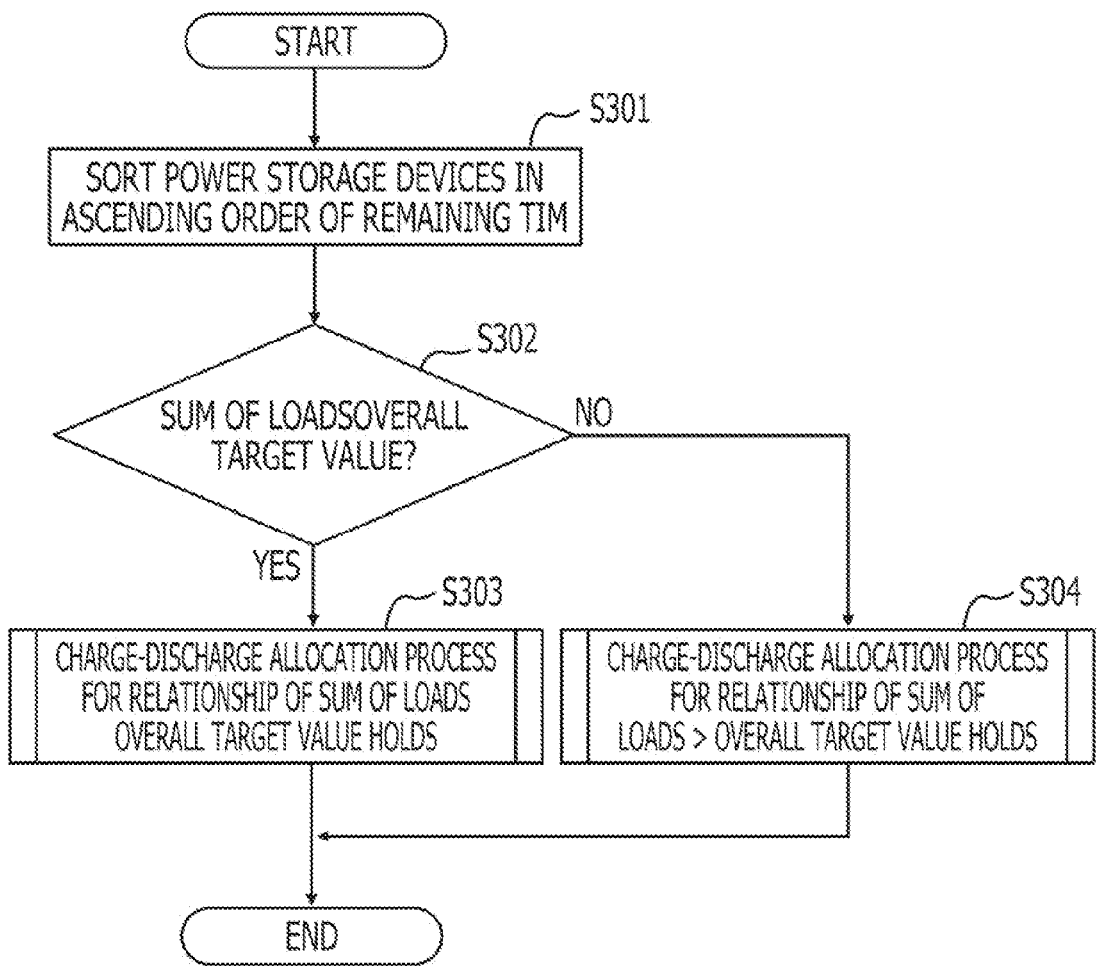
FIG. 18 is a flowchart illustrating a calculation process of a charge-discharge value of the second embodiment.

In operation S123 of FIG. 12, a process illustrated in FIG. 18 is carried out in place of the process of FIG. 13.

FIG. 18 is a flowchart illustrating the calculation process of the charge-discharge value in accordance with the second embodiment.

In operation S301, the target value searcher 121 sorts the power storage devices 20 in the ascending order of the remaining time of the stored electric energy. In other words, the power storage device 20 having the shortest remaining time comes first. The target value searcher 121 determines whether the sum of load values is equal to or below the overall target value (a single tentative target value) (S302). If the sum of load values is equal to or below the overall target value (yes from S302), the target value searcher 121 performs a charge-discharge value allocation process for the sum of load values equal to or below the overall target value (S303). More specifically, the process of FIGS. 16A-16C is performed. On the other hand, if the sum of load values is above the overall target value (no from S302), the target value searcher 121 performs a charge-discharge value allocation process for the sum of load values above the overall target value (S304). More specifically, the process of FIGS. 17A-17D is performed.

Figure 19:
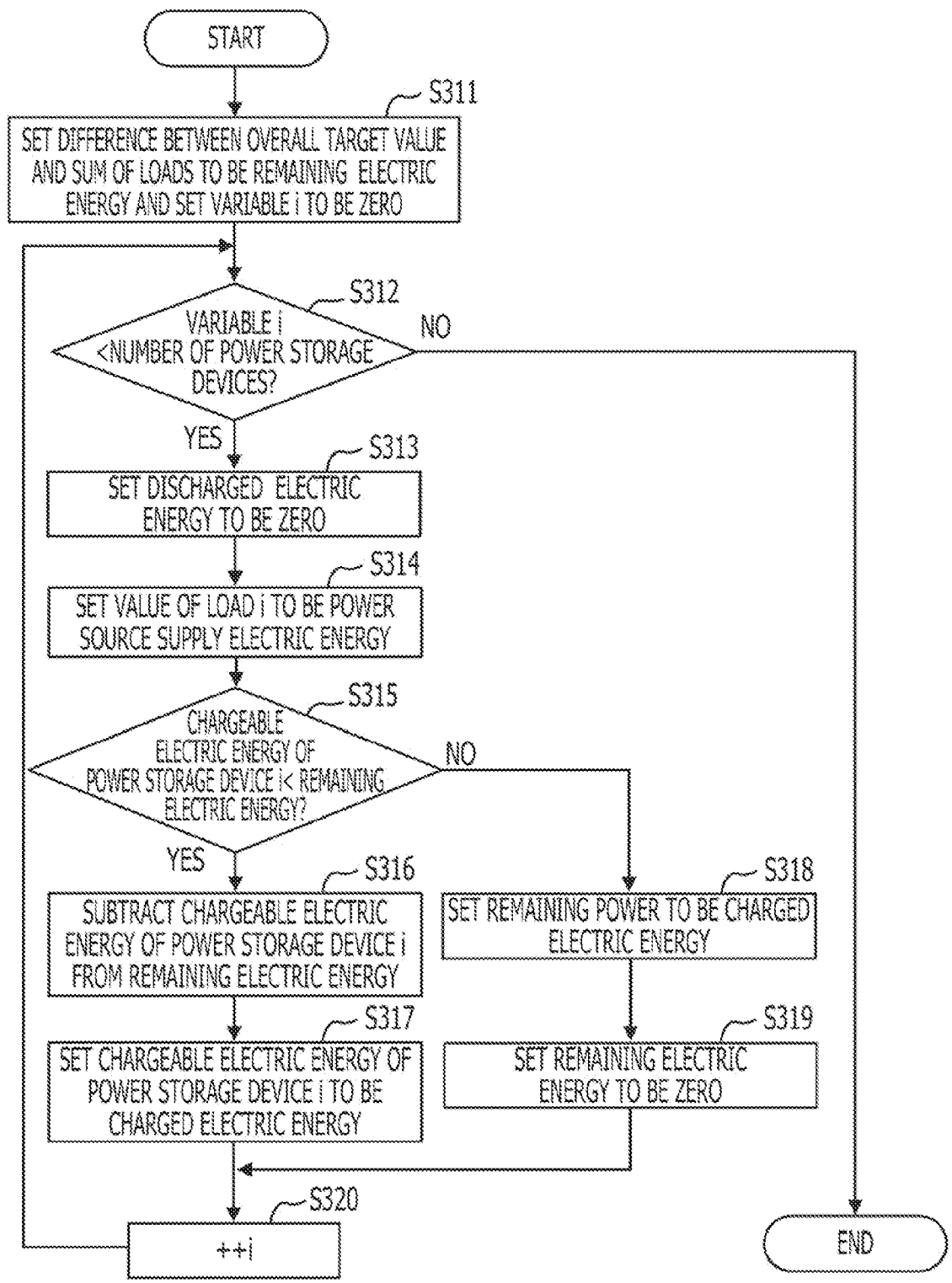
FIG. 19 is a flowchart illustrating a charge-discharge value allocation process performed when the sum of loads is equal to or below an overall target value in accordance with the second embodiment.

Operation S303 is described in detail below. FIG. 19 is a flowchart illustrating a charge-discharge value allocation process performed when the sum of loads is equal to or below an overall target value in accordance with the second embodiment.

In operation S311, the target value searcher 121 sets (the overall target value–the sum of load values) to be the remaining electric energy, and defaults a variable i to zero. The target value searcher 121 thus sets the first power storage device 20 in the sort order to be a process target (the target power storage device 20). In other words, the variable i represents the position (order) of the target power storage device 20. The remaining electric energy in FIG. 19 corresponds to the remainder in FIGS. 16A-16C. The target value searcher 121 performs operation S313 and subsequent operations on each power storage device 20 in the sort order (S312 through S320).

In operation S313, the target value searcher 121 sets the discharged electric energy of the target power storage device 20 to be zero. In the process of FIGS. 16A-16C, none of the power storage devices 20 discharge electric energy. The target value searcher 121 sets the value of the target load to be the power source supply electric energy to the target power storage device 20 (S314). This is because all the loads are covered by the supply power from the power network 40 in the process of FIGS. 16A-16C. The target value searcher 121 determines whether the chargeable electric energy of the target power storage device 20 is below the remaining electric energy (S315).

If the dischargeable electric energy of the target power storage device 20 is below the remaining electric energy (yes from S315), the target value searcher 121 subtracts the chargeable electric energy from the remaining electric energy (S316). The target value searcher 121 sets the dischargeable electric energy to be the charged electric energy of the target power storage device 20 (S317).

If the dischargeable electric energy of the target power storage device 20 is above the remaining electric energy (no from S315), the target value searcher 121 sets the overall remaining electric energy to be the charged electric energy of the target power storage device 20 (S318). The target value searcher 121 sets the remaining electric energy to zero (S319).

If operation S313 and subsequent operations are performed on all the power storage devices 20, the power source supply electric energy, the discharged electric energy, and the charged electric energy of each power storage device 20 are thus determined. Since the process of operation S313 and subsequent operations are performed in the ascending order of the remaining time of the stored electric energy, the remaining electric energy (the remainder) is allocated earlier to a power storage device 20 having a shorter remaining time.

Figure 20:
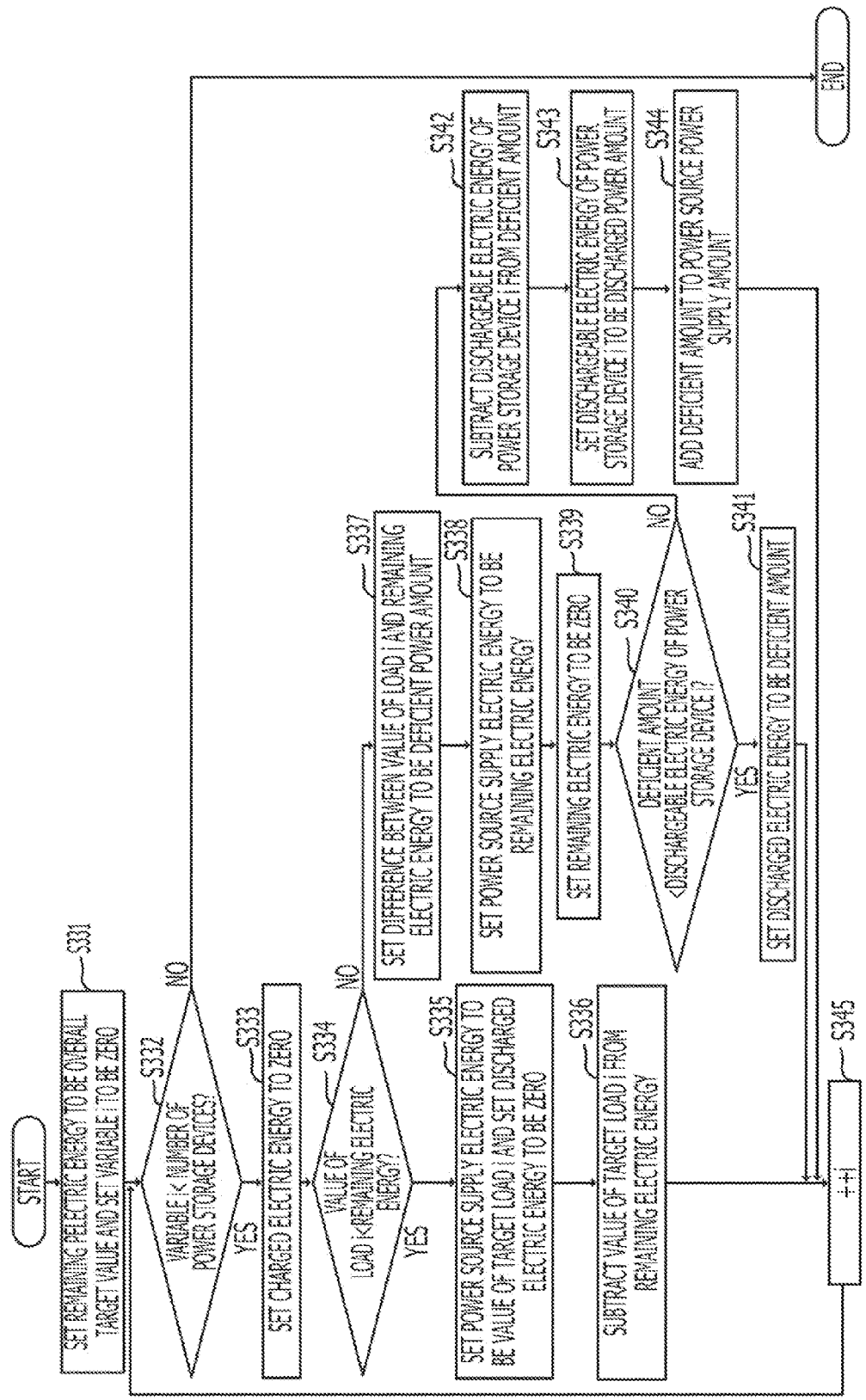
FIG. 20 is a flowchart illustrating a charge-discharge value allocation process performed when the sum of loads is above the overall target value in accordance with the second embodiment.

Operation S304 of FIG. 18 is described in detail below. FIG. 20 is a flowchart illustrating a charge-discharge value allocation process performed when the sum of loads is above the overall target value in accordance with the second embodiment.

In operation S331, the target value searcher 121 sets the overall target value to be the remaining electric energy. By defaulting the variable i to be zero, the target value searcher 121 sets the first power storage device 20 in the sort order to be a process target (the target power storage device 20). The remaining electric energy in FIG. 20 is electric energy that the power network 40 can supply. The target value searcher 121 performs operation S333 and subsequent operations (S332 through S345) on each power storage device 20 in the sort order.

In operation S333, the target value searcher 121 sets the charged electric energy of the target power storage device 20 to be zero. This is because none of the power storage devices 20 are charged in FIGS. 17A-17D. The target value searcher 121 determines whether the value of the target load is below the remaining electric energy (S334). If the value of the target load is below the remaining electric energy (yes from S334), the target value searcher 121 sets the power source supply electric energy to the target power storage device 20 to be the value of the target load and sets the discharged electric energy to be zero (S335). Since all target loads are covered by the supply power from the power network 40, the power storage device 20 is free from discharging. The target value searcher 121 subtracts the value of the target load from the remaining electric energy (S336).

If the value of the target load is equal to or above the remaining electric energy (no from S334), the target value searcher 121 sets (the value of the target load–the remaining electric energy) to be deficient electric energy (S337). The target value searcher 121 sets the remaining electric energy to be the power source supply electric energy of the target power storage device 20 (S338). The target value searcher 121 sets the remaining electric energy to be zero (S339) because the overall remaining electric energy is allocated to the target power storage device 20.

The target value searcher 121 determines whether the deficient electric energy is below the dischargeable electric energy of the target power storage device 20 (S340). In other words, the target value searcher 121 determines whether the deficient electric energy is covered by the discharging of the target power storage device 20. If the deficient electric energy is covered by the discharging of the target power storage device 20 (yes from S340), the target value searcher 121 sets the deficient electric energy to be the discharged electric energy of the target power storage device 20 (S341).

If the deficient electric energy is not covered by the discharging of the target power storage device 20 (no from S340), the target value searcher 121 subtracts the dischargeable electric energy of the target power storage device 20 from the deficient electric energy (S342). The target value searcher 121 sets the dischargeable electric energy to be the discharged electric energy of the target power storage device 20 (S343). In other words, the power storage device 20 is forced to discharge electric energy as much as possible. The target value searcher 121 adds the deficient electric energy to the power source supply electric energy of the target power storage device 20 (the value set in operation S338) (S344).

The remaining electric energy and the deficient electric energy are to be supplied by the power network 40.

If operation S333 and subsequent operations are performed on all the power storage devices 20, the power source supply electric energy, the discharged electric energy, and the charged electric energy of each power storage device 20 are determined. Since the process of operation S333 and subsequent operations are performed in the ascending order of the remaining time of the stored electric energy, the remaining electric energy (the electric energy equal to the overall target value) is allocated earlier to a power storage device 20 having a shorter remaining time. As a result, a power storage device 20 having a longer remaining time provides larger discharged electric energy.

The search process of the overall target value has been described. Discussed below are a power supply control process and a charge-discharge control process (e.g., the power leveling control process) performed by the power leveling control device 10. In response to the searched overall target value, the power leveling control device 10 performs the power supply control process on the electric energy supplied by the power network 40 and the charge-discharge control process on the power storage device 20. The power supply control process and the charge-discharge control process of the second embodiment are performed in substantially the same manner as in FIG. 15. However, the target value acquired in operation S203 is a single overall target value. In operation S204, the process of FIG. 18 is performed in place of the process of FIG. 13.

Figure 21:
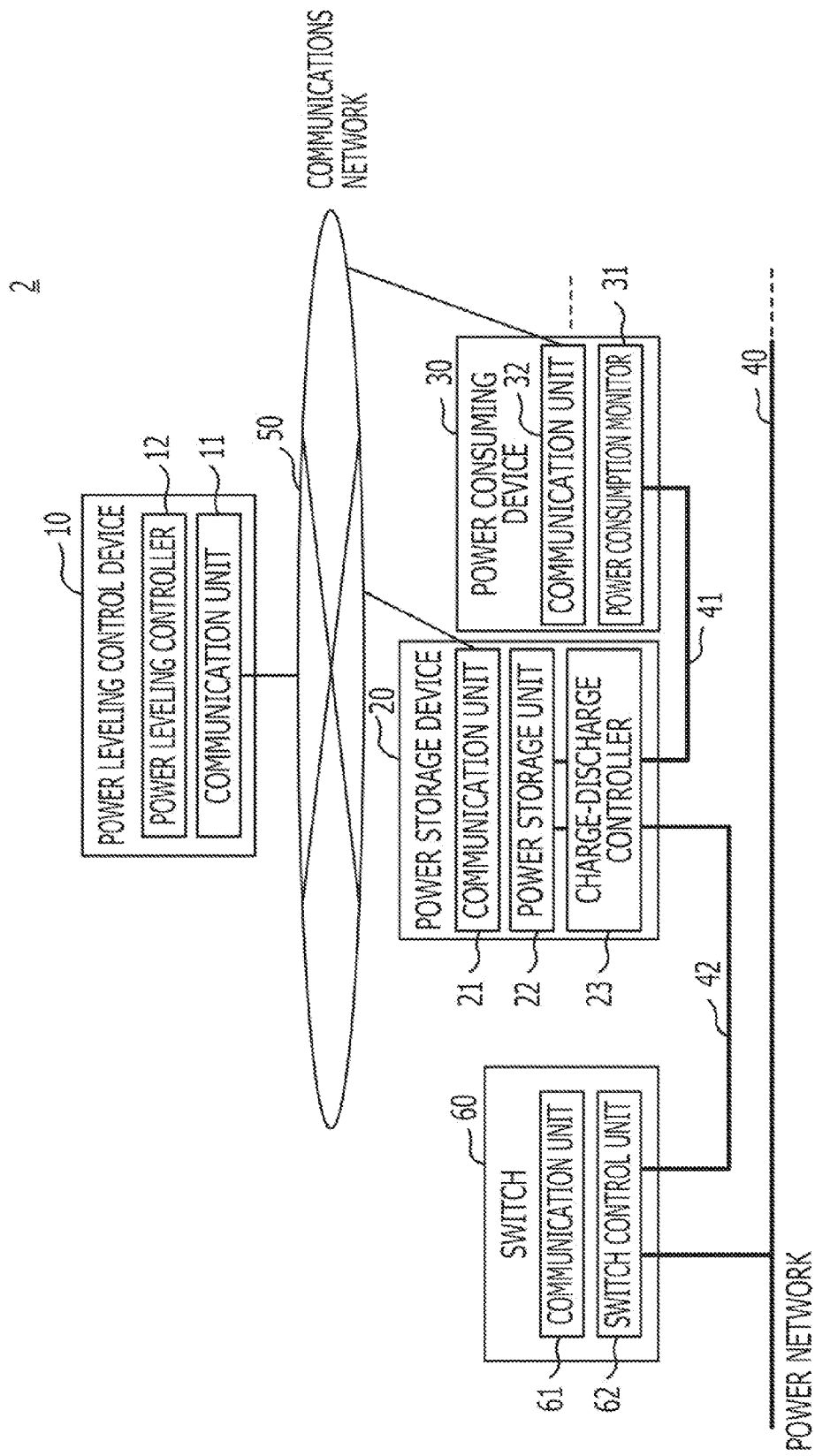
FIG. 21 illustrates a system configuration of a power leveling system of a third embodiment.

A third embodiment is described below. FIG. 21 illustrates an electric power leveling system 2 of the third embodiment. In FIG. 21, elements substantially identical to those illustrated in FIG. 3 are designated with the same reference numerals and the discussion thereof is omitted here.

As illustrated in FIG. 21, the electric power leveling system 2 further includes a switch 60. The switch 60 is arranged on each power storage device 20. The power storage device 20 is connected to the switch 60 via a power line 42 instead of to the power network 40. According to the third embodiment, the power leveling control information generated by the power leveling control device 10 is transmitted to the switch 60. The power leveling control information indicates an on or off state of the switch 60. In response to the power leveling control information, the switch 60 sets itself to be in an on state (conductive state) or an off state (non-conductive state), thereby controlling electric energy supplied to the power storage device 20 via the power line 42.

Figure 22:
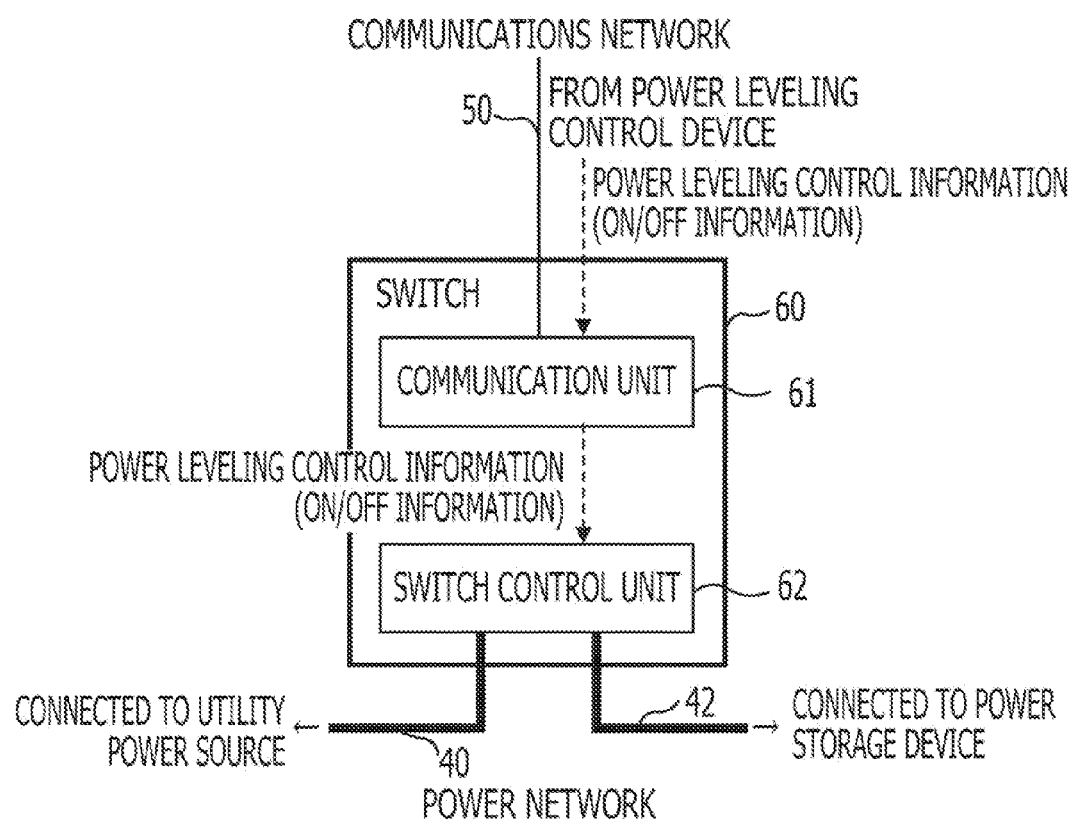
FIG. 22 illustrates a functional configuration of a switch.

FIG. 22 illustrates a functional configuration of the switch 60. As illustrated in FIG. 22, the switch 60 includes a communication unit 61 and a switch control unit 62. The communication unit 61 receives the power leveling control information from the power leveling control device 10. In response to the received power leveling control information, the switch control unit 62 set the switch 60 to be in an on state or an off state. With the switch 60 in the on state, electric energy from the power network 40 is supplied to the power storage device 20. With the switch 60 in the off state, electric energy from the power network 40 is cut off with no electric energy supplied to the power storage device 20. The switch 60 may be internal to the power storage device 20.

FIG. 23 illustrates a functional configuration of the power storage device 20 of the third embodiment. In FIG. 23, elements substantially identical to those illustrated in FIG. 4 are designated with the same reference numerals.

According to the third embodiment, the power supplying is controlled in response to the on and off states of the switch 60. If electric energy supplied from the power network 40 is detected, the charge-discharge controller 23 in the power storage device 20 charges the power storage unit 22 with constant electric energy, and supplies the remaining electric energy to the power consuming device 30. If no electric energy is detected from the power network 40, the charge-discharge controller 23 causes the power storage unit 22 to discharge electric energy needed by the power consuming device 30 to the power consuming device 30.

The switch 60 in the on state does not permit the power storage unit 22 to discharge electric energy. The switch 60 in the on state causes only the electric energy supplied from the power network 40 to be used. The switch 60 in the off state causes only the electric energy stored on the power storage unit 22 to be used. The power supply to the power consuming device 30 at any given time is carried out by the power network 40 alone or the power storage device 20 alone.

The process of the power leveling control device 10 of the third embodiment is described below. The third embodiment is substantially identical to the second embodiment unless otherwise particularly noted.

According to the third embodiment, the target value searcher 121 searches for one target value (hereinafter referred to as an "overall target value") for the electric power leveling system 2. If the control process is performed in accordance with the power leveling control information, the target value searcher 121 searches for, as the overall target value, a value likely to minimize a peak value of the power source supply electric energy of the power network 40. For example, the search method to be used may be particle swarm optimization (PSO) as one of metaheuristic techniques. The control processes of FIGS. 24A-24C and FIGS. 25A-25C is performed in response to the overall target value.

Figure 24C:
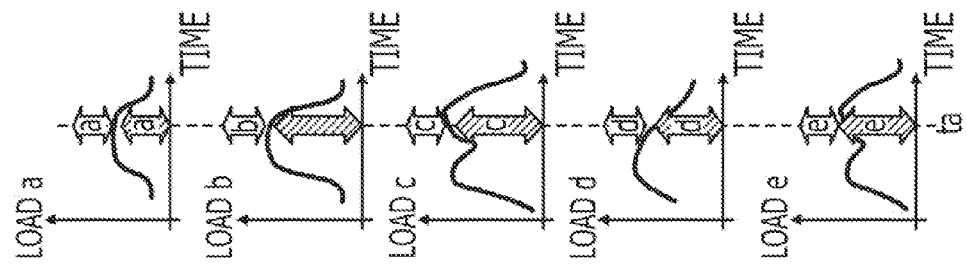
FIGS. 24A-24C diagrammatically illustrate the power leveling control process of the third embodiment.
Figure 24B:
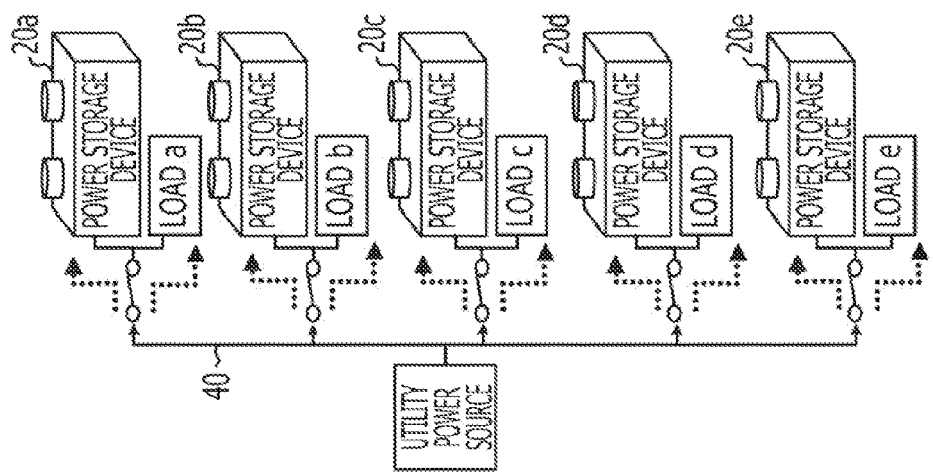
Figure 24A:
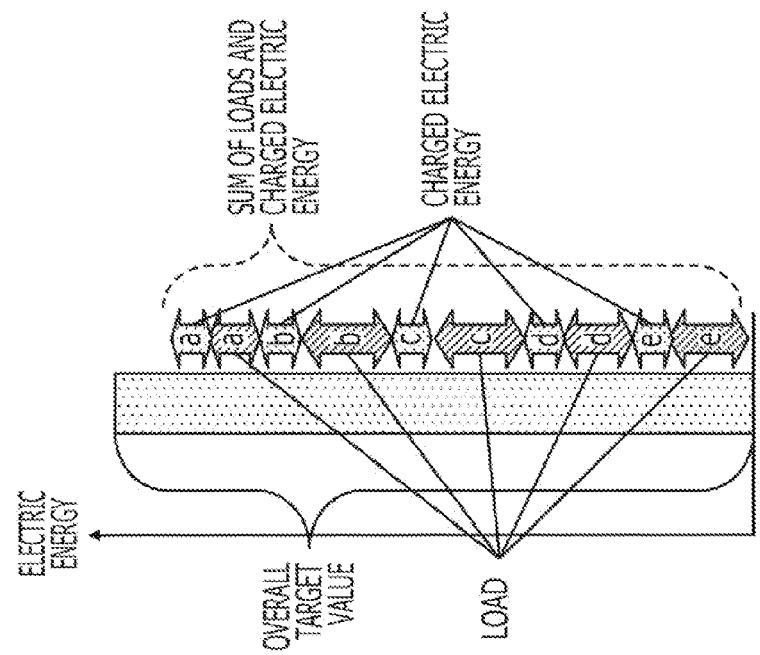

FIGS. 24A-24C diagrammatically illustrate the power leveling control process of the third embodiment. FIG. 24B illustrates power storage devices 20a-20e and loads a-e thereof. The loads a-e represent the electric energy consumption of power consuming devices 30a-30e, respectively.

FIG. 24C illustrates the values of the loads a-e and the charged electric energy to the power storage device 20a-20e by lengths of double-arrow-headed bars at time ta. A double-arrow-headed bar below a curve representing a load represents the value of the load. A double-arrow-headed bar above the curve representing the load represents the charged electric energy. A hatching manner difference between the two double-arrow-headed bars in FIG. 24C indicates different power applications of the electric energy from the power network 40 (as to whether the electric energy is used for a load or charging).

As illustrated in FIG. 24A, the overall target value is compared with the sum of the values of the loads and the charged electric energy to the power storage devices 20. As illustrated in FIG. 24A, the overall target value is larger than the sum of the loads and the charged electric energy. In such a case, the electric energy equal to the overall target value from the power network 40 is allocated to the loads of the power storage devices 20 and the charging of the power storage devices 20. In other words, all the switches 60 are turned on.

Figure 25C:
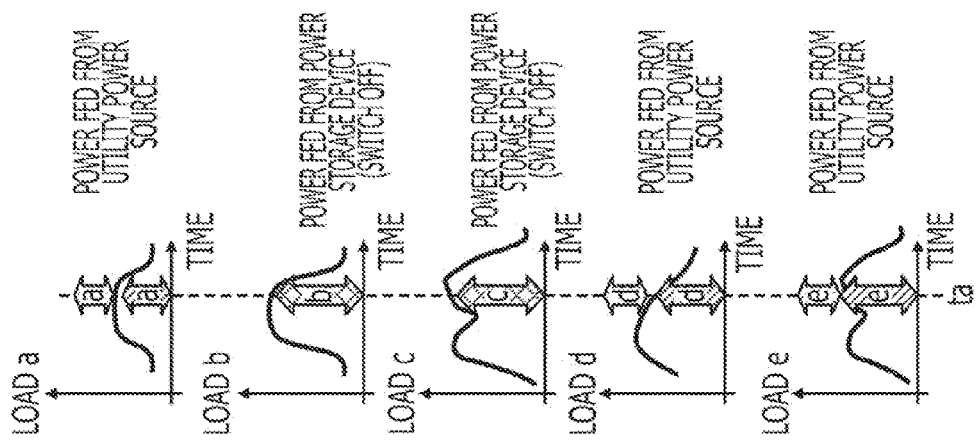
FIGS. 25A-25C diagrammatically illustrate the power leveling control process of the third embodiment.
Figure 25B:
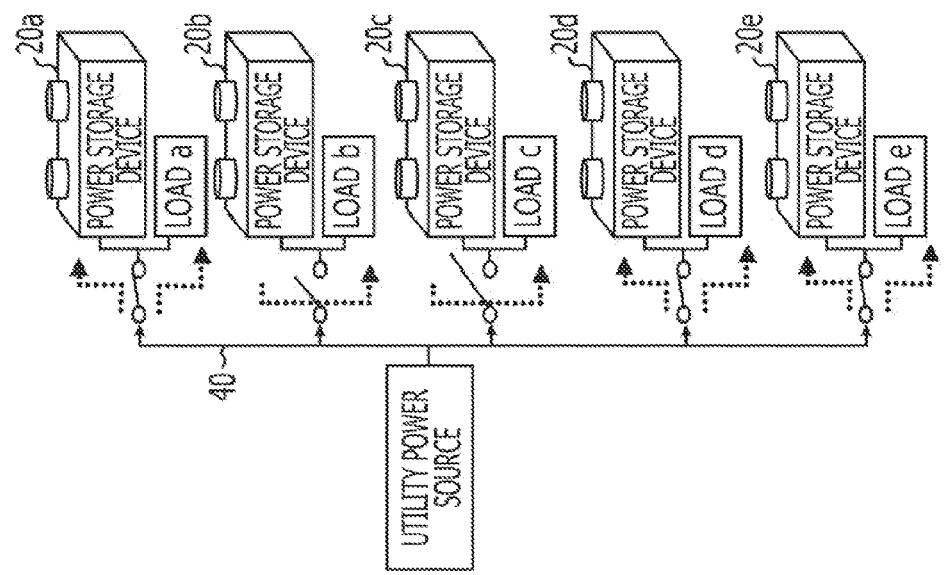
Figure 25A:
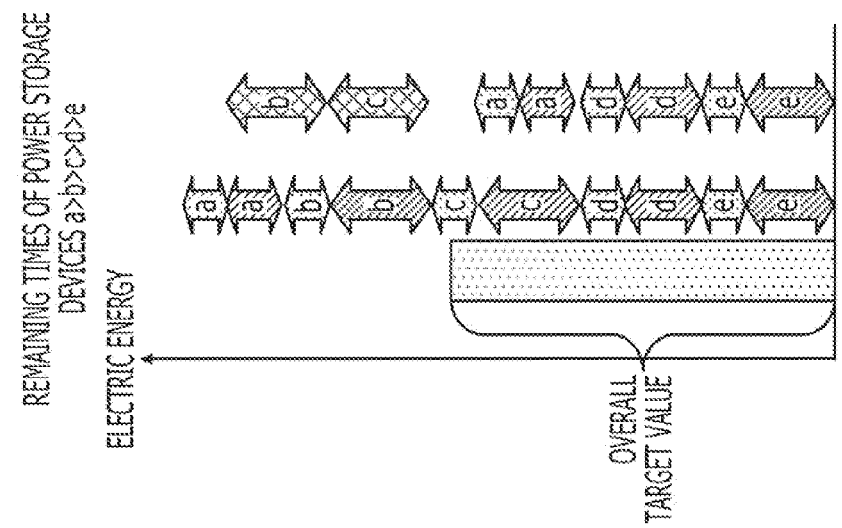

FIGS. 25A-25C diagrammatically illustrate the power leveling control process of the third embodiment. FIG. 25B-25C correspond to FIGS. 24B-24C. A hatching manner difference between the two double-arrow-headed bars of the loads in FIG. 25C indicates different power sources to the load.

As illustrated in FIG. 25A, the overall target value is compared with the sum of the values of the loads and the charged electric energy to the power storage devices 20. As illustrated in FIG. 25A, the overall target value is below the sum of the loads and the charged electric energy. In such a case, the electric energy equal to the overall target value from the power network 40 is allocated to the loads of the power storage devices 20 and the charging of the power storage devices 20 as much as possible. More specifically, in the electric energy allocation process, the electric energy corresponding to (the load+the charged electric energy of the power storage device 20) is allocated to the power storage devices 20 with a higher priority placed on a power storage device 20 having a shorter remaining time. The switch 60 corresponding to the power storage device 20 with the electric energy allocated thereto is set to be in the on state.

The electric energy equal to (the load+the charged electric energy of the power storage device 20) out of the overall target value is allocated to each power storage device 20. If the sum of allocated (loads+charged electric energy of the power storage devices 20) is above the overall target value, the power storage device 20 supplies electric energy to the remaining load. More specifically, the switch 60 corresponding to the power storage device 20 is set to be in the off state.

If (the overall target value−(the sum of allocated loads+the sum of the charged electric energy of allocated power storage devices 20))>0, e.g., if a remainder is present, the control process is performed such that the electric energy from the power network 40 is allocated to the power storage devices 20 as many as possible. More specifically, the power storage devices 20 searched for in the order of short to long remaining time are any of the power storage devices 20 having (the load+the charged electric energy of the power storage device 20) equal to or below the remainder equal to (the overall target value−(the sum of allocated loads+the sum of the charged electric energy of allocated power storage devices 20)). If such an eligible power storage device 20 is found, the remainder is allocated to that power storage device 20. In other words, the switch 60 corresponding to the power storage device 20 is set to be in the on state.

If the remaining times of the stored electric energy of the power storage devices 20 are in the order of the power storage device 20a>the power storage device 20b>the power storage device 20c>the power storage device 20d>the power storage device 20e, the electric energy from the power network 40 is allocated first to the load and the charged electric energy of the power storage device 20e. As illustrated in A-1 of FIG. 25A, the power storage devices 20c, 20b, and 20a are not eligible for the electric energy allocation from the power network 40. As for the power storage device 20c, part of (the load+the charged electric energy) is above the overall target value. According to the third embodiment, partial covering by discharging is not performed (in other words, the concurrent operations of power supplying from the power network 40 and discharging of the power storage device 20 are not carried out). The switch 60 corresponding to the power storage device 20c is thus forced to be set in the off state.

As for the power storage device 20a, (the load+the charged electric energy) fall within the remainder equal to (the overall target value−(the sum of loads of power storage devices 20d and 20e+the sum of charged electric energy of power storage devices 20d and 20e)). As illustrated in A-2 of FIG. 25A, the electric energy from the power network 40 is allocated to (the load+the charged electric energy) of the power storage device 20a.

According to the third embodiment, a power storage device 20 having smaller stored electric energy is selected for the electric energy allocation of electric energy from the power network 40 with a higher priority such that no battery energy running out occurs. A power storage device 20 having larger stored electric energy is selected for discharging electric energy to the load with a higher priority. In this way, the electric energy of the power storage devices 20 is generally uniformly used, and the electric energy stored on the power storage devices 20 are effectively used.

The above-described process is described further in more detail with reference to flowcharts. The search process of the overall target value remains unchanged from the search process of the second embodiment (FIG. 10). In operation S123 of FIG. 12, a process of FIG. 26 is performed instead of the process of FIG. 18.

Figure 26:
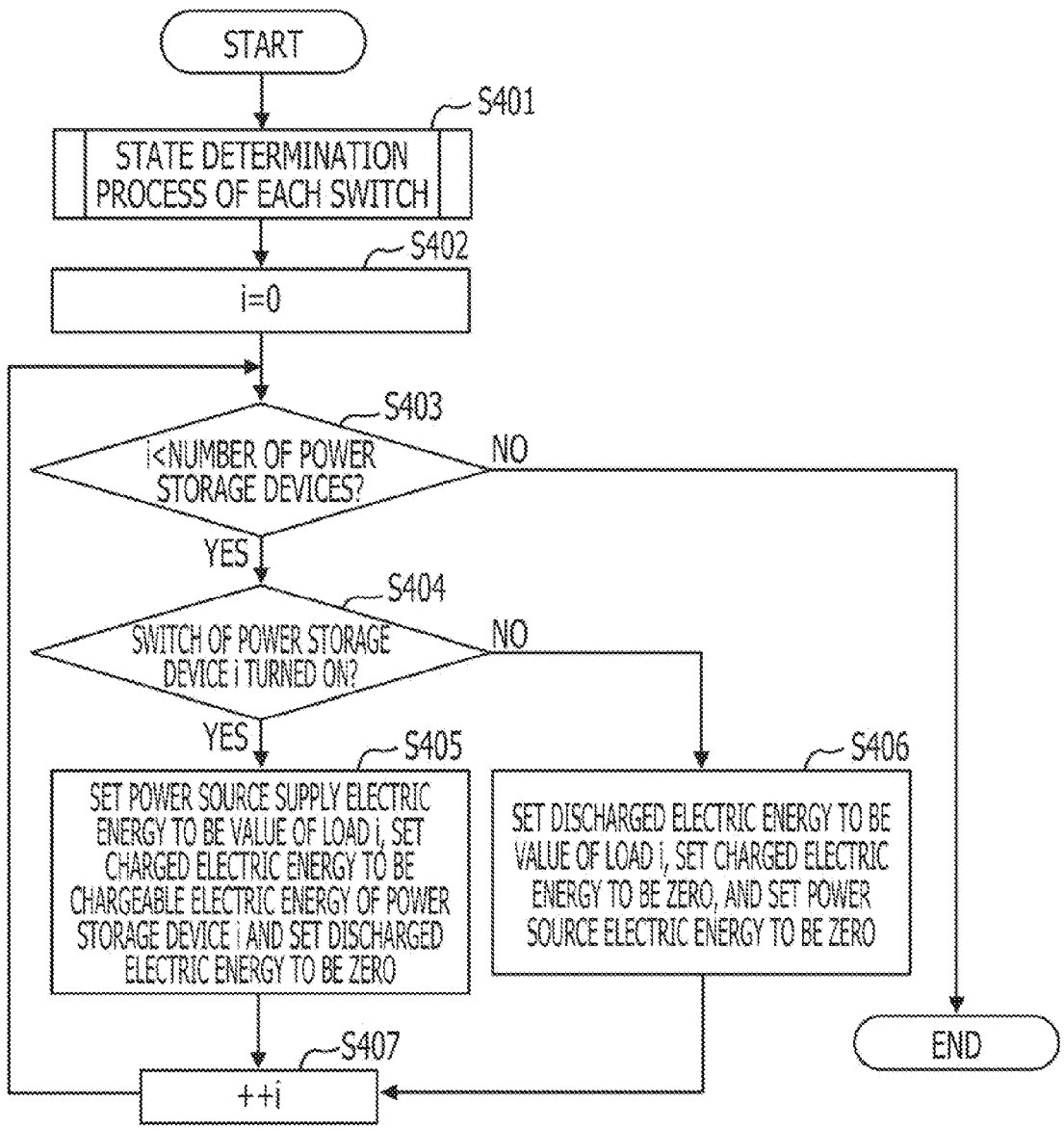
FIG. 26 is a flowchart illustrating a calculation process a charge-discharge value of the third embodiment.

FIG. 26 is a flowchart illustrating a calculation process of the charge-discharge value of the third embodiment.

In operation S401, the target value searcher 121 determines the state of each switch 60 at the control time (as to whether the switch 60 is in the on state or in the off state) (S401). Operation S401 determines the state of the switch 60 but does not control the state of the switch 60.

The target value searcher 121 performs operations S404-S406 on each power storage device 20 (S402, S403, and S407).

In operation S404, the target value searcher 121 determines whether the determination result of the switch 60 (hereinafter referred to as a "target switch 60") corresponding to the power storage device 20 as a process target (the target power storage device 20) is the on state.

If the determination result of the target switch 60 is the on state (yes from S404), the target value searcher 121 sets the value of the target load to be the power source supply electric energy of the target power storage device 20. The target value searcher 121 also sets the chargeable electric energy of the target power storage device 20 to be the charged electric energy of the target power storage device 20. The target value searcher 121 sets the discharged electric energy of the target power storage device 20 to be zero (S405).

If the determination result of the target switch 60 is the off state (no from S404), the target value searcher 121 sets the value of the target load to be the discharged electric energy of the target power storage device 20. The target value searcher 121 sets the charged electric energy of the target power storage device 20 to zero and sets the power source supply electric energy to be zero (S406).

If operations S404-S406 are complete on all the power storage devices 20 (no from S403), the charged electric energy, the discharged electric energy, and the power source supply electric energy of the power storage devices 20 are determined. According to the third embodiment, the charged electric energy, the discharged electric energy, and the power source supply electric energy are calculated to search for the overall target value, and are not used in the charge-discharge control process for power leveling. As previously described, the power leveling control information of the third embodiment indicates the on state or the off state of the switch 60.

Figure 27:
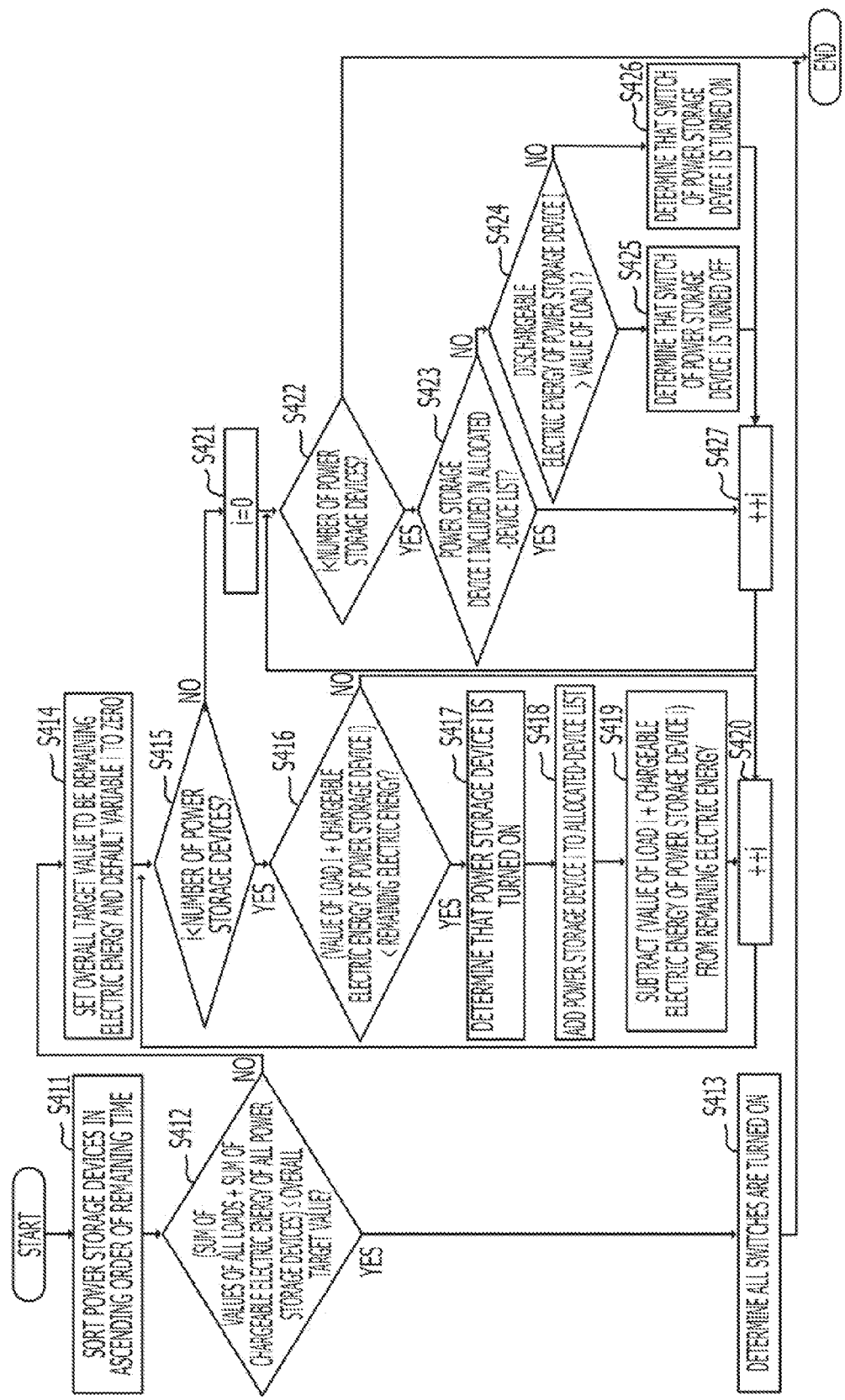
FIG. 27 is a flowchart illustrating a determination process of the state of each switch.

Operation S401 is described in detail below. FIG. 27 is a flowchart illustrating a determination process of the switch 60.

In operation S411, the target value searcher 121 sorts the power storage devices 20 in the ascending order of the remaining time of the stored electric energy. The target value searcher 121 determines whether (the sum of the values of all the loads+the sum of the dischargeable electric energy of all the power storage devices 20) is equal to or below the overall target value (tentative target value) (S412). More specifically, the target value searcher 121 determines whether the process corresponds to the process of FIGS. 24A-24C or the process of FIGS. 25A-25C. If the process corresponds to the process of FIGS. 24A-24C (yes from S412), the target value searcher 121 determines that all the switches 60 are to be set in the on state, and causes the determination results on the memory device 103 (S413).

If the process corresponds to the process of FIGS. 25A-25C (no from S412), the target value searcher 121 sets the overall target value to be the remaining electric energy (S414). The remaining electric energy indicates electric energy that the power network 40 can supply. The target value searcher 121 defaults the variable i to be zero, thereby setting the first power storage device 20 in the sort order to be a process target (the target power storage device 20). The target value searcher 121 then performs operations S416-S419 on the power storage devices 20 in the sort order (S415-S420).

In operation S416, the target value searcher 121 determines whether (the value of the load+the chargeable electric energy) is below the remaining electric energy on the target power storage device 20. If the value of the load+the chargeable electric energy) is below the remaining electric energy (yes from S416), the target value searcher 121 determines that the switch 60 corresponding to the target power storage device 20 is to be set in the on state, and records the determination results on the memory device 103 (S417). The target value searcher 121 adds the target power storage device 20 to an allocated-device list (S418). The allocated-device list includes the power storage device 20 to which the electric energy from the power network 40 is allocated. The target value searcher 121 subtracts from the remaining electric energy the electric energy allocated to the target power storage device 20 (the value of the load+the chargeable electric energy) (S419).

Since operations S416-S419 are performed on all the power storage devices 20 in the sort order, the electric energy from the power network 40 is allocated to the power storage devices 20 in the order of short to long remaining time. Even if the electric energy allocation is difficult to perform on a target power storage device 20 in the sort order, the program loop may continue, and the electric energy from the power network 40 may be allocated to a power storage device 20 having the value of (the value of the load+the chargeable electric energy) smaller than the remaining electric energy.

The target value searcher 121 performs operations S423-S426 on all the power storage devices 20 in the sort order (S421, S422, and S427).

In operation S423, the target value searcher 121 determines whether the power storage device 20 as a process target (the target power storage device 20) is included in the allocated-device list. If the target power storage device 20 is included in the allocated-device list (yes from S423), the next power storage device 20 in the order is set to be a process target (S427).

If the target power storage device 20 is not included in the allocated-device list (no from S423), the target value searcher 121 determines whether the dischargeable electric energy of the target power storage device 20 is larger than the target load (S424). If the dischargeable electric energy of the target power storage device 20 is larger than the target load (yes from S424), the target value searcher 121 determines that the switch 60 corresponding to the target power storage device 20 is to be set to the off state, and records the determination results on the memory device 103 (S425). In other words, the electric energy to the target load is to be covered by the discharged electric energy from the target power storage device 20. If the dischargeable electric energy of the target power storage device 20 is equal to or below the target load (no from S424), the target value searcher 121 determines that the switch 60 corresponding to the target power storage device 20 is to be set to the on state, and records the determination results on the memory device 103 (S426).

The search process of the threshold value has been discussed. Discussed below are a power supply control process and a charge-discharge control process (e.g., the power leveling control process) performed by the power leveling control device 10. In response to the searched overall target value, the power leveling control device 10 performs the power supply control process on the electric energy supplied by the power network 40 and the charge-discharge control process on the power storage device 20. According to the third embodiment, the switch 60 is a direct control target.

Figure 28:
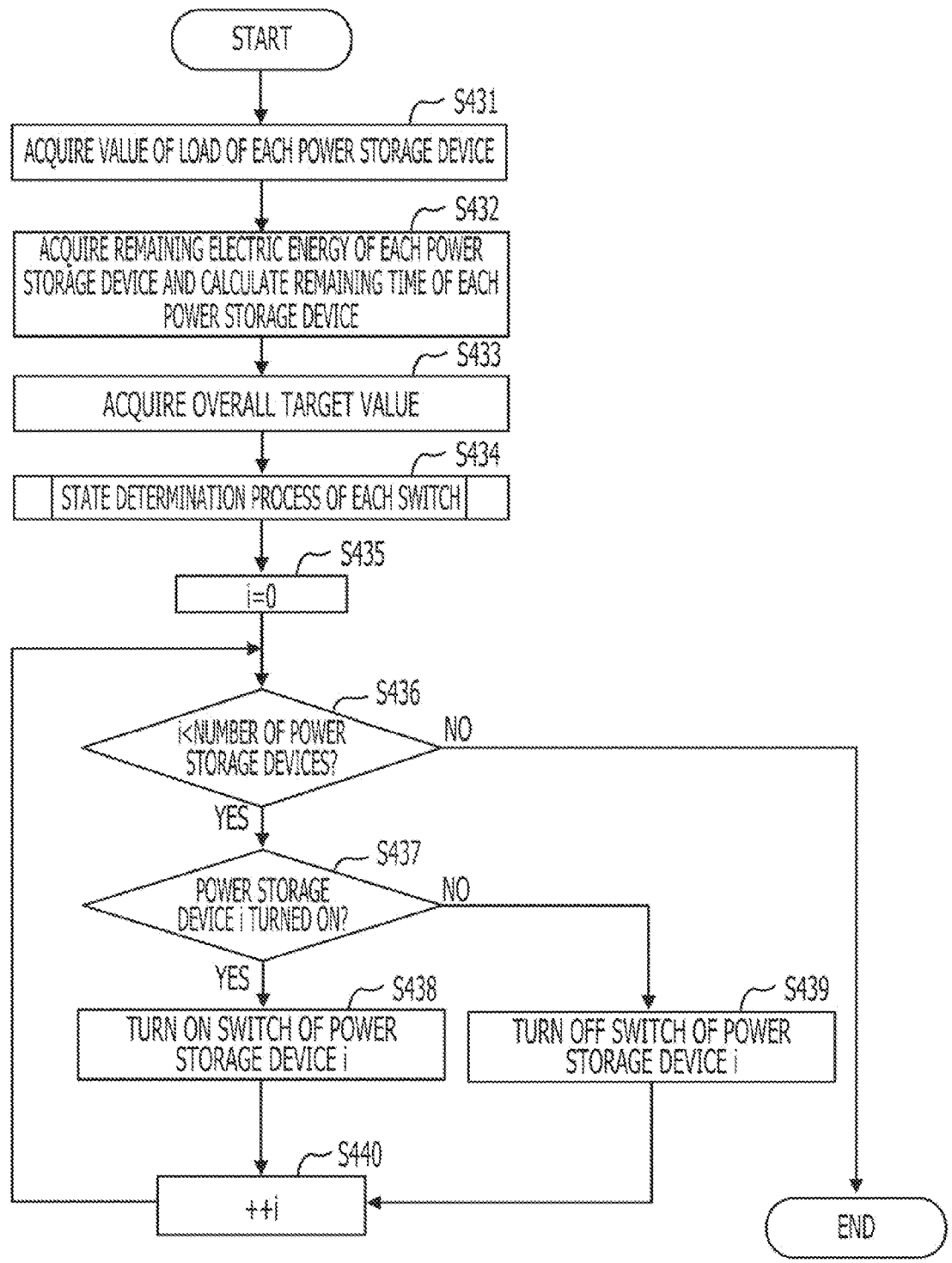
FIG. 28 is a flowchart illustrating a power supply control process performed on electric energy from the power network by the power leveling control device, and a charge-discharge control process of the power storage device in accordance with the third embodiment.

FIG. 28 is a flowchart illustrating a power supply control process performed on electric energy from the power network by the power leveling control device, and a charge-discharge control process of a power storage device in accordance with the third embodiment. The process of FIG. 28 is periodically performed every control interval.

Operations S431-S433 are substantially identical to operations S201-203 of FIG. 15, respectively. The actual value of the load and the stored electric energy at the present time are acquired from one of the power consuming device 30 and the power storage device 20. In operation S433, a single overall target value is acquired.

The leveling control information generator 124 performs a determination process of the state of the switch 60 (S434). The detailed process in operation S434 is identical to the process of FIG. 27. However, if the process of FIG. 27 is performed in operation S434, the executing entity of each operation of the process is the leveling control information generator 124. The value of the load is the value acquired in operation S431. The remaining time of the stored electric energy is the value acquired in operation S432. The target value is not an tentative target value but the overall target value acquired in operation S433. In operation S434, the leveling control information generator 124 determines the on/off state of each switch 60 at the present control time.

The leveling control information generator 124 performs operations S437-S439 (S435, S436, and S440).

In operation S437, the leveling control information generator 124 determines whether the determination result in operation S434 related to the switch 60 (the target switch 60) corresponding to the power storage device 20 as a process target (the target power storage device 20) is the on state.

If the determination result of the target switch 60 is the on state (yes from S437), the leveling control information generator 124 transmits to the switch 60 the power leveling control information indicating the on state (S438). As a result, the switch 60 is turned on, and the electric energy from the power network 40 is supplied to the power storage device 20 and the power consuming device 30 corresponding to the power storage device 20.

If the determination result of the target switch 60 is the off state (no from S437), the leveling control information generator 124 transmits to the switch 60 the power leveling control information indicating the off state (S439). As a result, the switch 60 is turned off, and the electric energy stored on the power storage unit 22 in the target power storage device 20 is supplied to the power consuming device 30 corresponding to the target power storage device 20.

A fourth embodiment is described below. According to the fourth embodiment, the switch 60 is also used as in the third embodiment. The load is supplied with electric energy from the power network 40 only or the power storage device 20 only. According to the fourth embodiment, the overall target value is searched for and an individual target value of each power storage device 20 is calculated based on the overall target value. A control process for power leveling (on/off control process of the switch 60) is performed based on the individual target value. The fourth embodiment is different from the first through third embodiments in that a peak of the instantaneous electric energy is not leveled (reduced) in the fourth embodiment. According to the fourth embodiment, a peak of electric energy accumulated for a constant period of time (every 30 minutes, for example) is minimized for a long-term period (one day, for example). The fourth embodiment is substantially identical to the third embodiment unless otherwise particularly noted.

Figure 29A:
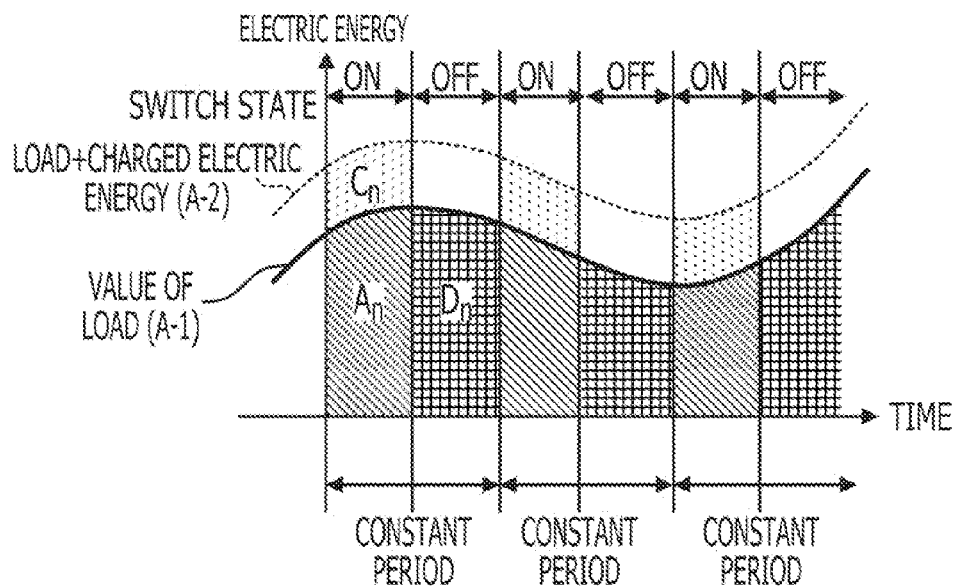
FIGS. 29A and 29B illustrate a power leveling control process of a fourth embodiment.
Figure 29B:
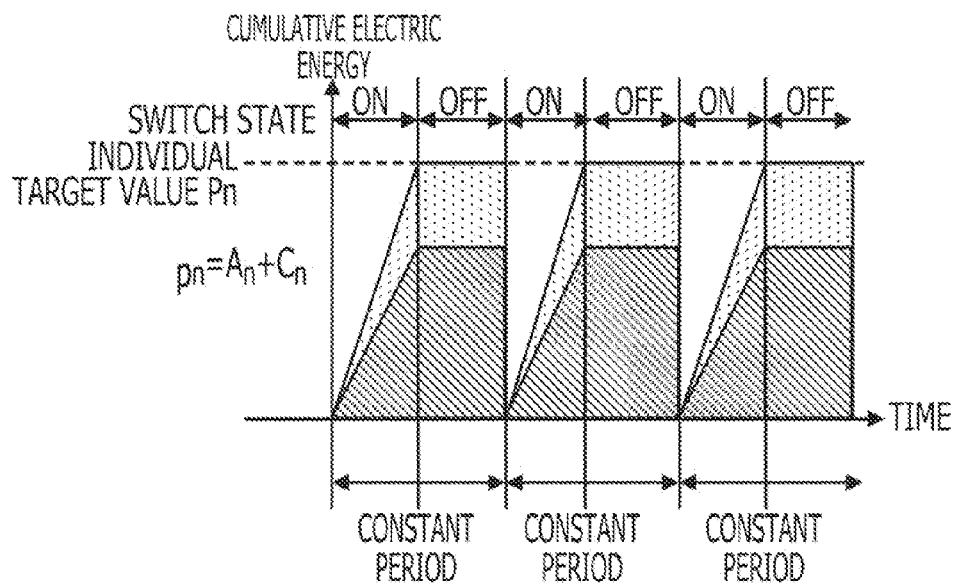

FIGS. 29A-29B generally illustrate a power leveling control process of the fourth embodiment. FIG. 29A illustrates a curve A-1 representing a transition of the value of a load to a single power storage device 20 with time and a curve A-2 representing a transition of a value with time resulting from adding the charged electric energy of the power storage device 20 to the value of the load. In the curve A-2, the charged electric energy indicated by the curve A-2 does not occur during a period of the switch 60 in the off state (hereinafter referred to as an "off period"). In the curve A-1, the load with the switch 60 in the on state (during the "on period") is covered by the electric energy supplied from the power network 40. The load during the off period is covered by the discharged electric energy from the power storage device 20.

FIG. 29B illustrates electric energy resulting from integrating every a constant period electric energy and charged electric energy supplied to the load from the power network 40. The charged electric energy here is also electric energy supplied from the power network 40. FIG. 29B illustrates a transition of the cumulative value of the electric energy supplied from the power network 40 over the constant period.

As clear from FIG. 29B, the cumulative value rises during the on period and flattens out during the off period. During the off period, no electric energy is supplied from the power network 40. According to the fourth embodiment, the peak of the cumulative value is controlled to be equal or below the individual target value. As illustrated in FIG. 29B, the individual target value $p_n$ is related as being $p_n=An+Cn$. In this equation, An represents supply electric energy for the constant period to the load of a power storage device $20n$, and Cn is charged electric energy by the power storage device $20n$ for the constant period. Here, An indicates an area of the curve A-1 during the on period in FIG. 29A, and Cn is obtained by subtracting An during the on period from the area of the curve A-2 during the on period.

The sum of individual target values equals the overall target value, and the individual target value is set such that the stored electric energy of the power storage devices 20 become equal to each other after the constant period if the power leveling control process to be discussed later is performed. More specifically, the individual target value $p_n$ is calculated every constant period in accordance with the following equation (1):

$$p_e = \frac{L_n}{\sum_i L_i}\left(P_0 + \sum_i B_i\right) - B_n \quad (1)$$

Parameters in equation (1) are defined as below. $P_0$ represents an overall target value, $p_n$ represents an individual target value of the power storage device $20n$, Ln represents a value of the load of the power storage device $20n$ for the constant period, and Bn represents the stored electric energy of the power storage device $20n$ at the start of the constant period.

According to equation (1), the individual target value $p_n$ of a given power storage device 20 is calculated by multiplying the sum of the overall target value and the sum of stored electric energy by a ratio of the load of the power storage device 20 to the sum of loads, and subtracting from the product the stored electric energy of the power storage device 20.

However, if a power storage device 20 having $p_n<0$ is present, the individual target value $p_n$ of the power storage device 20 is reset to $p_n=0$.

If the individual target value $p_n$ is reset, the individual target values of the remaining power storage devices 20 are re-calculated in accordance with equation (1) except for the value of the load and the stored electric energy of the power storage device 20. The recalculation process is repeated until a power storage device 20 having $p_n<0$ is not present anymore.

If a power storage device 20 having $p_n>Ln+Cn$ is present, the individual target value $p_n$ of the power storage device 20 is re-calculated as follows: pn=Ln+Cn where Cn is the charged electric energy of the power storage device $20n$ for the constant period of time.

A remainder $(p_n-(Ln+Cn))$ of the supply electric energy to the individual target value $p_n$ of the power storage device 20 is supplied to another power storage device 20 having smaller stored electric energy.

In response to the individual target value thus calculated, the corresponding switch 60 remains continuously on until the electric energy consumption supplied from the power network 40 for the constant period on each power storage device 20 reaches the individual target value. At the moment the electric energy consumption reaches the individual target value, the switch 60 is turned off. As a result, the power storage device 20 discharges electric energy to the load. The calculation of the individual target value of each power storage device 20 is performed at the start of the constant period.

According to the fourth embodiment, the individual target values are calculated such that the stored electric energy of the power storage devices 20 are equal to each other, and the control process is performed in response to the calculated individual target value. The electric energy of the power storage devices 20 is generally uniformly used, and the stored electric energy is effectively used.

The above-described process is described in detail below.

Figure 30:
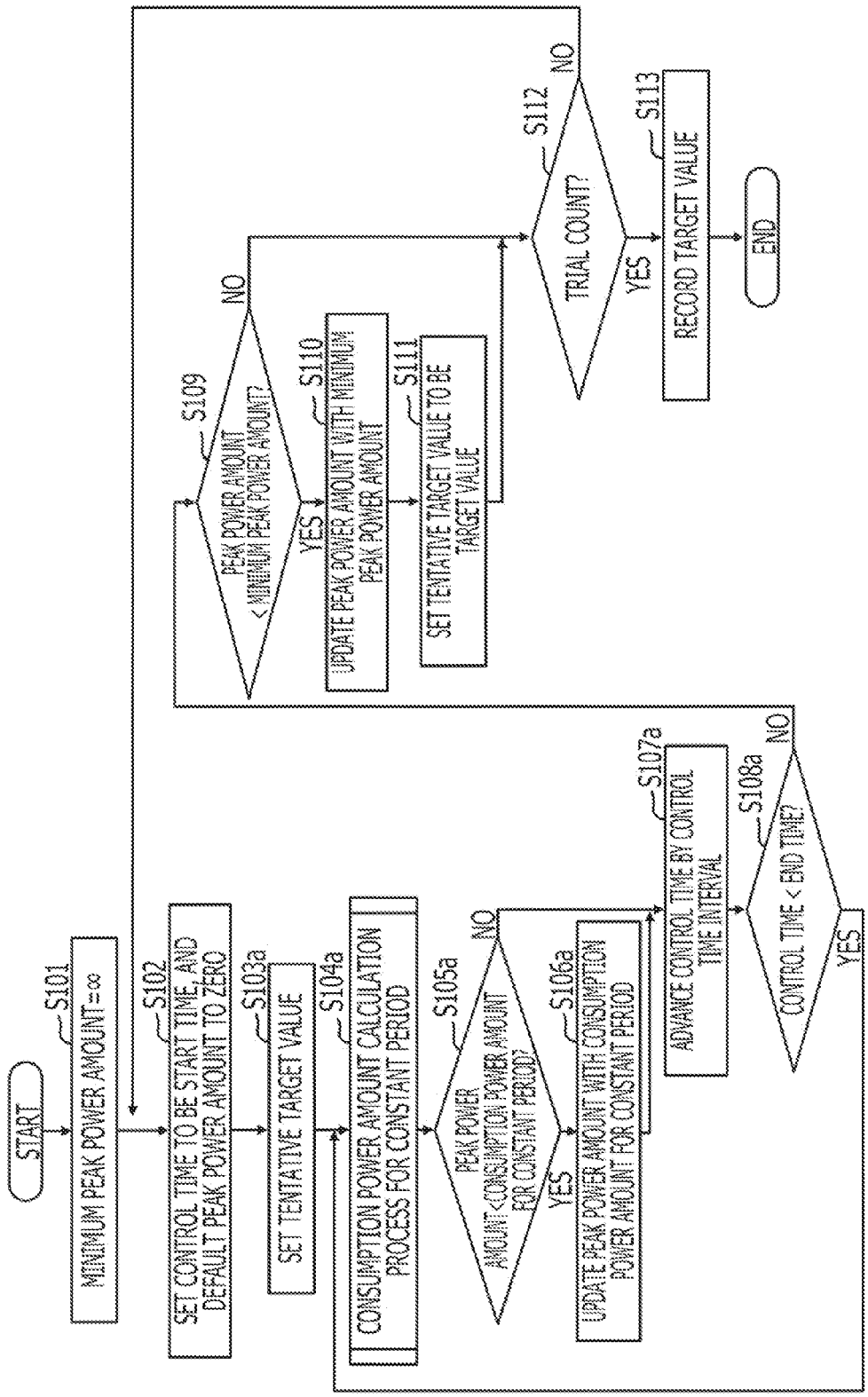
FIG. 30 is a flowchart illustrating a search process of an overall target value performed by a power leveling control device of the fourth embodiment.

FIG. 30 is a flowchart illustrating a search process of the overall target value performed by the power leveling control device of the fourth embodiment. In FIG. 30, operations substantially identical to those in FIG. 10 are designated with the same operation numbers, and the discussion thereof is omitted as appropriate.

In operation S103a, the target value searcher 121 sets a single tentative target value for the overall target value. The target value searcher 121 calculates the electric energy consumption from the power network 40 during the constant period from the control time in accordance with the tentative target value, the electric energy consumption information storage unit 126, and the power storage device information storage unit 128 (S104a). An+Cn in FIGS. 29A and 29B is calculated on each power storage device 20, and the resulting sum is calculated as the electric energy consumption from the power network 40 for the constant period. The constant period here is substantially identical to the constant period in the discussion of FIGS. 29A and 29B. In the discussion of the fourth embodiment, the "constant period" has substantially the same meaning. The constant period is preset.

The target value searcher 121 compares the calculated electric energy consumption for the constant period with the peak value of electric energy (S105a). If the electric energy consumption is larger than the peak value of electric energy (yes from S105a), the target value searcher 121 updates the peak value of electric energy with the electric energy consumption for the constant period (S106a). If the electric energy consumption is smaller than the peak value of electric energy (no from S105a), the peak value of electric energy is not updated. The target value searcher 121 advances the control time by the constant period (S107), and repeats operation S104a and subsequent operations.

Subsequent operations are substantially identical to those in FIG. 10, and the discussion thereof is omitted. At the end of the process of FIG. 30, the overall target value minimizing the electric energy consumption for the constant period is searched, and stored on the target value storage unit 129.

Figure 31:
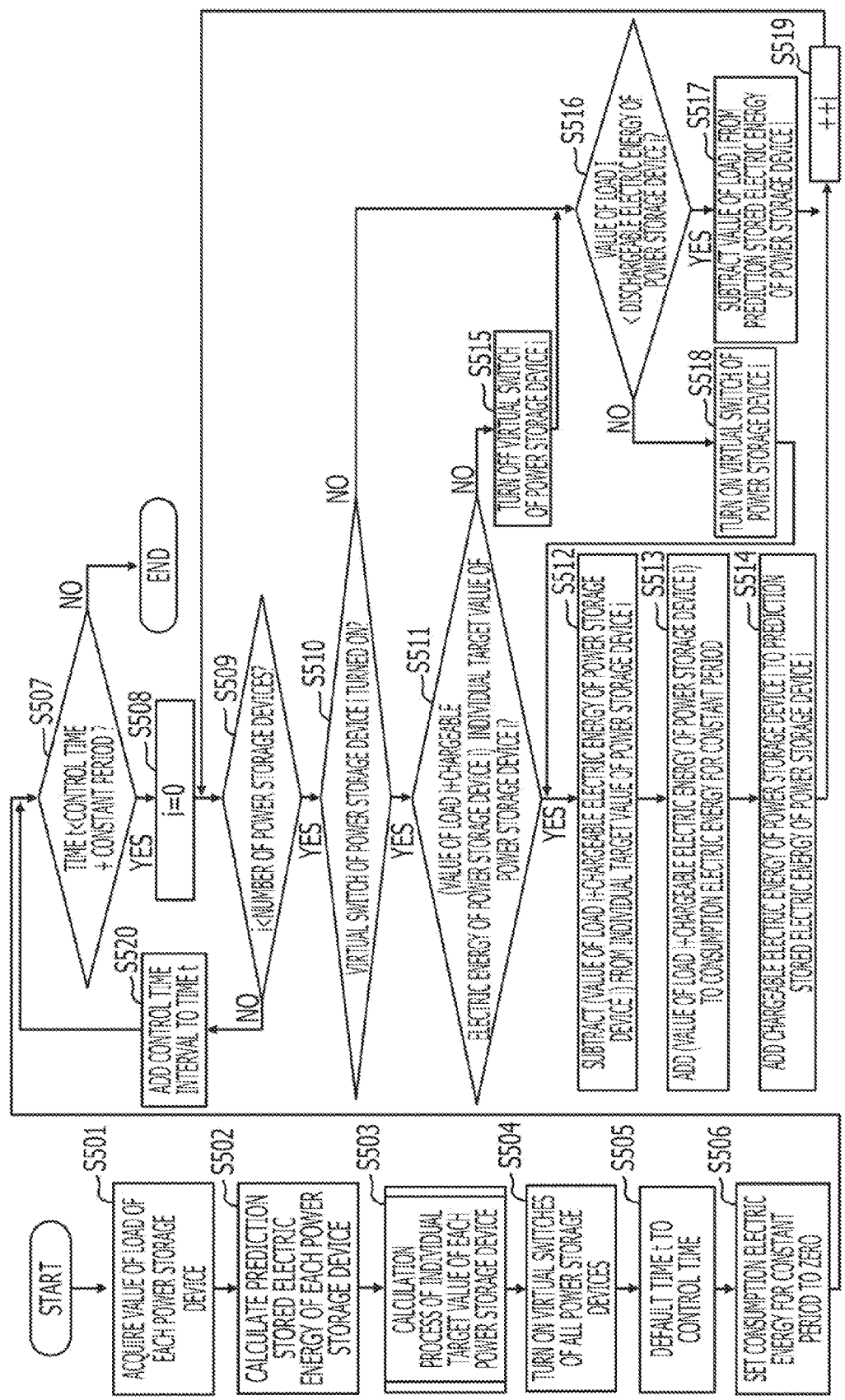
FIG. 31 is a flowchart illustrating a calculation process of electric energy consumption for a constant period from the power network in accordance with the fourth embodiment.

Operation S104a is described below in detail. FIG. 31 is a flowchart illustrating the calculation process of electric energy consumption for the constant period from the power network in accordance with the fourth embodiment.

In operation S501, the target value searcher 121 acquires the value of the load of each power storage device 20 recorded at the control time on the electric energy consumption information storage unit 126, and sets the value of the load to be the value of the load to the power storage device 20. The target value searcher 121 then acquires prediction stored electric energy of the power storage device 20 (S502). The prediction stored electric energy of the power storage device 20 in operation S104a executed at the time of a first loop is the capacity of the power storage device 20 in FIG. 30.

The target value searcher 121 performs the calculation process of the individual target value to each power storage device 20 (S503). The target value searcher 121 turns on the virtual switches of all the power storage devices 20 (S504). The virtual switch is a variable for storing the state of each switch 60. The phrase "virtual switch" is used to clarify that the virtual switch does not actually control the state of the switch 60.

The target value searcher 121 defaults, to control time, time t that advances by control interval unit within the constant time from the control time (S505). The target value searcher 121 defaults, to zero, the electric energy consumption for the constant period as the output value of the process of FIG. 31 (S506).

The target value searcher 121 performs operation S508 and subsequent operations at every control interval for the constant period from the control time (S507 and S520). In operation S508 and subsequent operations, the target value searcher 121 performs operation S510 and subsequent operations on each power storage device 20 (S508, S509, and S519). More specifically, operations S510-S518 are performed on all the power storage devices 20 every control interval within the constant period from the control time.

In operation S510, the target value searcher 121 determines whether the virtual switch of the switch 60 (the target switch 60) corresponding to the power storage device 20 as a process target (the target power storage device 20) is in the on state (S510). All the virtual switches are set to be in the on state in operation S504. The determination in operation S510 is affirmative (yes) if operation S510 is first performed on each power storage device 20.

If the virtual switch of the switch 60 is in the on state (yes from S510), the target value searcher 121 determines whether (the value of the target load+the chargeable electric energy of the target power storage device 20) is equal to or below the individual target value of the target power storage device 20 (hereinafter referred to as a "device individual target value" (S511). The value of the target load is the value recorded on the electric energy consumption information storage unit 126 at time t. The chargeable electric energy is chargeable electric energy in the control interval from time t.

If (the value of the target load+the chargeable electric energy of the target power storage device 20) is equal to or below the device individual target value (yes from S511), the target value searcher 121 subtracts (the value of the target load+the chargeable electric energy of the target power storage device 20) from the device individual target value (S512). Here, (the value of the target load+the chargeable electric energy of the target power storage device 20) is the consumption electric energy from the power network 40 in the control interval from time t. In operation S512, the target value searcher 121 subtracts the electric energy consumption from the device individual target value.

The target value searcher 121 adds (the value of the target load+the chargeable electric energy of the target power storage device 20) to the electric energy consumption for the constant period (S513). The target value searcher 121 adds the chargeable electric energy to the prediction stored electric energy of the target power storage device 20 (S514).

If (the value of the target load+the chargeable electric energy of the target power storage device 20) is above the device individual target value (no from S511), e.g., if the cumulative value of the electric energy consumption for the constant period is above an initial individual target value, the target value searcher 121 turns off the virtual switch of the target power storage device 20 (S515). The initial individual target value indicates the individual target value calculated in operation S503. More specifically, the initial individual target value is an individual target value in the initial state not having undergone the subtraction in operation S512.

The target value searcher 121 determines whether the value of the target load is below the dischargeable electric energy of the target power storage device 20 (S516). The dischargeable electric energy is dischargeable electric energy in the control interval from time t. If the value of the target load is below the dischargeable electric energy of the target power storage device 20 (yes from S516), the target value searcher 121 subtracts the value of the target load from the prediction stored electric energy of the target power storage device 20 (S517). The discharging of the target power storage device 20 causes the stored electric energy of the target power storage device 20 to be reduced by the target load.

If the value of the target load is equal to or above the dischargeable electric energy of the target power storage device 20 (no from S516), the target value searcher 121 causes the virtual switch of the target power storage device 20 to be turned on (S518). Since the target load is not covered by the discharging of the target power storage device 20 alone, the supplying from the power network 40 is made possible.

The process of operations S510-S518 is performed on each power storage device 20 every control interval within the constant period from the control time. The electric energy consumption for the constant period from the control time is thus calculated. The electric energy consumption for the constant period is the electric energy consumption of the entire electric power leveling system 2.

Figure 32:
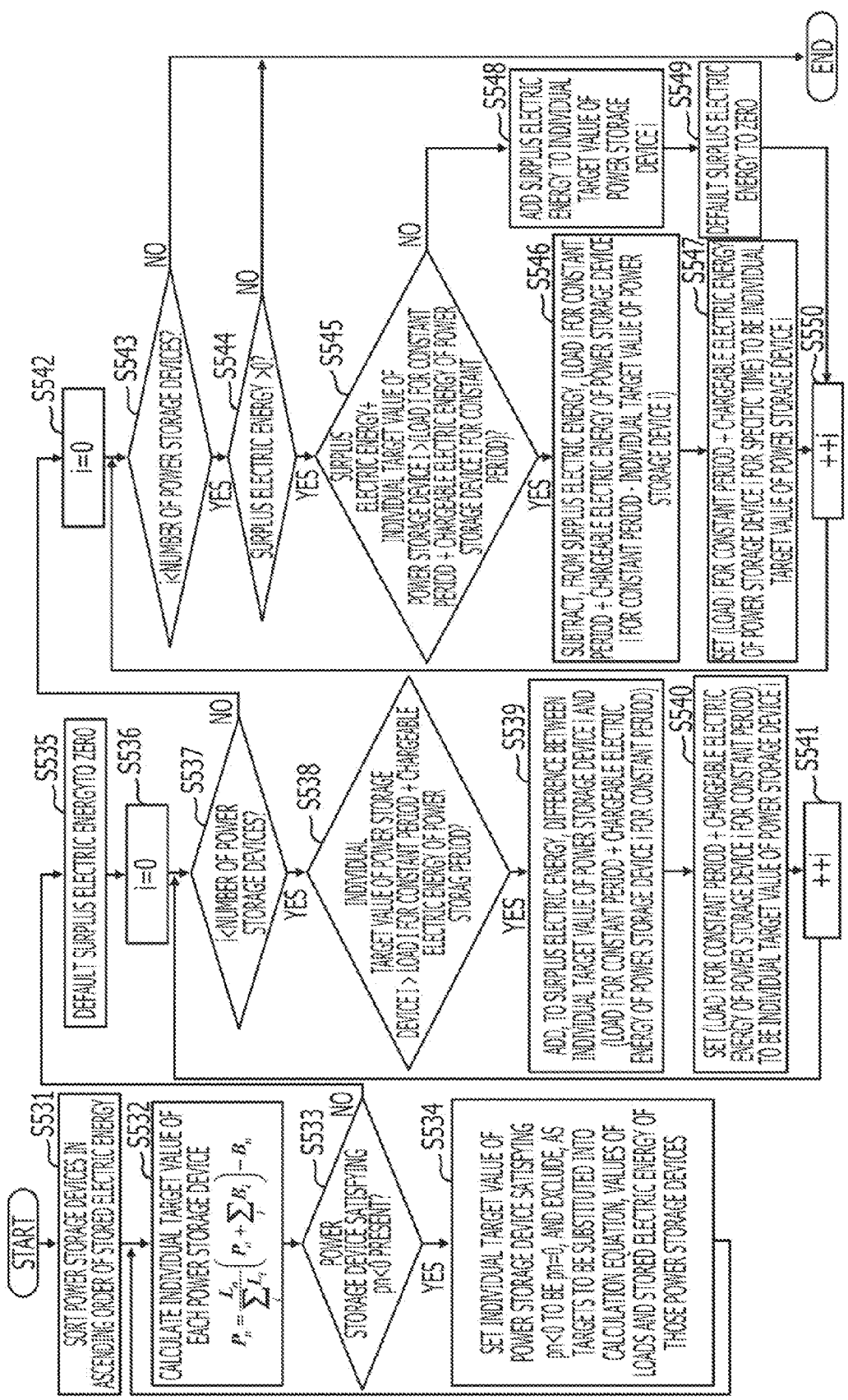
FIG. 32 is a flowchart illustrating a calculation process of an individual target value of each power storage device of the fourth embodiment.

Operation S503 is described in detail below. FIG. 32 is a flowchart illustrating the calculation process of an individual target value of each power storage device of the fourth embodiment.

In operation S531, the target value searcher 121 sorts the power storage devices 20 in the ascending order of the remaining time of the stored electric energy. The target value searcher 121 calculates an individual target value $p_n$ of each power storage device 20 in accordance with equation (1) (S532). The tentative target value is substituted for the overall target value $P_0$. The target value searcher 121 determines whether a power storage device 20 having an individual target value below zero is present (S533). If such a power storage device 20 is present (yes from S533), the target value searcher 121 causes the power storage device 20 having the individual target value below zero to have an individual target value of zero. The target value searcher 121 excludes, as a target to be substituted into equation (1), the value of the load for the constant period from the control time and the stored electric energy at the control time related to the power storage device 20 having the individual target value set to zero (S534), and then re-calculates the individual target value (S532). Operations S532-S534 are repeated until a power storage device 20 having $p_n<0$ is not present anymore.

If the individual target values larger than zero are set on all the power storage devices 20 (no from S533), the target value searcher 121 defaults surplus electric energy to zero (S535). The surplus electric energy is excess electric energy supplied above the individual target value. The target value searcher 121 performs operations S538-S540 on all the power storage devices 20 in the sort order (S536, S537, and S541).

In operation S538, the target value searcher 121 determines whether the individual target value of the power storage device 20 as a process target (the target power storage device 20) is larger than the sum of the value of the load (the target load) for the target power storage device 20 for the constant period from the control time and the chargeable electric energy of the target power storage device 20 for the constant period (S538). More specifically, the target value searcher 121 determines whether a relationship $p_n>Ln+Cn$ holds.

If the relationship $p_n>Ln+Cn$ holds (yes from S538), the target value searcher 121 adds, to the surplus electric energy, a value resulting from subtracting, from the individual target value, the sum of the value of the target load and the chargeable electric energy (e.g., $[p_n-(Ln+Cn)]$) (S539). The target value searcher 121 sets the sum of the value of the target load and the chargeable electric energy (e.g., (Ln+Cn)) to be the individual target value of the target power storage device 20 (S540). The sum of the supply electric energy above the individual target value ($[p_n-(Ln+Cn)]$) is stored as the surplus electric energy by performing operations S538-S540 on all the power storage devices 20.

The target value searcher 121 performs operations S545-S549 on each power storage device 20 in the sort order until the surplus electric energy becomes zero (S542, S543, S544, and S550).

In operation S545, the target value searcher 121 determines whether the sum of the surplus electric energy and the individual target value of the power storage device 20 is larger than the sum of the target load and the chargeable electric energy of the target power storage device 20 for the constant period from the control time. In other words, the target value searcher 121 determines whether the sum of the load of the target power storage device 20 and the chargeable electric energy of the target power storage device 20 is within a range of the individual target value or within a range of the sum of part or whole of the surplus electric energy and the individual target value.

If the sum of the surplus electric energy and the individual target value is larger than the sum of the target load and the chargeable electric energy (yes from S545), the target value searcher 121 subtracts, from the surplus electric energy, a remainder resulting from subtracting the individual target value from the sum of the target load and the chargeable electric energy (S546). The target value searcher 121 sets the sum of the target load and the chargeable electric energy to be the individual target value of the target power storage device 20 (S547). More specifically, in operation S546, a allocation portion of the surplus electric energy is to be supplied to a power storage device 20 having the sum of the target load and the chargeable electric energy exceeding the individual target value, and that allocation portion is subtracted from the surplus electric energy.

If the sum of the surplus electric energy and the individual target value is equal to or below the sum of the target load and the chargeable electric energy of the target power storage device 20 for the constant period from the control time (no from S545), the target value searcher 121 adds the surplus electric energy to the individual target value of the target power storage device 20 (S548). Since the entire surplus electric energy has been allocated, the target value searcher 121 sets the surplus electric energy to be zero (S549).

Operation S545 and subsequent operations are performed on the power storage devices 20 in the order of small to large stored electric energy such that the surplus electric energy is supplied to a power storage device 20 having a smaller stored electric energy with a higher priority.

The search process of the overall target value has been described. Discussed below are the power supply control process and the charge-discharge control process (e.g., the power leveling control process) performed by the power leveling control device 10. In response to the searched overall target value, the power leveling control device 10 performs the power supply control process on the electric energy supplied by the power network 40 and the charge-discharge control process on the power storage device 20. According to the fourth embodiment, the switch 60 is a direct control target.

Figure 33:
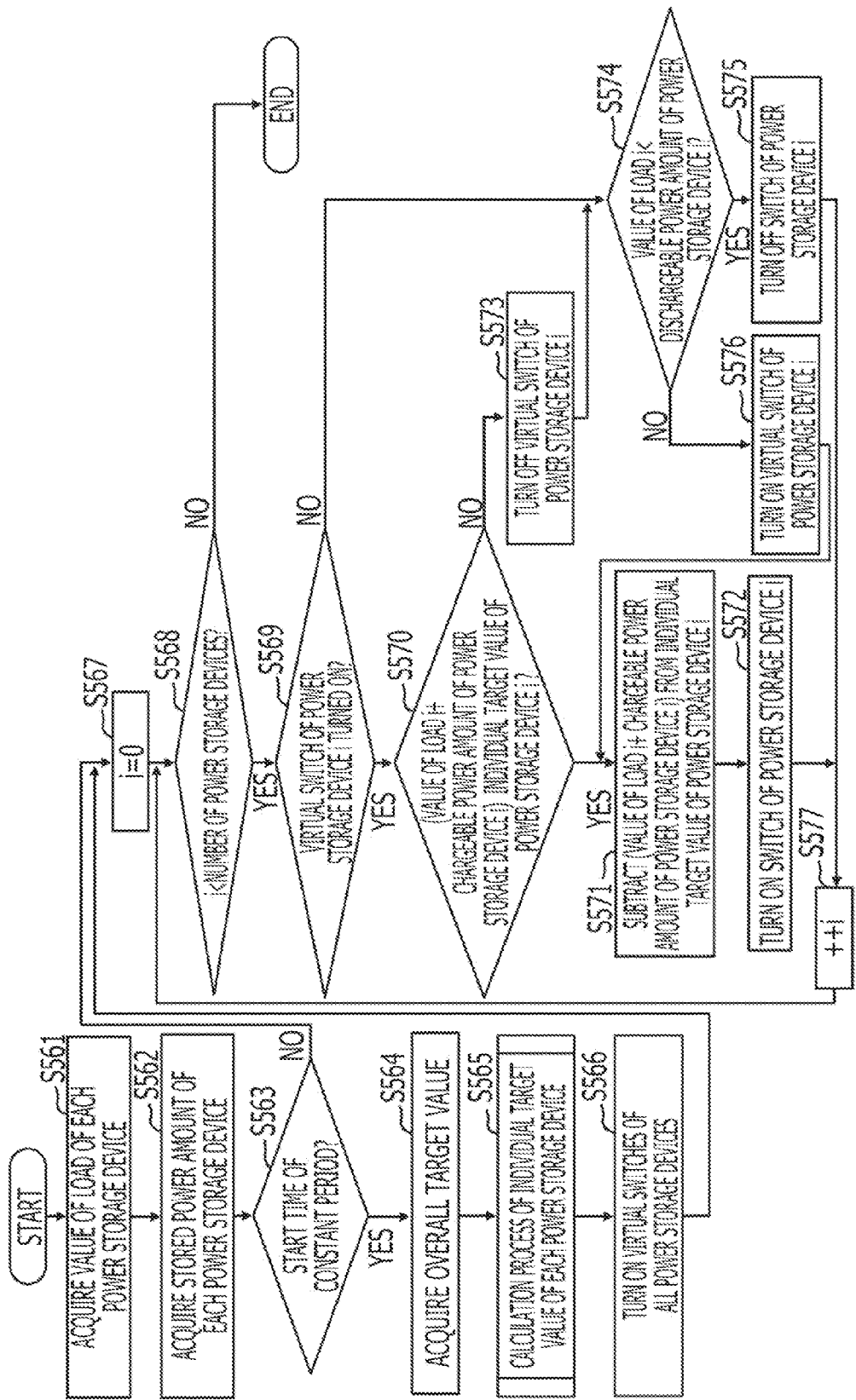
FIG. 33 is a flowchart illustrating a power supply control process performed on electric energy from the power network by the power leveling control device, and a charge-discharge control process by the power storage device in accordance with the fourth embodiment.

FIG. 33 is a flowchart illustrating the power supply control process performed on power from the power network by the power leveling control device, and the charge-discharge control process of the power storage device in accordance with the fourth embodiment. The process of FIG. 33 is repeated every control interval.

Operations S561 and S562 are respectively substantially identical to operations S201 and S202 of FIG. 15. The actual value of the load and the stored electric energy at the present time are acquired from one of the power consuming device 30 and the power storage device 20.

The leveling control information generator 124 determines whether the control time is start time of the periodically repeated constant period (S563). More specifically, the leveling control information generator 124 determines whether the constant period has elapsed since the preceding setting of the individual target value or determines whether no individual target value has been set at all. If the control time is the start time of the constant period (yes from S563), the leveling control information generator 124 acquires the overall target value from the target value storage unit 129 (S564).

The leveling control information generator 124 performs the calculation process of the individual target value of each power storage device 20 (S565). The process of operation S565 is substantially identical to the process of FIG. 32. However, if the process of FIG. 32 is executed in operation S565, the entity performing the process is the leveling control information generator 124. The value of the load is the value acquired in operation S561. The remaining time of the stored electric energy is the time calculated in operation S562. The overall target value substituted in equation (1) is not the tentative target value but the overall target value acquired in operation S564. With operation S565 executed, the individual target value for the constant period from the present control time is calculated on each power storage device 20. The leveling control information generator 124 turns on the virtual switches of all the target power storage devices 20 (S566).

Subsequent to operation S566 or the no branch from operation S563, the leveling control information generator 124 performs operations S569-S576 on all the power storage devices 20 (S567, S568, and S577).

In operation S569, the leveling control information generator 124 determines whether the virtual switch of the power storage device 20 as a process target (the target power storage device 20) is in the on state (S569). Except at the start time of the constant period, the leveling control information generator 124 determines the state of the virtual switch at the preceding control time. At the start time of the constant period, however, all the virtual switches are turned on in operation S566.

If the virtual switch is turned on (yes from S569), the leveling control information generator 124 determines whether the sum of the load to the target power storage device 20 (the target load) and the chargeable electric energy of the target power storage device 20 is equal to or below the individual target value of the power storage device 20 (S570). The target load is a load in the control interval from the control time. The chargeable electric energy is chargeable electric energy in the control interval from the control time.

If the sum of the target load and the chargeable electric energy is equal to or below the individual target value of the power storage device 20 (yes from S570), the leveling control information generator 124 subtracts from the individual target value the sum of the target load and the chargeable electric energy (e.g., the electric energy consumption in the control interval) (S571). In this case, the electric energy consumption within the constant period is equal to or below the individual target value. The individual target value with the sum of the target load and the chargeable electric energy reduced therefrom is used in the next control time. The leveling control information generator 124 transmits the power leveling control information indicating the on state to the switch 60 corresponding to the target power storage device 20 (the target switch 60) (S572). As a result, the switch 60 is turned on, and the electric energy from the power network 40 is supplied to the target power storage device 20 and the power consuming device 30 corresponding to the target power storage device 20.

If the sum of the target load and the chargeable electric energy is above the individual target value of the power storage device 20 (no from S570), the leveling control information generator 124 turns off the virtual switch of the target power storage device 20 (S573). The electric energy consumption within the constant period exceeds the initial individual target value.

Subsequent to operation S573 and the no branch from operation S569, the leveling control information generator 124 determines whether the value of the target load is below the dischargeable electric energy of the target power storage device 20 (S574). If the value of the target load is below the dischargeable electric energy (yes from S574), the leveling control information generator 124 transmits the power leveling control information indicating the off state to the switch 60 (S575). The switch 60 is thus turned off, and the electric energy stored on the power storage unit 22 in the target power storage device 20 is supplied to the power consuming device 30 corresponding to the target power storage device 20.

If the value of the target load is equal to or above the dischargeable electric energy (no from S574), the leveling control information generator 124 turns on the virtual switch of the target power storage device 20 (S576), and performs operation S571 and subsequent operations.

Figure 34:
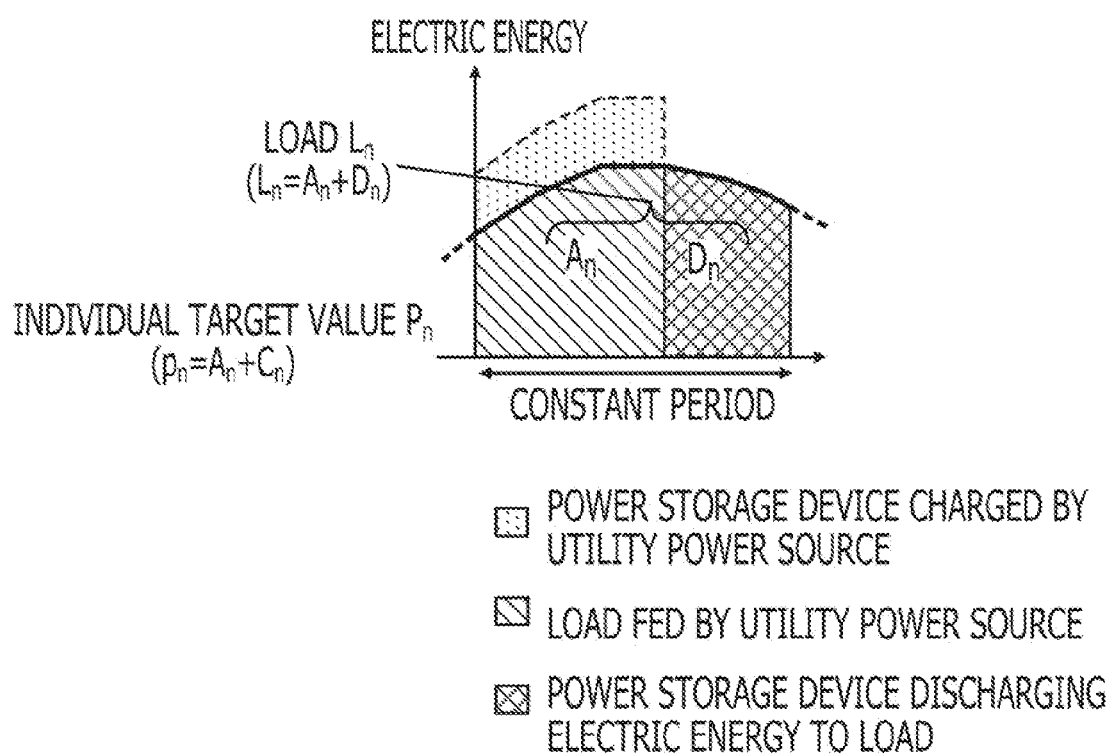
FIG. 34 illustrates the appropriateness of a calculation equation of the individual target value of the fourth embodiment.

The appropriateness of equation (1) is described below. FIG. 34 illustrates the appropriateness of the calculation equation (1) of the individual target value of the fourth embodiment.

FIG. 34 illustrates the first constant period of FIG. 29A. The meaning of the parameters is described in the discussion of FIGS. 29A and 29B. Since the overall target value $P_0$ is the sum of the charged electric energy and the load, and is represented by the following equation (2):

$$P_0 = \sum_i \{C_i + A_i\} \qquad (2)$$

The following equation (3) holds in order that the stored electric energy of all the power storage devices 20 may be equal to each other after the constant period:

$$\frac{B_i + C_i - D_i}{L_i} = \frac{B_n + C_n - D_n}{L_n} \qquad (3)$$

Equation (1) is obtained based on equations (2) and (3), equations Ln=An+Dn, and $p_n$=Cn+An.

Described below is data obtained as a result of simulation tests performed with the first through fourth embodiments applied. In the simulation tests, four notebook computers (the power consuming devices 30) having respective batteries (the power storage devices 20) are used.

Figure 35:
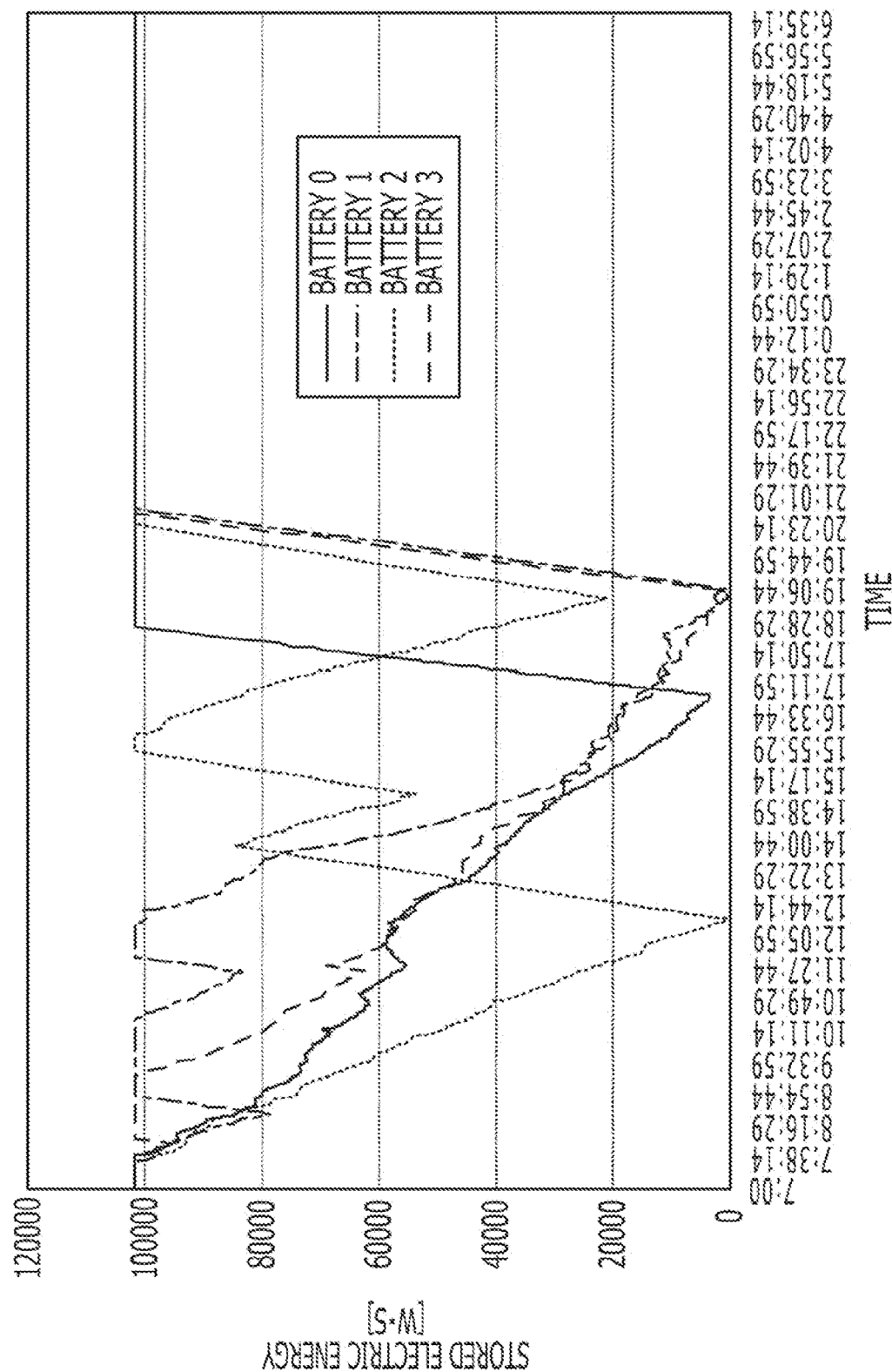
FIG. 35 illustrates a transition of the remaining electric energy on each battery with time when the power leveling control is performed on an individual basis.

For reference, the power leveling process is performed on a per PC basis with none of the embodiments applied. FIG. 35 illustrates a transition of remaining electric energy of each battery with the power leveling process performed on an individual basis.

Figure 1:
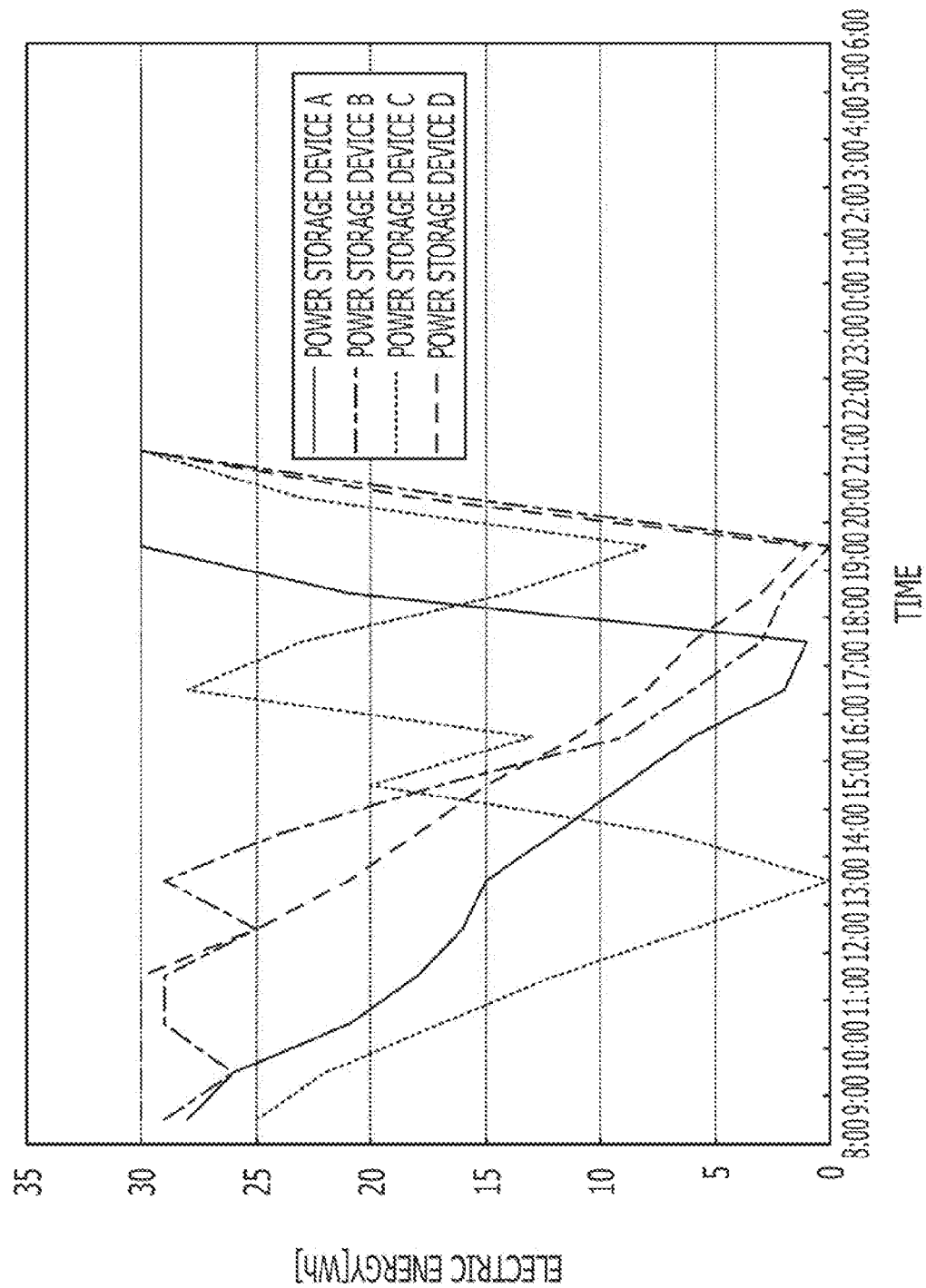
FIG. 1 illustrates a transition of stored electric energy of each power storage device with time when a power leveling process is performed on each power storage device.
Figure 2:
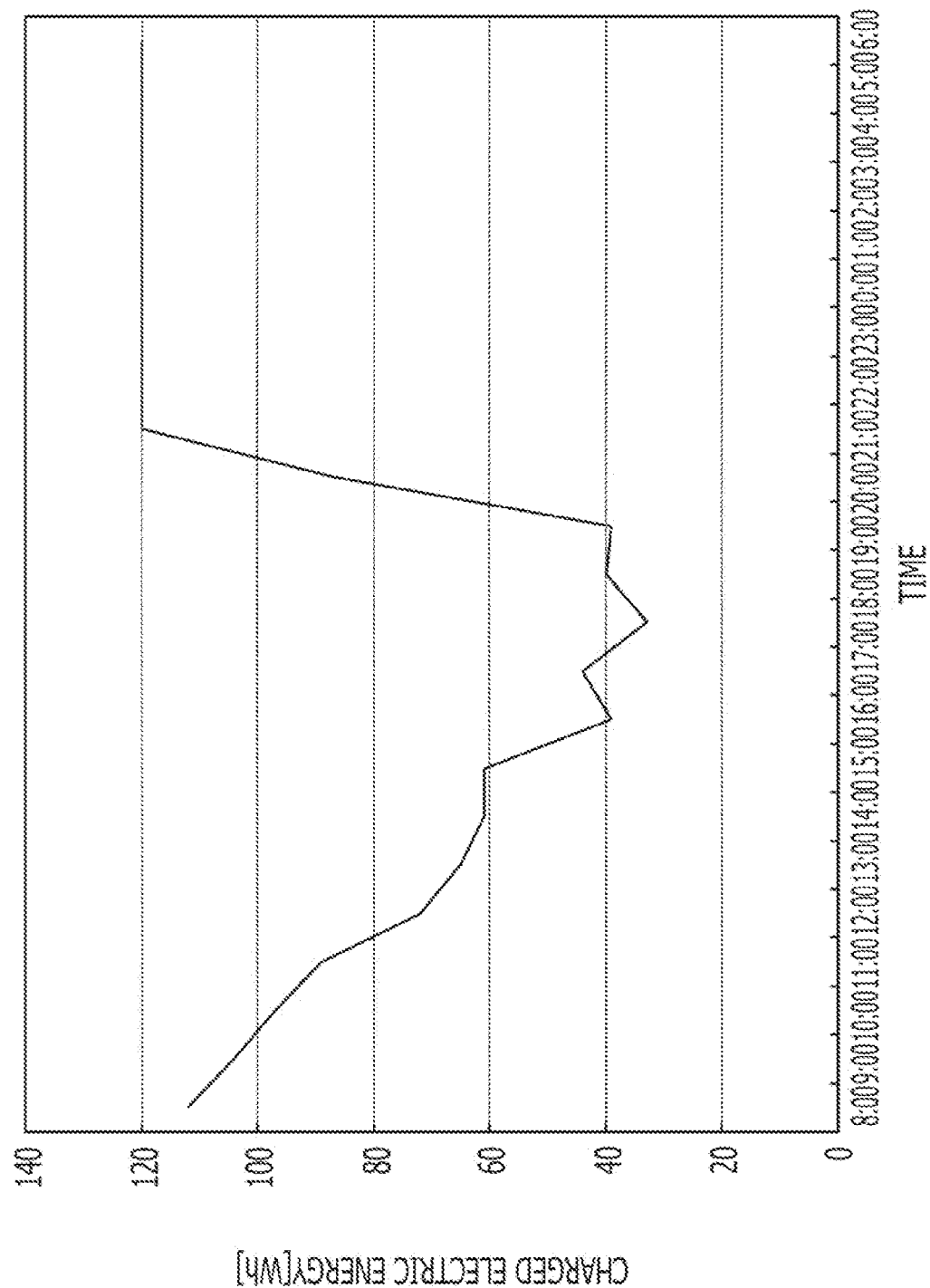
FIG. 2 illustrates a transition of the sum of stored electric energy of the power storage devices when the power leveling process is performed on each power storage device.

If the power leveling process is individually performed as illustrated in FIG. 1, the timings of minimum remaining electric energy (stored amounts) of the batteries are substantially different even in the simulation test.

Figure 36:
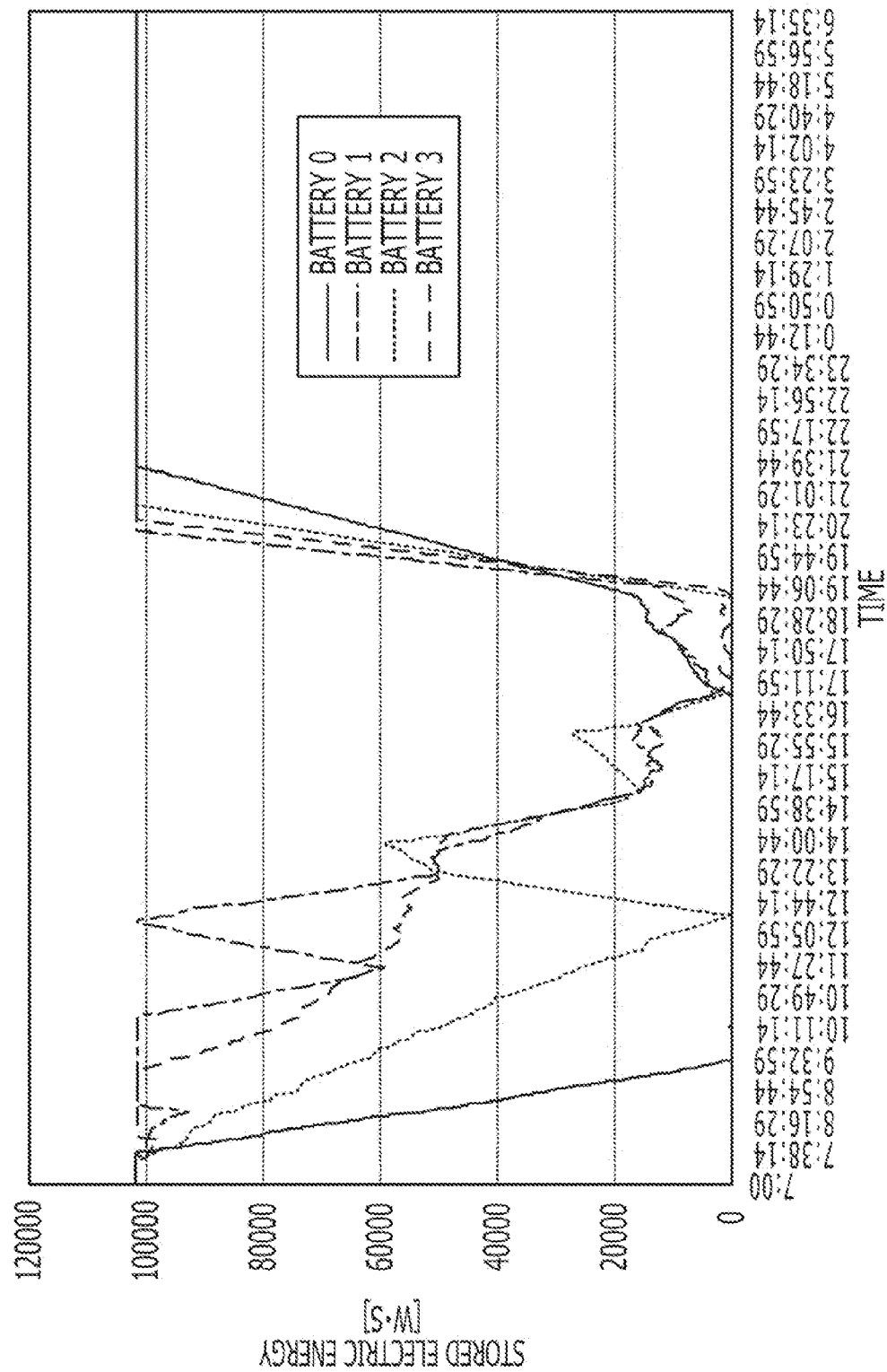
FIG. 36 illustrates a transition of the remaining electric energy on each battery with time when the first embodiment is applied.

FIG. 36 illustrates transitions of the remaining electric energy of the batteries with the first embodiment applied. As illustrated in FIG. 36, the timings of the minimum remaining electric energy of battery 0 and battery 2 are different, but the remaining batteries are approximately aligned in timing of the minimum remaining electric energy. According to the first embodiment, the electric energy covering process is performed if a given battery runs out of the stored electric energy thereof, and part of the batteries may be shifted in timing of the minimum remaining electric energy.

Figure 37A:
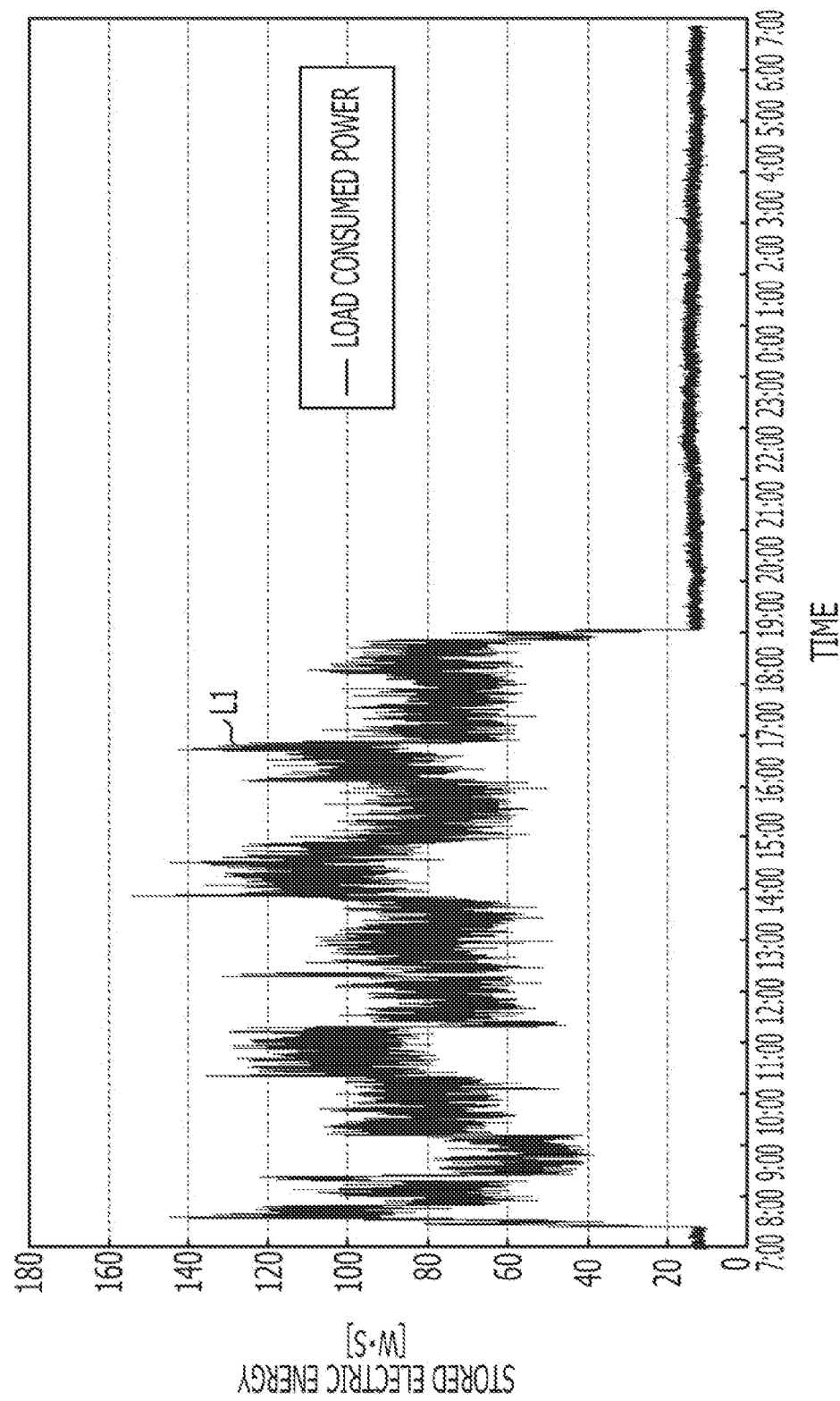
FIG. 37A to 37C illustrate transitions of the electric energy consumption from the utility power source in accordance with the first embodiment.
Figure 37B:
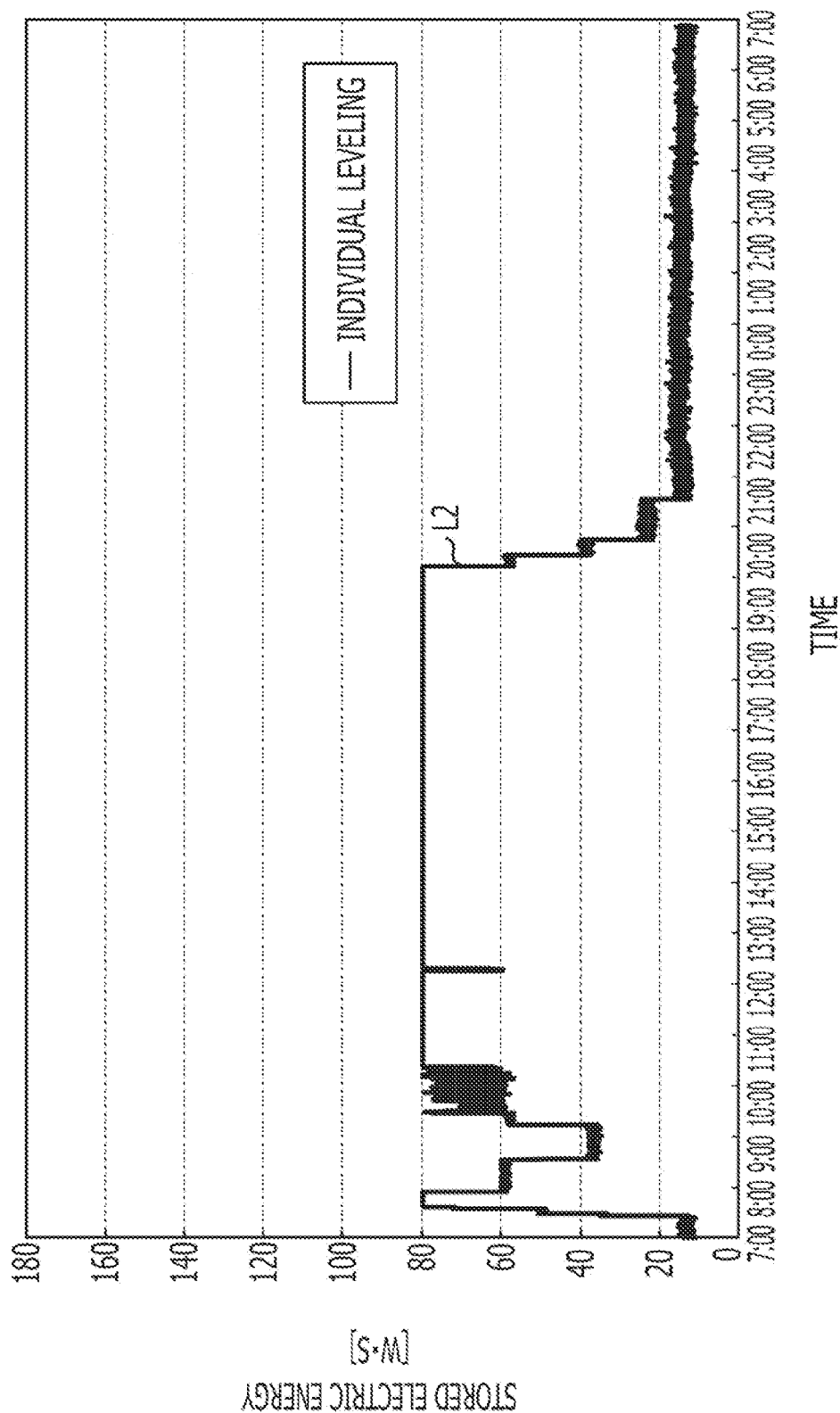
Figure 37C:
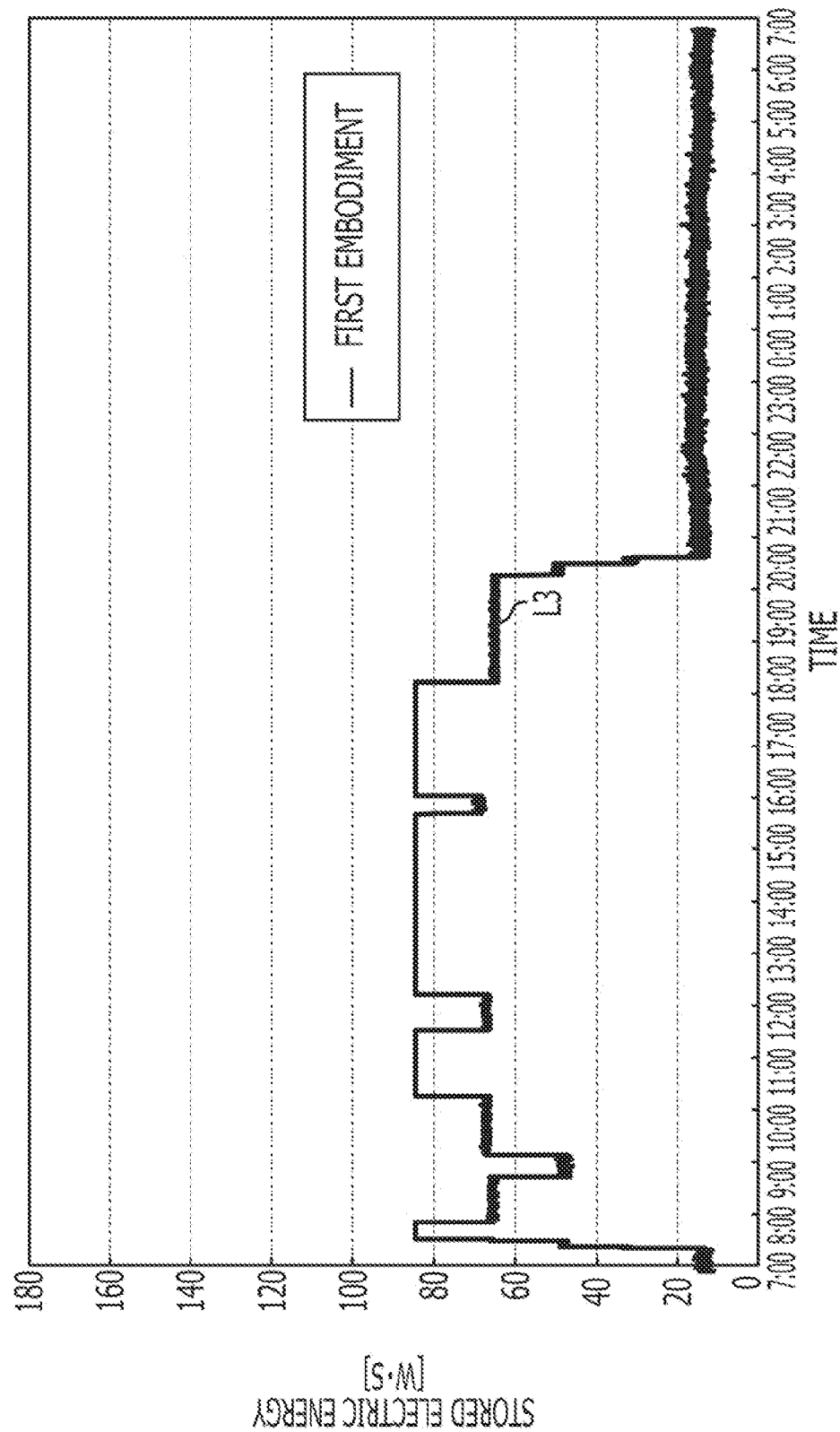

FIG. 37A to 37C illustrate transitions of the electric energy consumption from the utility power source with time with the first embodiment applied. As illustrated in FIG. 37A to 37C, L1 represents the electric energy consumption of the notebook computer. L2 represents the electric energy consumption from the utility power source with the first embodiment applied. By comparison of L1 and L2, a peak value is clearly leveled. L3 represents the electric energy consumption from the utility power source with the power leveling process individually performed on the notebook computers. By comparison of L2 and L3, the peak value of L2 is clearly leveled.

Figure 38:
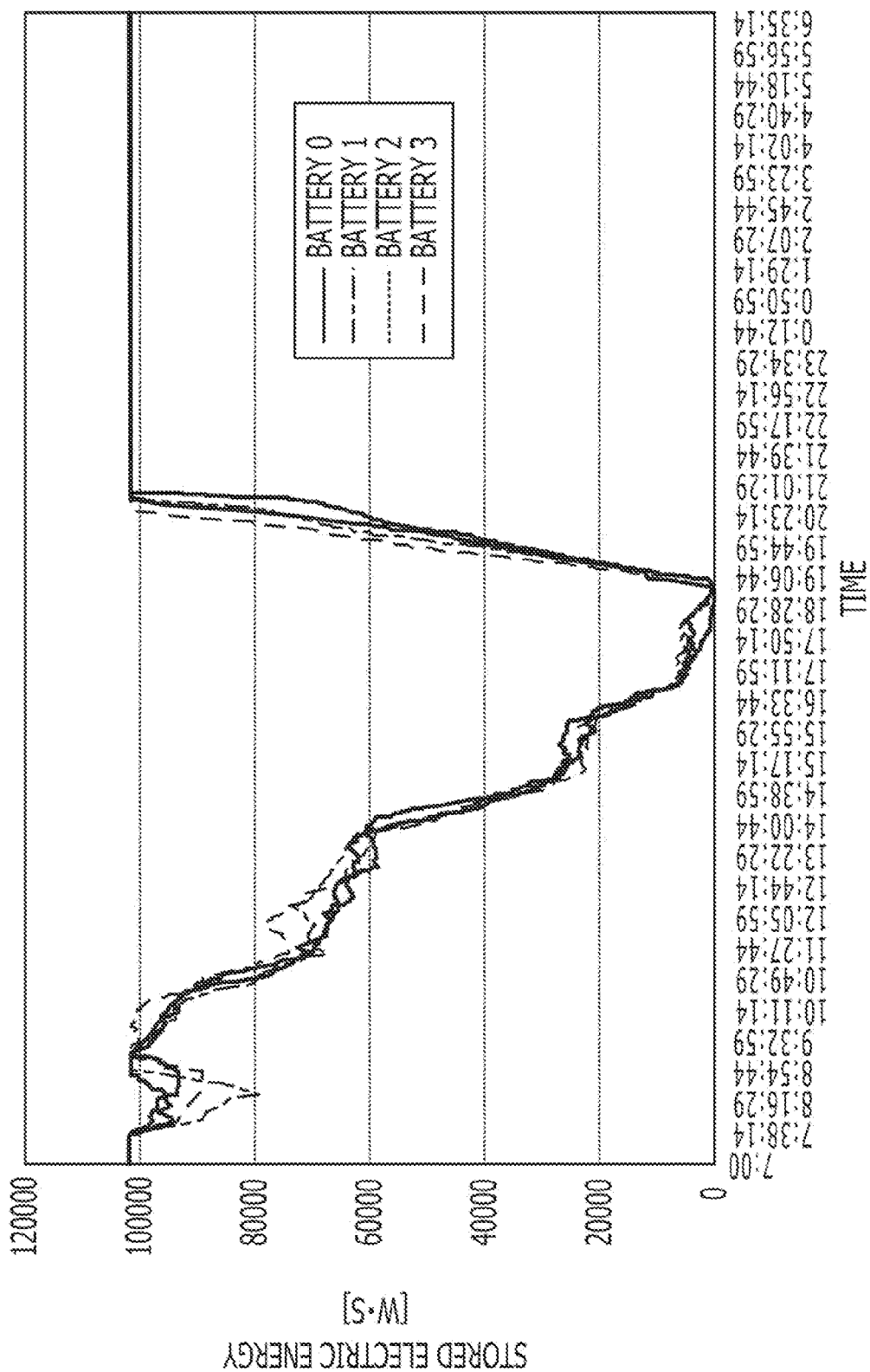
FIG. 38 illustrates a transition of the remaining electric energy on each battery with time when the second embodiment is applied.

FIG. 38 illustrates transitions of the remaining electric energy of the batteries with time with the second embodiment applied. If the second embodiment is applied as illustrated in FIG. 38, all the batteries are approximately aligned in timing of the minimum remaining electric energy.

Figure 39B:
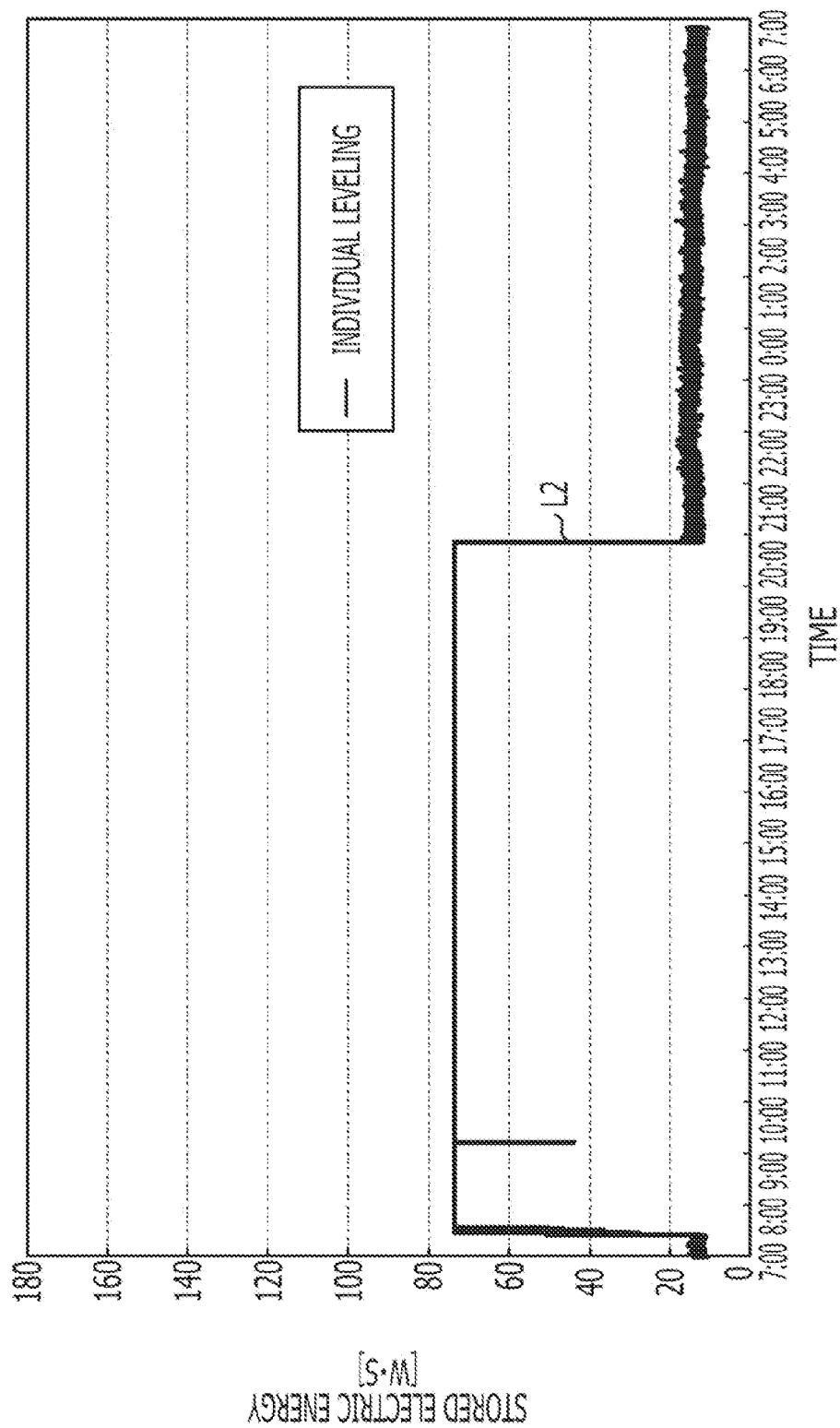
Figure 39C:
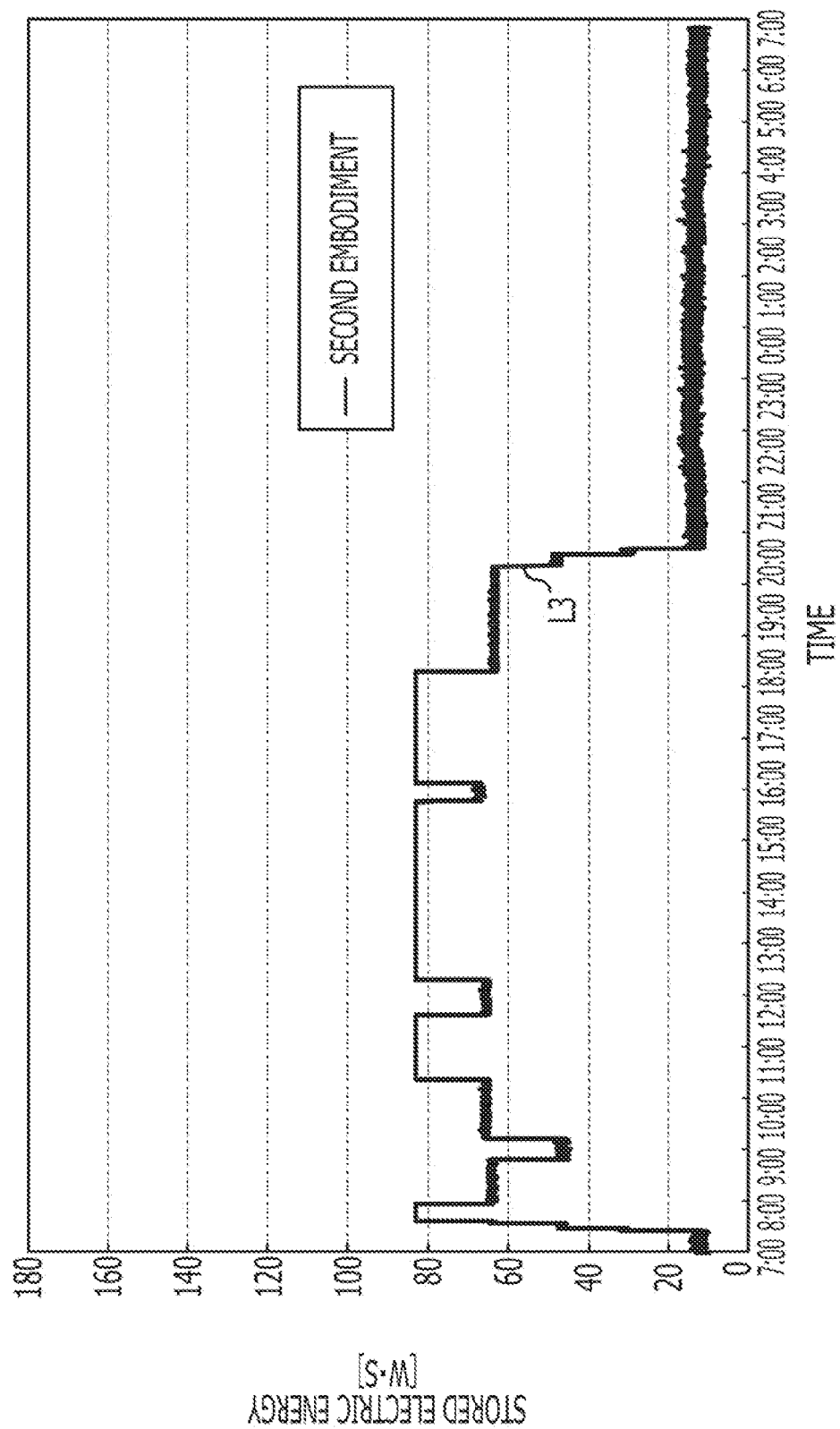

FIG. 39A to 39C illustrate transitions of the electric energy consumption from the utility power source with time with the second embodiment applied. L1 through L3 have substantially the same definitions as those in FIG. 37A to 39C. As illustrated in FIG. 39A to 39C, the peak value of L2 is clearly leveled.

Figure 40:
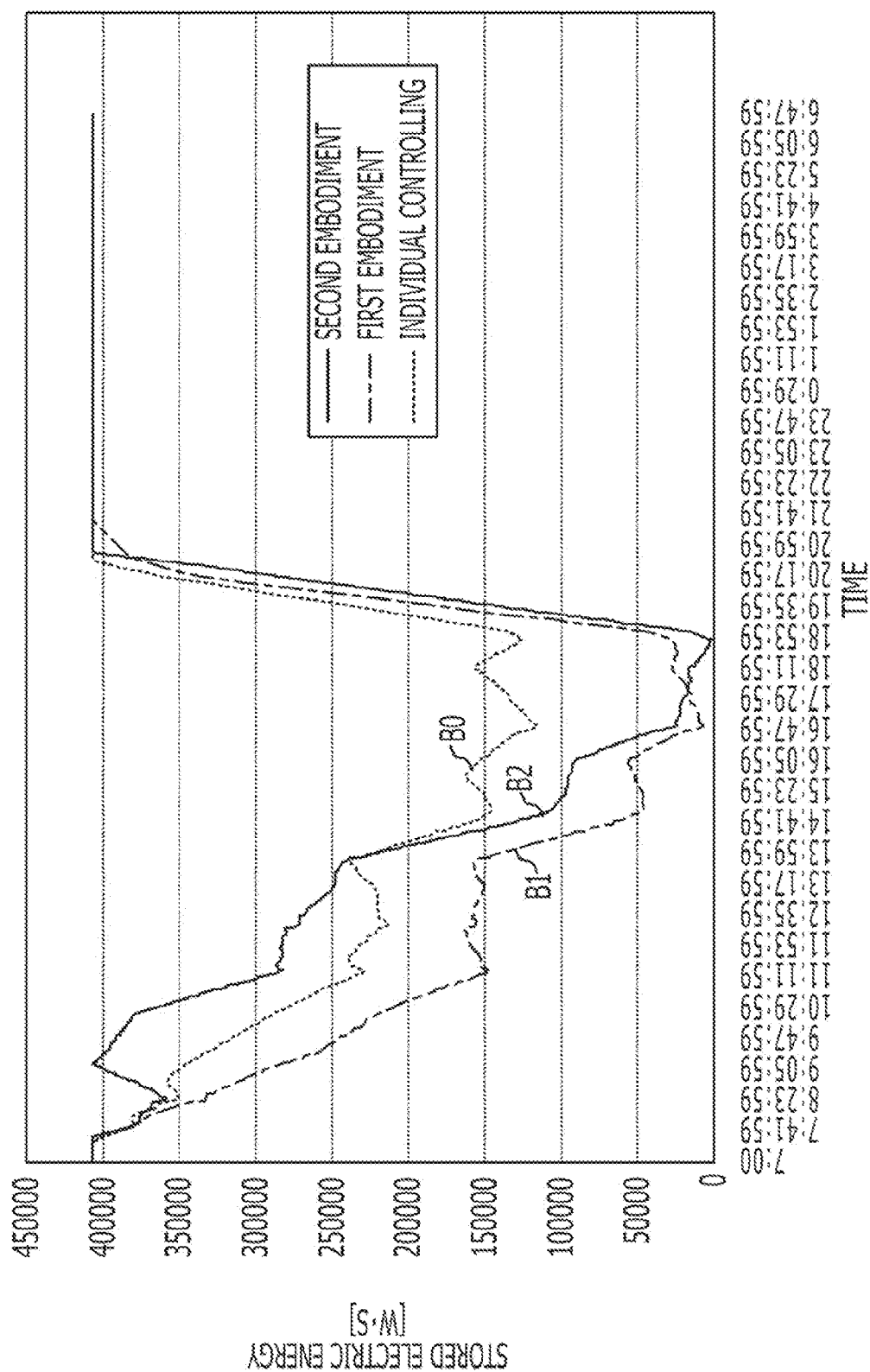
FIG. 40 illustrates a transition of the remaining electric energy on the battery with time.

FIG. 40 illustrates transitions of the battery remaining electric energy with time. As illustrated in FIG. 40, B0 represents the transition of the battery remaining energy with the power leveling process performed on an individual basis. B1 represents the transition of the sum of the battery remaining electric energy with the first embodiment applied. B2 represents the transition of the sum of the battery remaining electric energy with the second embodiment applied. If the power leveling process is performed on an individual basis as represented by B0, the batteries are not sufficiently used as a whole system. In B1 and B2, the battery minimum electric energy is close to zero, and the batteries are sufficiently used.

Figure 41A:
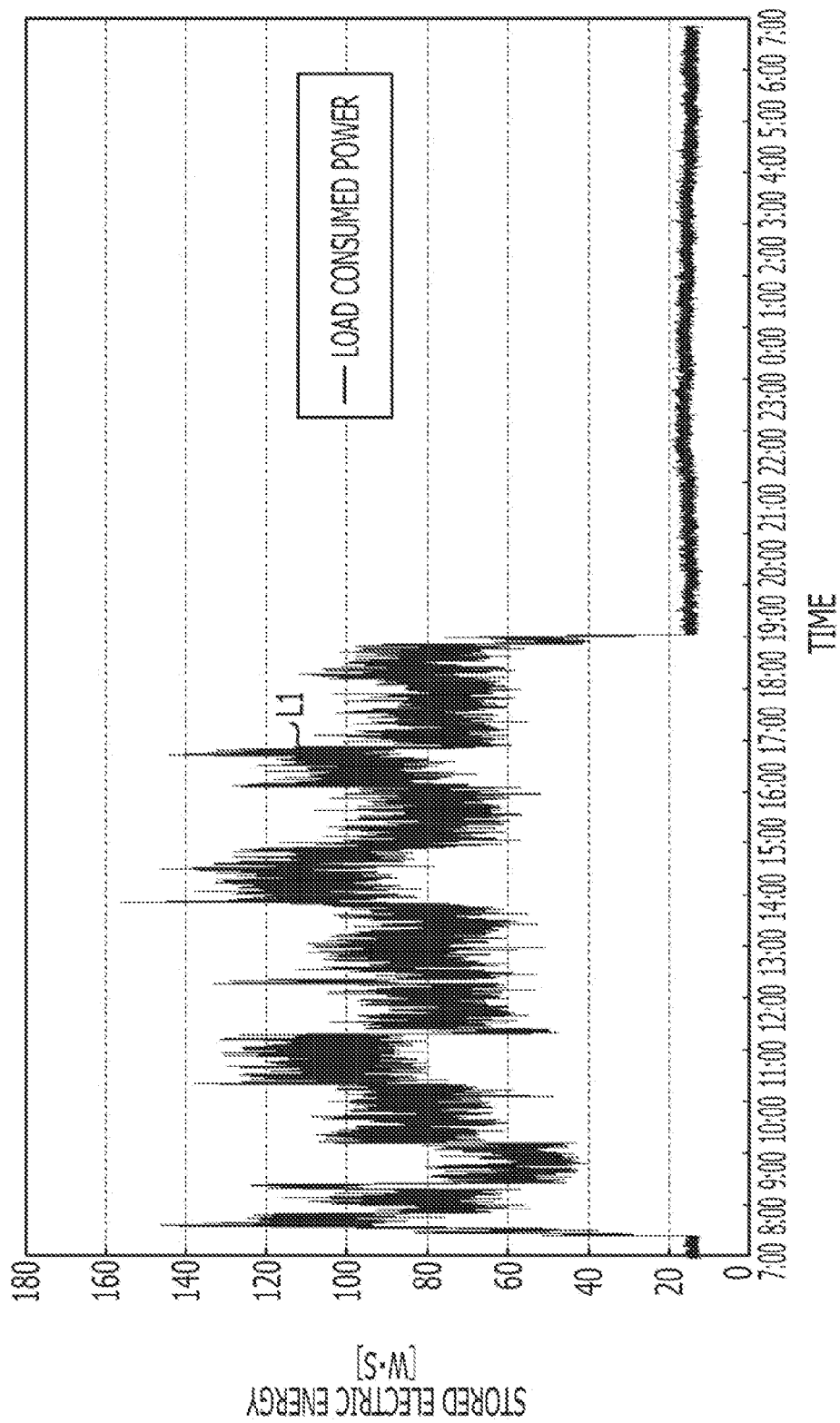
FIG. 41A to 41C illustrate transitions of the electric energy consumption from the utility power source when the third embodiment is applied.
Figure 41B:
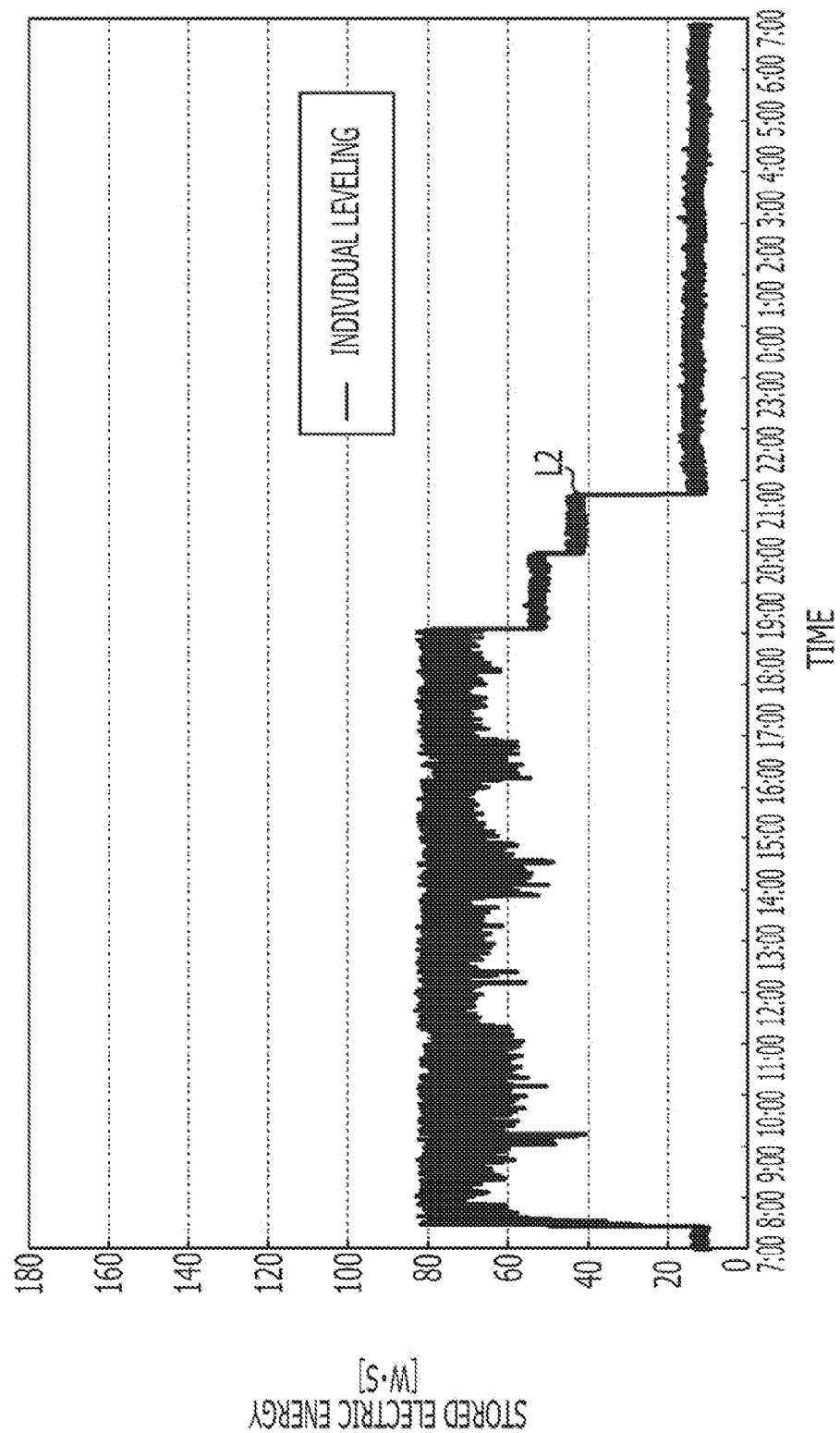
Figure 41C:
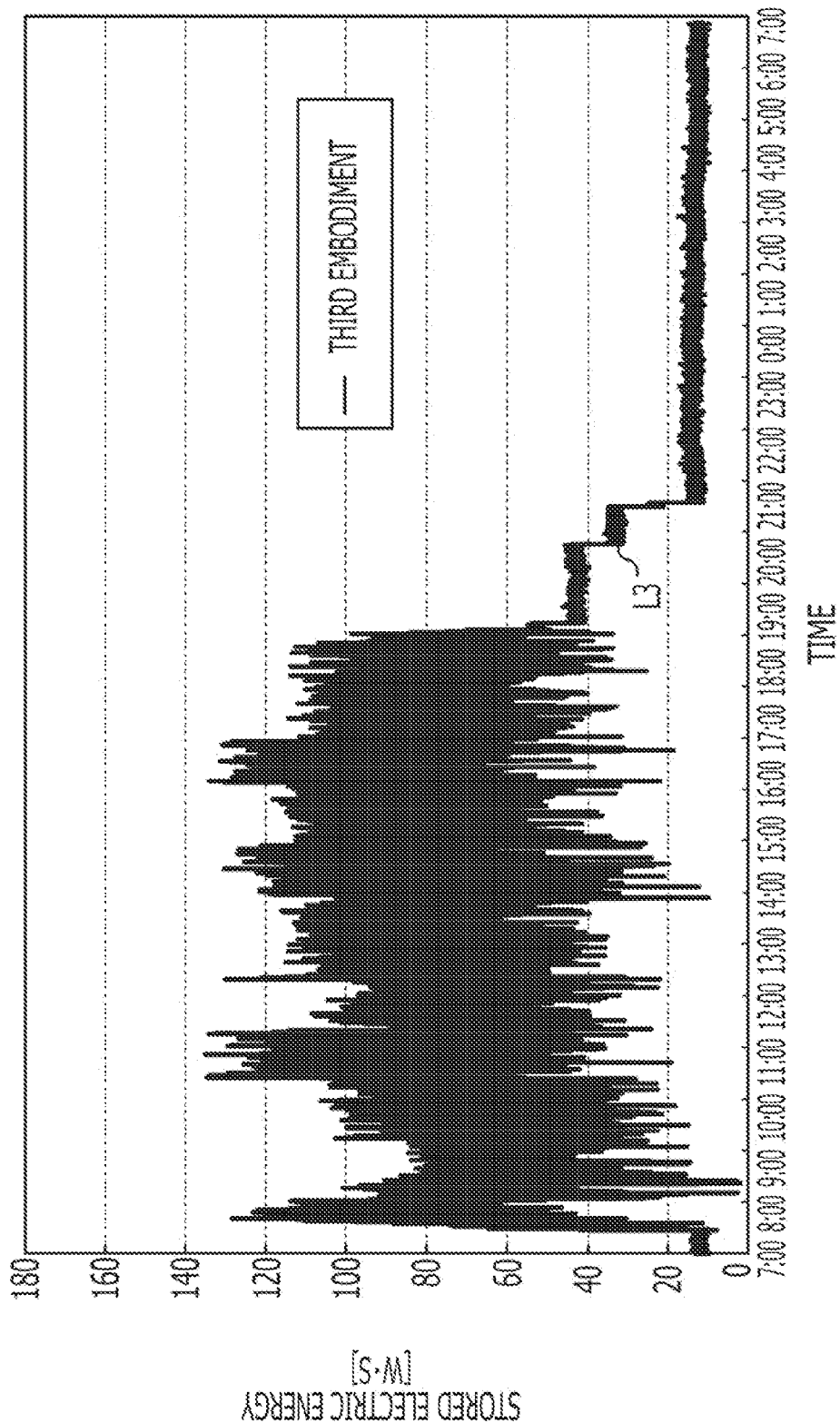

FIG. 41A to 41C illustrate transitions of the electric energy consumption from the utility power source with the third embodiment applied. As illustrated in FIG. 41A to 41C, L1-L3 have substantially the same definitions as previously described. The switches are used for individually leveling power. As illustrated in FIG. 41A to 41C, the peak value is clearly leveled in L2 in comparison with L3.

Figure 42A:
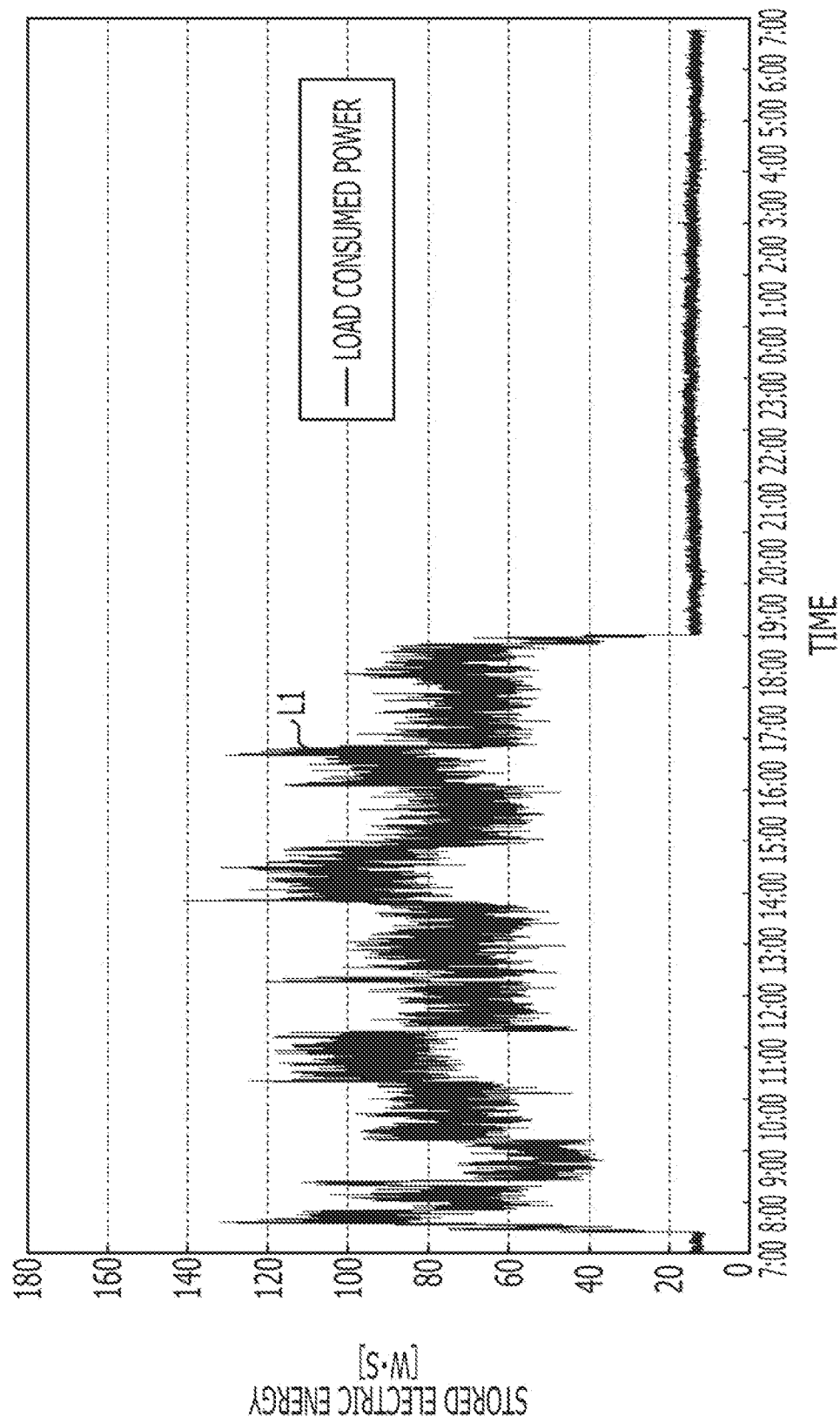
Figure 42B:
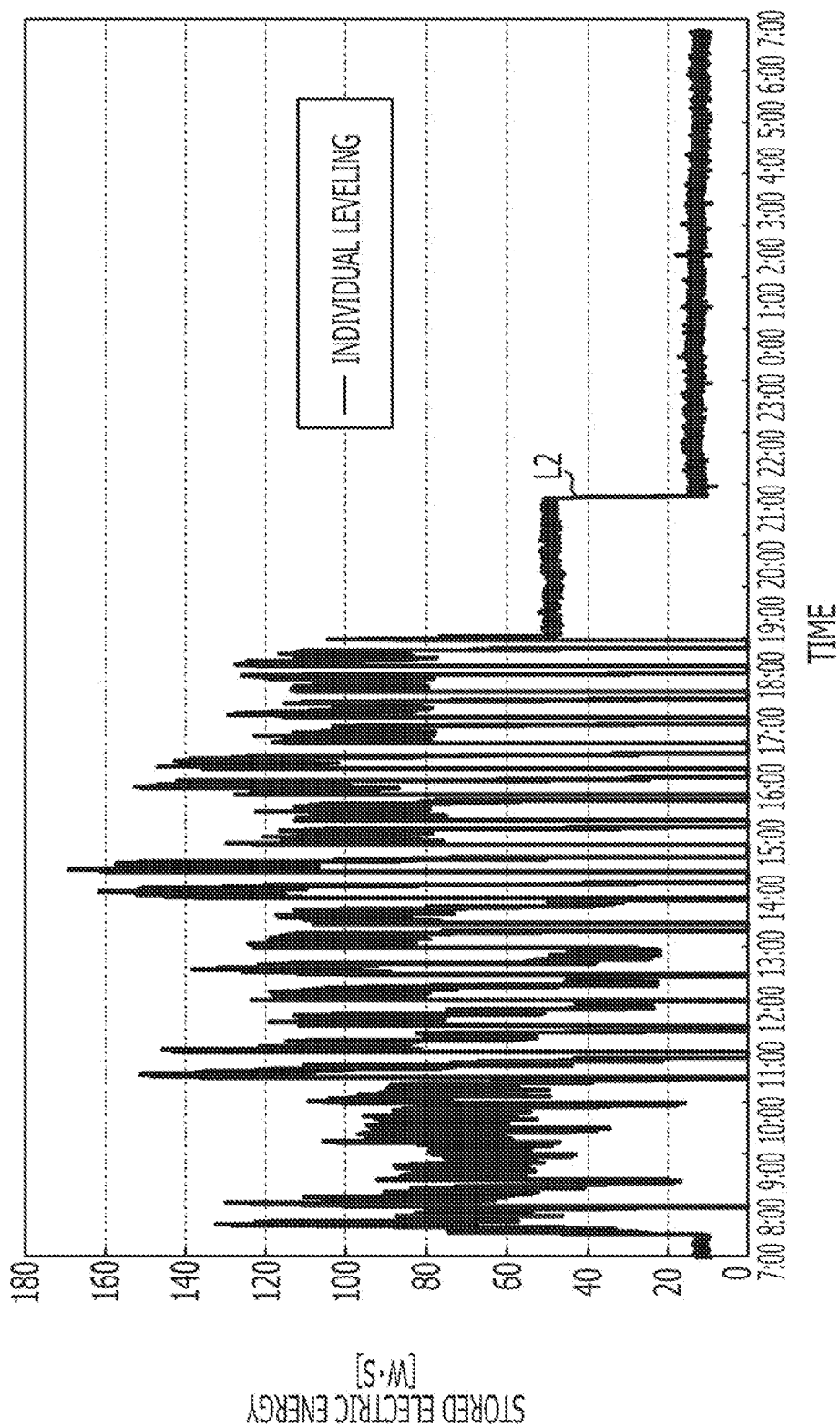

FIG. 42A to 42C illustrate transitions of the electric energy consumption from the utility power source with the fourth embodiment applied. As illustrated in FIG. 42A to 41C, L1-L3 have substantially the same definitions as previously described. According to the fourth embodiment, the electric energy consumption greatly changes with time. In the fourth embodiment, all the switches are turned on at the start of the constant period, and then any switch corresponding to the power storage device having reached the individual target value is turned off. The electric energy consumption greatly changes with time because the state with all the switches turned off and the state with all the switches turned on occur. According to the fourth embodiment, the peak of the electric energy consumption is leveled every constant period. If the electric energy of FIG. 42A to 41C is integrated every constant period, the transitions of FIG. 43 result.

Figure 43:
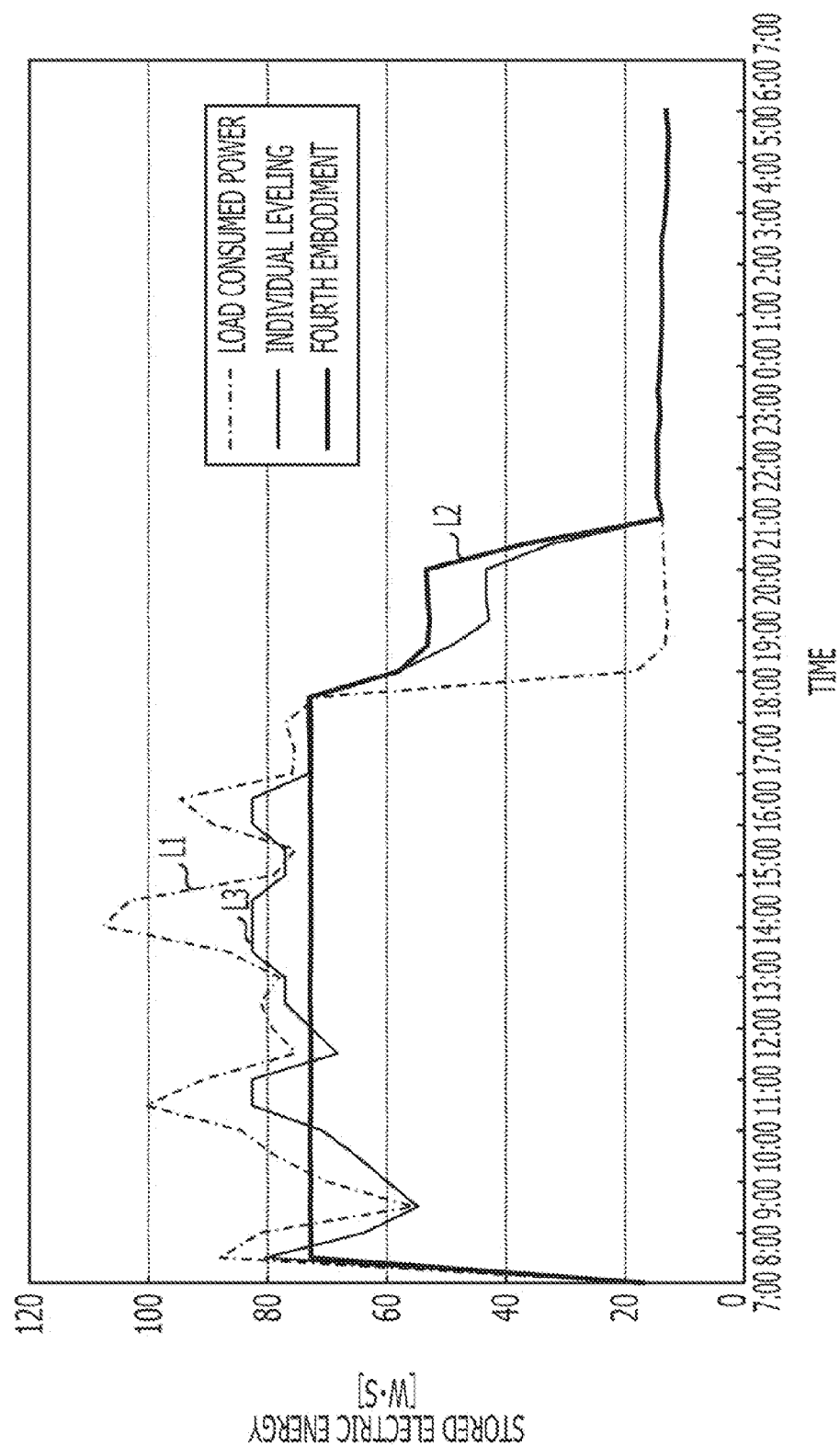
FIG. 43 illustrates a transition of the electric energy consumption from the utility power source every constant period when the fourth embodiment is applied.

FIG. 43 illustrates transitions of the electric energy consumption from the utility power source with the fourth embodiment applied. In this simulation test, the constant period is 30 minutes. As illustrated in FIG. 43, the transition of the electric energy consumption from the utility power source is illustrated every 30 minutes.

As illustrated in FIG. 43, the peak value is clearly leveled in L2 in comparison with L3.

The technique discussed herein improves the power leveling effect of the consumption electric energy from the power source if the plurality of power storage devices are used.

The embodiments of the invention have been discussed. The invention is not limited to any particular embodiment, and changes and modifications can be made to the invention within the scope and spirit of the invention defined in the claims.

According to an embodiment, a controller for leveling power supplied from a power source includes electric energy consumption information acquisition unit for acquiring information of electric energy consumption from a power consuming device consuming power from the power source and electric energy charged into a power storage device, the power consuming device arranged for a plurality of power storage devices charged by the power source; a threshold value storage unit for storing a specific threshold value common to the plurality of power storage devices; and a control unit for causing all switches, each switch arranged on a per power storage device basis, to be conductive if the sum of electric energy consumption is equal to or below the specific threshold value, wherein the power storage device corresponding to the conductive switch is charged by the power source, and the power consuming device corresponding to the power storage device is power-supplied by the power source.

In the controller, the control unit may cause to be conductive a first switch corresponding to the power consuming device related to part of the electric energy consumption having a cumulative value thereof being equal to or below the specific threshold value if the sum of electric energy consumption is above the specific threshold value, and causes the switches other than the first switch to be non-conductive, and the power storage device corresponding to the non-conductive switch may discharge electric energy to the power consuming device.

The controller may further include stored electric energy information acquisition unit for acquiring information of stored electric energy of the power storage device, and the control unit may accumulate electric energy consumption of the power consuming devices corresponding to the power storage devices in the order of short to long time of remaining electric energy of the power storage devices.

In the controller, the control unit may accumulate electric energy consumption of the power consuming devices corresponding to the power storage devices in the order of short to long time of remaining electric energy of the power storage devices in order to calculate a cumulative value of consumed electric energy, and the control unit may cause the switch corresponding to the power consuming device having the second electric energy consumption to be conductive if the cumulative value resulting from accumulating the second consumption electric energy in place of the first electric energy consumption becomes equal to or below the specific threshold value, the first electric energy consumption being accumulated at the moment of the cumulative value exceeding the specific threshold value, and being larger than the second electric energy consumption.

The controller may further include electric energy consumption information storage unit for storing information of electric energy consumption of each power consuming device in response to time elapse; and a search unit for searching for a value, as the specific threshold value, minimizing a maximum electric energy from the power source if the control unit controls the electric energy consumption recorded on the electric energy consumption information storage unit.

According to another embodiment, a controller for leveling power supplied from a power source includes electric energy consumption information acquisition unit for acquiring information of electric energy consumption from a power consuming device consuming electric energy from the power source and electric energy charged into a power storage device, the power consuming device arranged for a plurality of power storage devices charged by the power source; a threshold value acquisition unit for acquiring a first threshold value of each power storage device; and a control unit for causing all switches, each switch arranged on a per power storage device basis, to be conductive at the start of a constant period of time, and causing a switch corresponding to the power consuming device to be non-conductive if the electric energy consumption of the power consuming device exceeds the first threshold value within the constant period of time, wherein the power storage device corresponding to the conductive switch is charged by the power source, and the power consuming device corresponding to the power storage device is power-supplied by the power source, and wherein the power storage device corresponding to the non-conductive switch discharges electric energy to the power consuming device.

The controller may further include a threshold value storage unit for storing a second threshold value common to the plurality of power storage devices; and stored electric energy information acquisition unit for acquiring information of stored electric energy of each power storage device, wherein the stored electric energy information acquisition unit calculates the first threshold value by subtracting stored electric energy of the power storage device from the product resulting from multiplying the total sum of the first threshold value and the sum of the stored electric energy by a ratio of the electric energy consumption of the power storage device to the sum of electric energy consumption acquired by the electric energy consumption information acquisition unit.

The controller may further include electric energy consumption information storage unit for storing information of electric energy consumption of each power consuming device in response to time elapse; and a search unit for searching for a value, as the second threshold value, minimizing a maximum electric energy from the power source within the specific period if the control unit controls the electric energy consumption recorded on the electric energy consumption information storage unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A controller for leveling power supplied from a power source, comprising:
 a memory; and
 a processor configured to:
  acquire information of electric energy consumption from a power consuming device consuming electric energy from the power source and electric energy charged into a power storage device, the power consuming device arranged for a plurality of power storage devices charged by the power source;
  store a specific threshold value of electric energy for each power storage device in the memory; and
  control a first power consuming device to be power-supplied by the power source, the first power consuming device consuming electric energy lower than the specific threshold value of electric energy of the power consuming device, control the power storage device corresponding to the first power consuming device to be charged with a difference between the specific threshold value of electric energy and the electric energy consumption, control the power source to supply to a second power consuming device electric energy corresponding to the specific threshold value of electric energy, the second power consuming device consuming electric energy greater than the specific threshold value of electric energy of the power consuming device, and control the power storage device corresponding to the second power consuming device to discharge to the second power consuming device the difference between the electric energy consumption of the power consuming device and the specific threshold value of electric energy.

2. The controller according to claim 1, the processor being further configured to:
 acquire information about stored electric energy of each power storage device,
 wherein the control causes the power source to supply the entire electric energy consumption to the power consuming device corresponding to a first power storage device having dischargeable electric energy based on the stored electric energy, the dischargeable electric energy being exceeded by the difference between the electric energy consumption and the specific threshold value of electric energy, and causes the power storage device other than the first power storage device to reduce a charged amount and/or increase a discharged amount in response to electric energy by which the dischargeable electric energy based on the stored electric energy is exceeded by the difference between the electric energy consumption and the specific threshold value of electric energy.

3. The controller according to claim 2, wherein the control causes power storage devices from among the power storage devices other than the first power storage device, in the order of long to short remaining time of stored electric energy, to reduce the charged amount and/or increase the discharged amount in response to the electric energy by which the dischargeable electric energy based on the stored electric energy is exceeded by the difference between the electric energy consumption and the specific threshold value of electric energy.

4. The controller according to claim 1, the processor being further configured to:
 store information of electric energy consumption of each power consuming device responsive to time elapse in the memory; and
 search for a value, as the specific threshold value of electric energy, minimizing a maximum electric energy from the power source when the control unit controls the electric energy consumption recorded in the memory.

5. A controller for leveling power supplied from a power source, comprising:
 a memory; and
 a processor configured to:
  acquire information of electric energy consumption from a power consuming device consuming electric energy from the power source and electric energy charged into a power storage device, the power consuming device arranged for a plurality of power storage devices charged by the power source;
  store a specific threshold value of electric enemy in the memory; and
  control the power source to supply electric energy to all the power consuming devices, and control a part of the power storage devices to be charged with a difference between the sum of electric energy consumption and the specific threshold value of electric energy when the sum of electric energy consumption is less than the specific threshold value of electric energy.

6. The controller according to claim 5, wherein the control controls the part of the power storage devices to discharge to the power consuming device excess electric energy by which the sum of electric energy consumption exceeds the specific threshold value of electric energy when the sum of electric energy consumption exceeds the specific threshold value of electric energy.

7. The controller according to claim 6, the processor being further configured to:
acquire information about stored electric energy of the power storage device,
wherein the control selects a power storage device having a long remaining discharge time of the stored electric energy as the power storage device which discharges the excess electric energy.

8. The controller according to claim 5, the processor being further configured to:
store information of electric energy consumption of each power consuming device in response to time elapse in the memory; and
set, as the specific threshold value of electric energy, a value minimizing a maximum electric energy from the power source when the control controls the electric energy consumption recorded in the memory.

9. A power leveling method implemented in a computer, comprising:
acquiring information of electric energy consumption from a power consuming device consuming electric energy from a power source and electric energy charged into a power storage device, the power consuming device arranged for a plurality of power storage devices charged by the power source; and
causing the power source to supply electric energy to all the power consuming devices, and causing at least a part of the power storage devices to be charged with a difference between the sum of electric energy consumption and a specific threshold value of electric energy when the sum of electric energy consumption is less than the specific threshold value of electric energy.

10. A non-transitory computer-readable recording medium in which a program for causing a computer to execute a process of leveling power supplied from a power source is stored, the process comprising:
acquiring information of electric energy consumption from a power consuming device consuming electric energy from the power source and electric energy charged into a power storage device, the power consuming device arranged for a plurality of power storage devices charged by the power source; and causing the power source to supply electric energy to all the power consuming devices, and causing at least a part of the power storage devices to be charged with a difference between the sum of electric energy consumption and a specific threshold value of electric energy when the sum of electric energy consumption is less than the specific threshold value of electric energy.

* * * * *